US008730357B2

(12) United States Patent
Nishio et al.

(10) Patent No.: US 8,730,357 B2
(45) Date of Patent: May 20, 2014

(54) IMAGE PROCESSING DEVICE, IMAGE PROCESSING METHOD, AND PROGRAM

(75) Inventors: Kenichi Nishio, Kanagawa (JP);
Hyongmyong Kang, Tokyo (JP);
Hiroyuki Kinoshita, Tokyo (JP);
Tsukasa Hashino, Kanagawa (JP);
Takuya Kato, Tokyo (JP); Gentaro Irisawa, Kanagawa (JP); Atsuo Minato, Kanagawa (JP)

(73) Assignee: Sony Corporation, Tokyo (JP)

( * ) Notice: Subject to any disclaimer, the term of this patent is extended or adjusted under 35 U.S.C. 154(b) by 146 days.

(21) Appl. No.: 13/096,438

(22) Filed: Apr. 28, 2011

(65) Prior Publication Data

US 2012/0002113 A1    Jan. 5, 2012

(30) Foreign Application Priority Data

Jun. 30, 2010    (JP) ................................. 2010-150142

(51) Int. Cl.
*H04N 5/217*    (2011.01)

(52) U.S. Cl.
USPC ...................................... 348/241; 348/208.11

(58) Field of Classification Search
CPC ..... H04N 9/045; H04N 5/2353; H04N 9/735;
H04N 5/2354; H04N 5/23248; H04N 5/23258;
H04N 5/361; H04N 5/3575
See application file for complete search history.

(56) References Cited

U.S. PATENT DOCUMENTS

| 7,221,793 | B2 * | 5/2007 | Stavely et al. ................. 382/167 |
| 7,227,574 | B2 * | 6/2007 | Yamanaka .................... 348/242 |
| 7,321,685 | B2 * | 1/2008 | Okada et al. .................. 382/167 |
| 2004/0218813 | A1 * | 11/2004 | Okada et al. .................. 382/167 |
| 2007/0146497 | A1 * | 6/2007 | Yamamoto ................. 348/222.1 |
| 2009/0207271 | A1 * | 8/2009 | Utsugi et al. ............... 348/223.1 |
| 2012/0044369 | A1 * | 2/2012 | Irisawa et al. .............. 348/208.4 |
| 2013/0093925 | A1 * | 4/2013 | Nashizawa .................... 348/239 |

FOREIGN PATENT DOCUMENTS

| JP | 2006-20275 | | 1/2006 |
| JP | 2006-135805 | | 5/2006 |
| JP | 2006135805 | A * | 5/2006 |

OTHER PUBLICATIONS

Author: Westlake, Andy Title: Olympus Zuiko Digital 14-42mm 1:3/5-5/6 ED review Date: Apr. 2008 Link: http://web.archive.org/web/20081222065536/http://www.dpreview.com/lensreviews/olympus_14-42_3p5-5p6_o20/.*
U.S. Appl. No. 13/190,900, filed Jul. 26, 2011, Irisawa, et al.

* cited by examiner

*Primary Examiner* — Twyler Haskins
*Assistant Examiner* — Wesley J Chiu
(74) *Attorney, Agent, or Firm* — Oblon, Spivak, McClelland, Maier & Neustadt, L.L.P.

(57) ABSTRACT

An image processing method includes the steps of calculating, with respect to a processing-target pixel in an input image signal, a concentric aberration correction amount for concentric aberration that is a component of magnification chromatic aberration, the concentric aberration causing a color shift to occur in a concentric manner from the center of an image, calculating, with respect to the processing-target pixel, a uniform aberration correction amount for uniform aberration that is a component of magnification chromatic aberration, the uniform aberration causing a color shift direction and a color shift amount to uniformly occur on a whole image, and correcting a pixel value of the processing-target pixel on the basis of the calculated concentric aberration correction amount and the calculated uniform aberration correction amount.

13 Claims, 29 Drawing Sheets

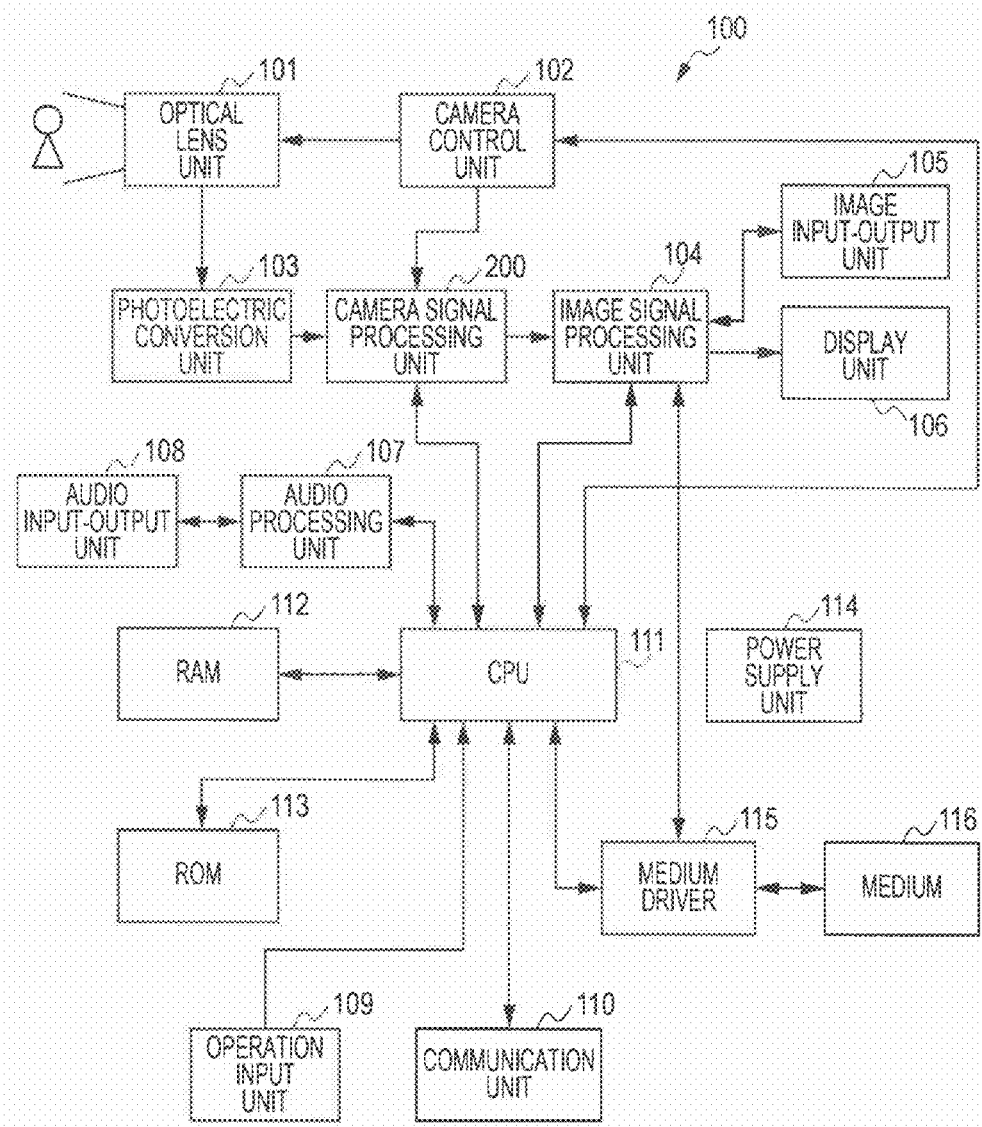

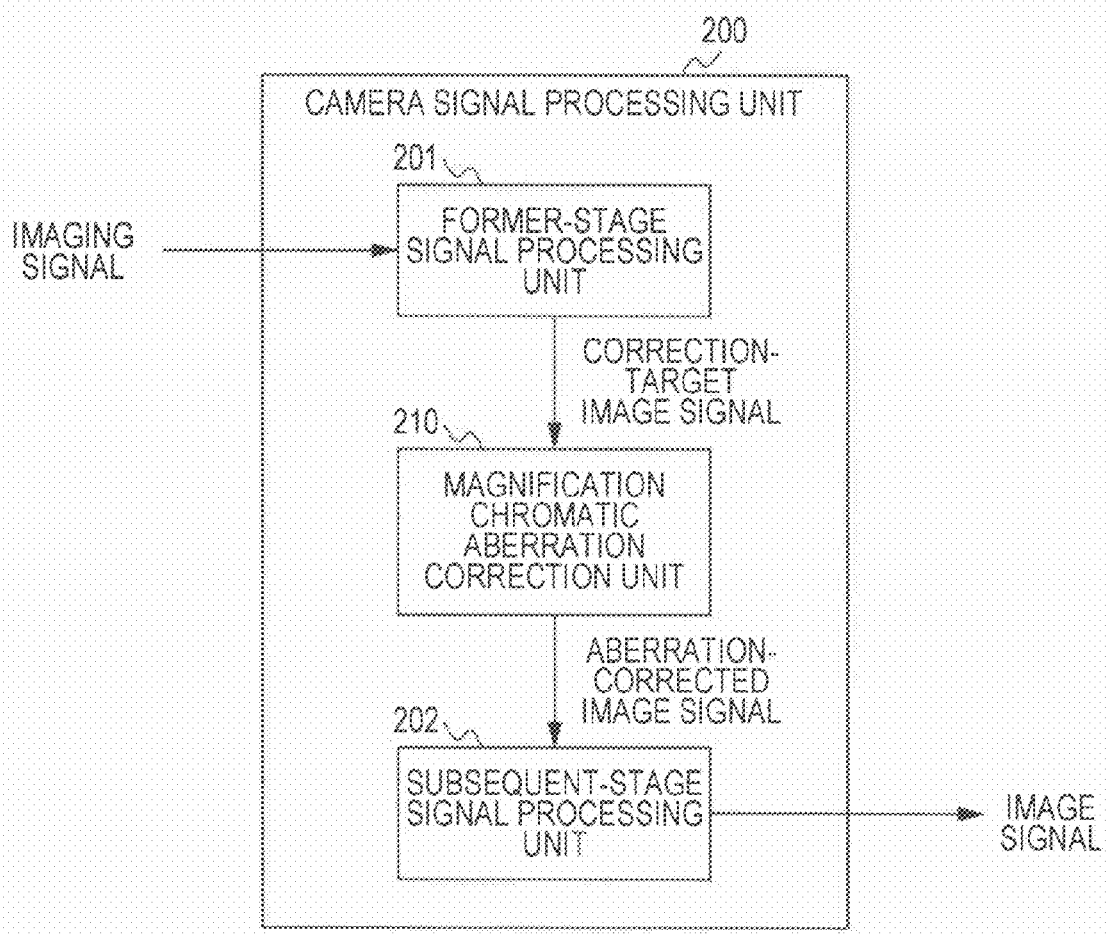

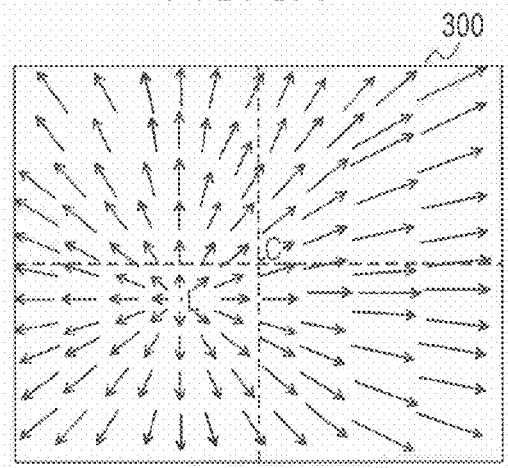
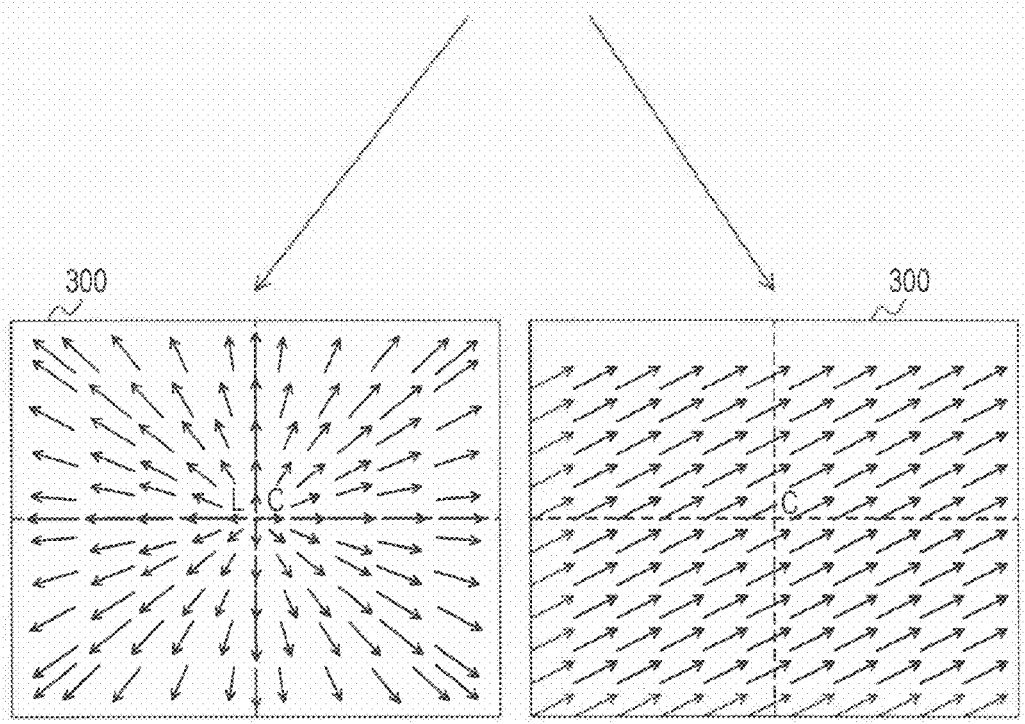

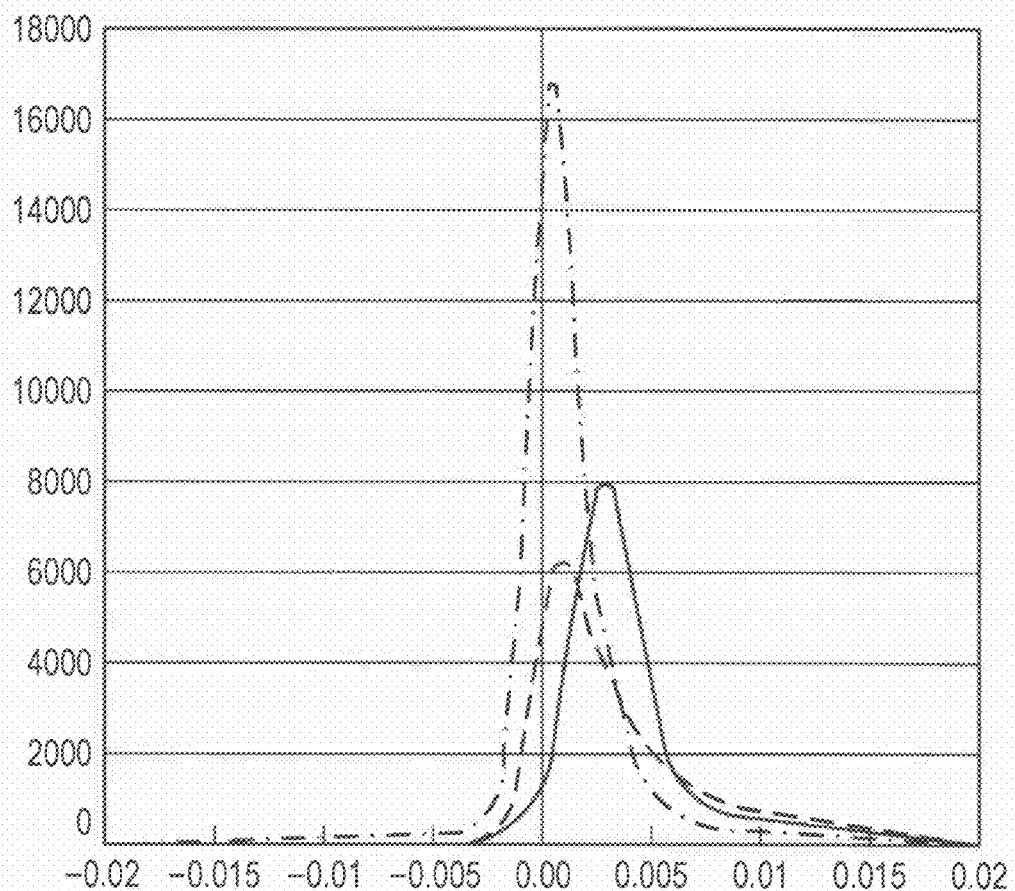

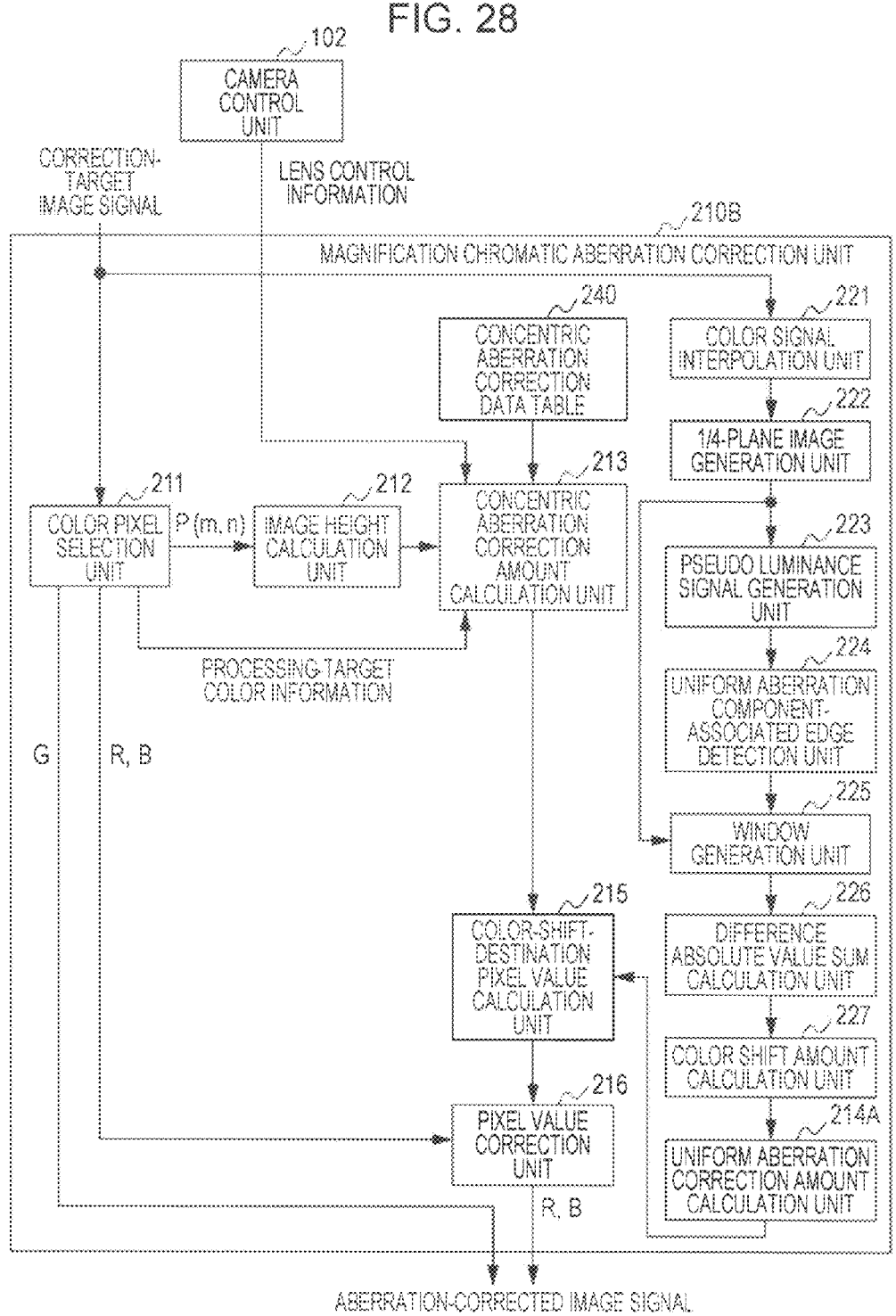

IMAGE PROCESSING DEVICE, IMAGE PROCESSING METHOD, AND PROGRAM

BACKGROUND OF THE INVENTION

1. Field of the Invention

The present invention relates to an image processing device, and, in particular, the present invention relates to an image processing device that performs image processing for correcting magnification chromatic aberration, the processing method thereof, and a program that causes a computer to execute the method.

2. Description of the Related Art

Light passing through a lens may cause magnification chromatic aberration to occur. The refractive index of the lens varies depending on the wavelength of light, and hence the magnification of an image varies depending on the color of light, thereby causing the magnification chromatic aberration to occur. For example, when a white point light source is imaged, in the captured image thereof, a state is observed in which the light source appears like extending in the radiation direction from a center position that corresponds to an optical axis, with being colored like a rainbow.

Since such a magnification chromatic aberration appears as color bleeding in the captured image, and hence become a factor for the reduction of the image quality thereof, correction may be necessary. As an example of a method for correcting the magnification chromatic aberration, material is used for a lens, the difference of refractive indexes of the material, which is due to the wavelength of light, being as small as possible with respect to the lens itself. In addition, a technique is also adopted in which the combination of lenses is optimized and an achromatic effect is utilized, thereby correcting the magnification chromatic aberration. However, in such a method in which, using the performance of the lens itself or the combinational structure thereof, correction is performed, the cost of the lens is increased. Therefore, for example, as a consumer device for which cost reduction tends to become important, the cost of a lens is increased, which is not desirable.

Therefore, image pickup devices have had functions in which magnification chromatic aberration is corrected using signal processing performed on captured-image signals. For example, in a method of the related art, with respect to an input image, the image is segmented into eight regions along a radial direction, and an edge is detected in the radial direction in each of the segmented regions. Next, a color shift amount in the detected edge portion is obtained, and furthermore, on the basis of the shift amount, a magnification difference in a different color image plane is calculated in each edge portion, for example. In addition, on the basis of a magnification difference having the highest occurrence rate, a pixel value at a position displaced from a processing-target pixel owing to the magnification chromatic aberration is obtained, and the pixel value is regarded as the pixel value of the processing-target pixel. An example of this method is disclosed in Japanese Unexamined Patent Application Publication No. 2006-20275 (FIG. 1).

In addition, in a second method of the related art, using a magnification difference calculated in each of eight segmented regions, magnification differences in four directions, namely, horizontal and vertical directions, are calculated. In addition, with respect to each of four image planes into which an image is segmented along the horizontal and vertical directions, the displacement vector of a color shift is obtained. An example of this method is disclosed in Japanese Unexamined Patent Application Publication No. 2006-20275 (FIG. 1).

In addition, as a third method of the related art, there has been adopted the following configuration for magnification chromatic aberration correction. Namely, a displacement amount is preliminarily calculated with respect to each pixel position, and furthermore, data of the displacement amount is stored, as correction data, in an image pickup device with being associated with each lens parameter. In addition, at the time of correction processing, using the correction data, a correction amount is obtained with respect to each pixel selected as a processing target. Next, on the basis of the correction amount, a pixel value at a position displaced from a processing-target pixel owing to the magnification chromatic aberration is obtained, and the pixel value is regarded as the pixel value of the processing-target pixel. An example of this method is disclosed in Japanese Unexamined Patent Application Publication No. 2006-135805 (FIG. 1).

SUMMARY OF THE INVENTION

There is the installation error of a lens optical system in an image pickup device, or the like, and hence, it is not necessarily the case that actual magnification chromatic aberration occurs in a concentric manner. The magnification chromatic aberration occurs in a concentric manner with an optical axis at the center, in theory, and the variation amount of magnification is also the same at a position at which an image height corresponding to a distance from the optical axis is the same. However, actually, the magnification chromatic aberration does not occur in an accurate concentric manner, and a pattern of the magnification chromatic aberration, in which the center thereof is biased, may occur. Namely, point symmetry as a concentric circle is not maintained, and the magnification chromatic aberration occurs in such a way that the variation amount of magnification varies depending on a radial direction even if the image height is the same.

In particular, in recent years, in order to promote reduction in size and weight in an image pickup device, a lens forming an imaging optical system also has tended to be miniaturized. Therefore, the curvature error of a lens, a refractive index error, the positional accuracy error (eccentricity) of a lens, or the like increases, and hence, in such a way as described, a situation occurs in which point symmetry is damaged and magnification chromatic aberration tends to occur.

The first method of the related art described above is based on an assumption that the center of a captured image is coincident with the optical axis and the magnification chromatic aberration occurs point-symmetrically. Therefore, it is difficult to deal with the magnification chromatic aberration occurring in a state in which point symmetry is not maintained, in such a way described above.

On the other hand, the second method of the related art may deal with the magnification chromatic aberration in which the center of a captured image is not coincident with the optical axis. However, it is necessary to further calculate magnification differences in four directions, namely, horizontal and vertical directions, on the basis of a result obtained by calculating a magnification difference in each of eight segmented regions, and also calculate displacement vectors. Therefore, a calculation amount increases substantially.

In view of this point, in the third method of the related art, a necessary calculation amount becomes smaller using correction data preliminarily stored. In this regard, however, it is necessary to store, as correction data, data of a horizontal displacement amount and a vertical displacement amount with respect to each of all pixels with associating the data of a horizontal displacement amount and a vertical displacement amount with each lens parameter, and hence the third method is in a disadvantageous place in terms of a large amount of data to be stored for magnification chromatic aberration correction. In addition, since correction data is preliminarily defined in a single uniform way, the third method is in the same place as the first method of the related art, in view of the fact that it is difficult to deal with the individual variability of a lens. In this regard, however, for example, if, at the time of production, the amount of the occurrence of magnification chromatic aberration is measured with respect to each image pickup device, and correction data obtained on the basis of the measurement result is stored, it is possible to deal with the individual variability of a lens. However, such an operation performed at the time of production leads to the reduction of the effect of quantity production, and is not realistic. In addition, actually, for example, it is necessary to store, in an image pickup device of the same model, correction data obtained on the basis of an established standard. In addition, even if, in such a way described above, correction data obtained on the basis of the measurement result of the amount of the occurrence of magnification chromatic aberration measured with respect to each image pickup device is stored to deal with the individual variability of a lens, a problem that an amount of data increases is not solved.

Accordingly, it is difficult for the first method of the related art to perform magnification chromatic aberration correction for dealing with the individual variability of a lens. However, when, using the second or third of the related art, the individual variability of a lens is dealt with, it is necessary to increase a calculation amount or an amount of correction data to be stored.

The present invention addresses the above-mentioned situations, and it is desirable to perform magnification chromatic aberration correction for dealing with a pattern of aberration occurrence in which point symmetry is damaged owing to the individual variability of a lens, with a small amount of correction data and a small calculation amount.

According to an embodiment of the present invention, there is provided an image processing device including a concentric aberration correction amount calculation unit configured to calculate, with respect to a processing-target pixel in an input image signal, a concentric aberration correction amount for concentric aberration that is a component of magnification chromatic aberration, the concentric aberration causing a color shift to occur in a concentric manner from the center of an image; a uniform aberration correction amount calculation unit configured to calculate, with respect to the processing-target pixel, a uniform aberration correction amount for uniform aberration that is a component of magnification chromatic aberration, the uniform aberration causing a color shift direction and a color shift amount to uniformly occur on a whole image; and a pixel value correction unit configured to correct a pixel value of the processing-target pixel on the basis of the calculated concentric aberration correction amount and the calculated uniform aberration correction amount. Accordingly, the image processing device produces the effect that the magnification chromatic aberration in a state in which the center is biased, which occurs owing to the individual variability of a lens or the like, is corrected on the basis of correction for a concentric aberration component and correction for a uniform aberration component.

In addition, the image processing device may further include a concentric aberration correction data holding unit configured to hold, as concentric aberration correction amount data, the concentric aberration correction amount corresponding to each concentric aberration condition including at least a combination of a color of light and an image height; and a uniform aberration correction data holding unit configured to hold, as uniform aberration correction amount data, the uniform aberration correction amount corresponding to each concentric aberration condition including at least a color of light, wherein the concentric aberration correction amount calculation unit selects the concentric aberration correction amount data corresponding to the concentric aberration condition to which the processing-target pixel corresponds, and calculates the concentric aberration correction amount using the selected concentric aberration correction amount data, and the uniform aberration correction amount calculation unit selects the uniform aberration correction amount data corresponding to the uniform aberration condition to which the processing-target pixel corresponds, and calculates the uniform aberration correction amount using the selected uniform aberration correction amount data. Accordingly, the image processing device produces the effect that pixel correction for the magnification chromatic aberration is performed using the concentric aberration correction amount data and the uniform aberration correction amount data, preliminarily stored.

In addition, in the image processing device, the concentric aberration correction amount data may indicate a correction amount corresponding to a color shift amount in an image height direction, which occurs in response to the concentric aberration condition, and the uniform aberration correction amount data may indicate a correction amount corresponding to a color shift amount and a color shift direction which occur in response to the uniform aberration condition. Accordingly, the image processing device produces the effect that the concentric aberration correction amount data including a color shift amount only corresponding to an image height direction is held and the concentric aberration correction amount data including a color shift and a color shift direction, which correspond to each uniform aberration condition, is held.

In addition, in the image processing device, the uniform aberration correction amount data may include a horizontal direction correction amount obtained in response to a horizontal direction color shift amount measured in a predetermined region as a target, the predetermined region including a virtual vertical line passing through a central portion of a captured image, and a vertical direction correction amount obtained in response to a vertical direction color shift amount measured in a predetermined region as a target, the predetermined region including a virtual horizontal line passing through the central portion of the captured image. Accordingly, the image processing device produces the effect that a color shift amount and a color shift direction, indicated by the uniform aberration correction amount data, are measured using a region in which no concentric aberration occurs in the captured image.

In addition, in the image processing device, the concentric aberration correction amount data may indicate a correction amount corresponding to the concentric aberration condition including a combination of a color of light, an image height, and predetermined lens control information used when an image to be a source of the input image signal is captured, and the uniform aberration correction amount data may indicate a correction amount corresponding to the uniform aberration condition including a combination of a color of light and predetermined lens control information used when an image of the input image signal is captured. Accordingly, the image processing device produces the effect that pixel correction for the magnification chromatic aberration is performed on the basis of the concentric aberration correction amount data and the uniform aberration correction amount data according to the state of lens control.

In addition, in the image processing device, the lens control information may be information indicating a control state of each of one or more predetermined movable portions in a lens unit. Accordingly, the image processing device produces the effect that pixel correction for the magnification chromatic aberration is performed on the basis of the concentric aberration correction amount data and the uniform aberration correction amount data according to, for example, aperture control, focus control, and zoom control in the lens unit.

In addition, in the image processing device, the concentric aberration correction amount data may be calculated from simulation based on a characteristic of a lens. Accordingly, the image processing device produces the effect that the uniform aberration correction amount data is obtained from the simulation.

In addition, the image processing device may further includes a uniform aberration component-associated edge detection unit configured to detect an edge corresponding to the uniform aberration from the input image signal; and a concentric aberration component-associated edge detection unit configured to detect an edge corresponding to the concentric aberration from the input image signal a pixel value of which has been corrected by the pixel value correction unit on the basis of the uniform aberration correction amount, wherein the uniform aberration correction amount calculation unit calculates a uniform aberration correction amount for the processing-target pixel on the basis of a color shift amount occurring, owing to uniform aberration, in each edge detected by the uniform aberration component-associated edge detection unit, the concentric aberration correction amount calculation unit calculates a concentric aberration correction amount for the processing-target pixel on the basis of a color shift amount occurring, owing to concentric aberration, in each edge detected by the concentric aberration component-associated edge detection unit, and the pixel value correction unit corrects, on the basis of the concentric aberration correction amount, a pixel value of the processing-target pixel that has been corrected on the basis of the uniform aberration correction amount. Accordingly, the image processing device produces the effect that the concentric aberration correction amount and the uniform aberration correction amount are calculated on the basis of a detection result of an edge of an input image signal generated from imaging.

In addition, in the image processing device, the uniform aberration component-associated edge detection unit may detect an edge in a vertical direction in the vicinity of an image portion in a horizontal radial direction in an image of the input image signal, and detects an edge in a horizontal direction in the vicinity of an image portion in a vertical radial direction in an image of the input image signal, and the concentric aberration component-associated edge detection unit may detect an edge in a radial direction in the vicinity of an image portion in each of at least one predetermined radial direction in an image of the input image signal. Accordingly, the image processing device produces the effect that an edge corresponding to the uniform aberration and an edge corresponding to the concentric aberration are individually detected from an input image signal generated from imaging.

In addition, in the image processing device, each of the uniform aberration component-associated edge detection unit and the concentric aberration component-associated edge detection unit may detect, with respect to each detected edge, a type of a change direction of a pixel value of the edge, the uniform aberration correction amount calculation unit may calculate the uniform aberration correction amount using a statistical result relating to a type of a change direction of a pixel value, detected by the uniform aberration component-associated edge detection unit, and the concentric aberration correction amount calculation unit may calculate the concentric aberration correction amount using a statistical result relating to a type of a change direction of a pixel value with respect to each detected edge, detected by the concentric aberration component-associated edge detection unit. Accordingly, the image processing device produces the effect that a pixel value is corrected in accordance with a difference between states of aberration individually occurring in the rising edge and the negative-going edge.

In addition, the image processing device may further include a concentric aberration correction data holding unit configured to hold, as concentric aberration correction amount data, the concentric aberration correction amount corresponding to each concentric aberration condition including at least a combination of a color of light and an image height; and a uniform aberration component-associated edge detection unit configured to detect an edge corresponding to the uniform aberration from the input image signal, wherein the concentric aberration correction amount calculation unit selects the concentric aberration correction amount data corresponding to the concentric aberration condition to which the processing-target pixel corresponds, and calculates the concentric aberration correction amount using the selected concentric aberration correction amount data, and the uniform aberration correction amount calculation unit calculates a uniform aberration correction amount for the processing-target pixel on the basis of a color shift amount occurring, owing to uniform aberration, in each edge detected by the uniform aberration component-associated edge detection unit. Accordingly, the image processing device produces the effect that, as the magnification chromatic aberration correction, correction for a concentric aberration component is performed using the preliminarily stored concentric aberration correction amount data and correction for a uniform aberration component is performed using a correction amount calculated from a detection result of an edge of an input image signal based on imaging.

BRIEF DESCRIPTION OF THE DRAWINGS

FIG. 1 is a diagram illustrating an example of a configuration of a video camera according to an embodiment of the present invention;

FIG. 2 is a diagram illustrating an example of a configuration of a camera signal processing unit according to an embodiment of the present invention;

FIGS. 5A to 5C are diagrams for explaining a concentric aberration component and a uniform aberration component that form magnification chromatic aberration in an embodiment of the present invention;

FIG. 26 is a diagram illustrating an example of line image intensity distribution on a position other than the optical axis;

FIG. 28 is a diagram illustrating an example of a configuration of a magnification chromatic aberration correction unit according to a third embodiment of the present invention;

DESCRIPTION OF THE PREFERRED EMBODIMENTS

Figure 3A:
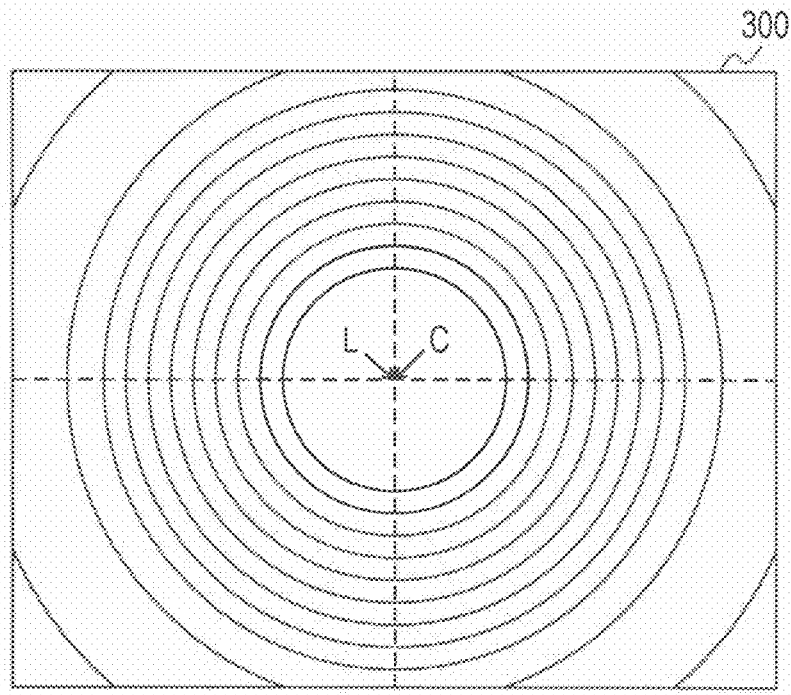
FIGS. 3A and 3B are diagrams for explaining a basic pattern of occurrence of magnification chromatic aberration.

Hereinafter, preferred embodiments (referred to as embodiments, hereinafter) of the present invention will be described in detail with reference to figures. The description will be provided in the following order.

1. First Embodiment (Magnification Chromatic Aberration Correction Processing: an example in which a correction amount is obtained using a correction data table)
2. Second Embodiment (Magnification Chromatic Aberration Correction Processing: an example in which a correction amount is obtained from a captured-image signal)
3. Third Embodiment (Magnification Chromatic Aberration Correction Processing: an example in which a concentric aberration correction amount is obtained using a correction data table and a uniform aberration correction amount is obtained from a captured-image signal)
4. Example of Modification

1. First Embodiment

Example of Configuration of Video Camera

FIG. 1 is a diagram illustrating an example of the configuration of a video camera 100 as an example in which an embodiment of the present invention is realized. The video camera 100 includes an optical lens unit 101, a camera control unit 102, a photoelectric conversion unit 103, a camera signal processing unit 200, an image signal processing unit 104, an image input-output unit 105, a display unit 106, an audio processing unit 107, an audio input-output unit 108, an operation input unit 109, and a communication unit 110. In addition, the video camera 100 includes a central processing unit (CPU) 111, a random access memory 112 (RAM), a read only memory (ROM) 113, a medium driver 115, and a power supply unit 114.

The optical lens unit 101 includes therein a lens group used for imaging a subject, an aperture adjusting mechanism, a focus adjusting mechanism, a zoom mechanism, a shutter mechanism, a hand-shake correction mechanism, and the like. The camera control unit 102 receives a control signal from the CPU 111, and generates a control signal to be supplied to the optical lens unit 101. In addition, the camera control unit 102 supplies the generated control signal to the optical lens unit 101, and performs control operations such as zoom control, focus control, shutter control, exposure control, and the like.

The photoelectric conversion unit 103 includes an imaging element, and, on the imaging plane thereof, an image passing through the optical lens unit 101 is formed. In addition, as the imaging element, a charge coupled device (CCD) sensor, a complementary metal oxide semiconductor (CMOS) sensor, or the like may be adopted. The photoelectric conversion unit 103 converts the subject image formed on the imaging plane into an image signal, and supplies the image signal to the camera signal processing unit 200.

For example, the image signal input to the camera signal processing unit 200 is an image signal having a format called RAW image data yet to be subjected to color interpolation processing such as demosaic processing and the like. The camera signal processing unit 200 is a portion that subjects the image signal having the RAW data format to necessary image signal processing operations such as the above-described color interpolation processing, various kinds of correction, and the like. In an embodiment of the present invention, the camera signal processing unit 200 performs image signal processing for magnification chromatic aberration correction. The image signal subjected to the processing performed by the camera signal processing unit 200 is supplied to the image signal processing unit 104.

For example, the image signal processing unit 104 is a portion that mainly performs image signal processing relating to display and recording/reproduction on the supplied image signal. For example, the image signal processing unit 104 can perform image compression processing, based on a compression method such as Moving Picture Experts Group (MPEG) or the like, on the input image signal.

In addition, the image signal processing unit 104 can generate an image signal having a predetermined format and output the image signal from the image input-output unit 105 to the outside thereof. In addition, the image input-output unit 105 can input an image signal having a predetermined format from the outside. The image signal processing unit 104 can perform size conversion and the like on the image signal input from the image input-output unit 105, and the image signal processing unit 104 can cause the display unit 106 to display the image signal. In addition, the image signal processing unit 104 can convert the image signal input by the image input-output unit 105 into recording-use image data and supply the recording-use image data to the medium driver 115 through the CPU 111, for example.

In addition, the video camera 100 includes the audio processing unit 107 and the audio input-output unit 108, and hence the video camera 100 can input and output an audio signal. The audio input-output unit 108 is a portion that performs the input and output of the audio signal. First, the audio signal input from the audio input-output unit 108 is subjected to necessary audio signal processing in the audio processing unit 107. For example, compression processing based on a predetermined audio compression encoding method, or the like is performed. In addition, the audio input-output unit 108 can output to the outside an audio signal, which has a predetermined format and is supplied from the audio processing unit 107.

In this case, the CPU 111 can create an image/audio file having a predetermined format, on the basis of a compressed image signal supplied from the image signal processing unit 104 and compressed image signal data supplied from the audio processing unit 107. Here, for example, the image/audio file is a video file complying with a format in which an audio signal is reproduced in synchronization with a motion picture.

For example, data of the image/audio file is supplied, as write data, to the medium driver 115, on the basis of the control of the CPU 111. The medium driver 115 includes a configuration in which, in collaboration with the CPU 111, data can be written into and read out from a medium (storage medium) 116 in a physical layer level, for example. In addition, for example, as the medium 116, a magnetic disk, an optical disk, a magneto-optical disk, a semiconductor memory, or the like may be used. For example, the medium 116 may be fixedly embedded into the video camera 100. In addition, the medium 116 may be a medium, which can be inserted into and removed from the video camera 100 and has a removable format complying with a predetermined standard.

In response to the transfer of recording data, performed for recording of a file, the medium driver 115 performs processing for writing the recording data into the medium 116 selected as a control target. In addition, for example, the data recorded in the medium 116 is managed in units of files on the basis of a predetermined type of a file system.

In addition, for example, when an image/audio file is reproduced as the reproduction of a file recorded in the medium 116, the CPU 111 and the medium driver 115 access a medium in which a designated image/audio file is recorded, and reads out the image/audio file. The image/audio file read out in such a way is separated into compressed image signal data and compressed audio signal data on the basis of, for example, the processing of the CPU 111. On that basis, the compressed image signal data is transferred to the image signal processing unit 104, and the compressed audio signal is transferred to the audio processing unit 107.

In this case, the image signal processing unit 104 and the audio processing unit 107 perform necessary reproduction signal processing operations including demodulation processing operations on the compressed image signal data and the compressed audio signal data, transferred in such a way as described above, respectively. Accordingly, an image obtained by reproducing the compressed video data can be displayed on the display unit 106. In addition, in synchronization with the reproduction time of the image, an audio signal obtained by reproducing the compressed audio signal data can be output as sound, using a speaker included in the audio input-output unit 108, or output from a headphone terminal.

By executing a program, the CPU 111 performs various kinds of control processing operations with respect to the video camera 100. The RAM 112 is used as a working area (working memory) used when the CPU 111 performs processing in accordance with the program. The ROM 113 is a portion that stores therein various kinds of setting information or the like, used by the CPU 111 for performing processing, in addition to various kinds of programs executed by the CPU 111.

In this case, it is assumed that the operation input unit 109 collectively indicates various kinds of operation portions included in the video camera 100. For example, operation portions in the operation input unit 109 include a recording button operated in response to the start and stop of recording of a captured image, an operation portion for selecting an imaging mode or the like, an operation portion for changing various kinds of parameters, and the like.

The communication unit 110 is a portion for performing communication with an external device with a predetermined data communication method, in response to the control of the CPU 111. The data communication method to which the communication unit 110 corresponds is not limited to specific communication, regardless of wired communication and wireless communication, and the number of corresponding data communication methods is also not limited to a specific number. Under present circumstances, as a wired data communication method, a network such as Ethernet (registered trademark) may be cited. In addition, a data interface standard such as a universal serial bus (USB), Institute of Electrical and Electronic Engineers (IEEE) 1394, or the like may be cited. In addition, as a wireless data communication method, inter-device near field wireless communication such as Bluetooth (registered trademark) or the like, or a wireless local area network (LAN) standard such as IEEE802.11a/b/g or the like may be cited.

The power supply unit 114 supplies operation power to various kinds of hardware devices in the video camera 100, and includes a power supply circuit or the like that receives power supply from a battery or a power supply adapter and operates, for example.

In addition, for example, an embodiment of the present invention may also be realized using a digital still camera, in place of the video camera 100 illustrated in FIG. 1.

[Example of Configuration of Camera Signal Processing Unit]

FIG. 2 illustrates an example of the configuration of the camera signal processing unit 200 illustrated in FIG. 1. The camera signal processing unit 200 illustrated in this figure includes a former-stage signal processing unit 201, a magnification chromatic aberration correction unit 210, and a subsequent-stage signal processing unit 202.

For example, the former-stage signal processing unit 201 is a portion that performs correction processing operations such as black level correction, gain correction, and the like on an input image signal having the RAW image data format. The magnification chromatic aberration correction unit 210 is a portion that inputs, as a correction-target image signal, the image signal having the RAW image data format, subjected to processing performed in the former-stage signal processing unit 201, and performs image signal processing for magnification chromatic aberration correction on the image signal. In addition, the image signal processing for the magnification chromatic aberration correction performed by the magnification chromatic aberration correction unit 210 will be described later. The subsequent-stage signal processing unit 202 is a portion that inputs an aberration-corrected image signal subjected to processing performed in the magnification chromatic aberration correction unit 210, and performs image signal processing operations such as color conversion, color interpolation processing, gamma correction, and the like on the aberration-corrected image signal.

[Magnification Chromatic Aberration]

Figure 3B:
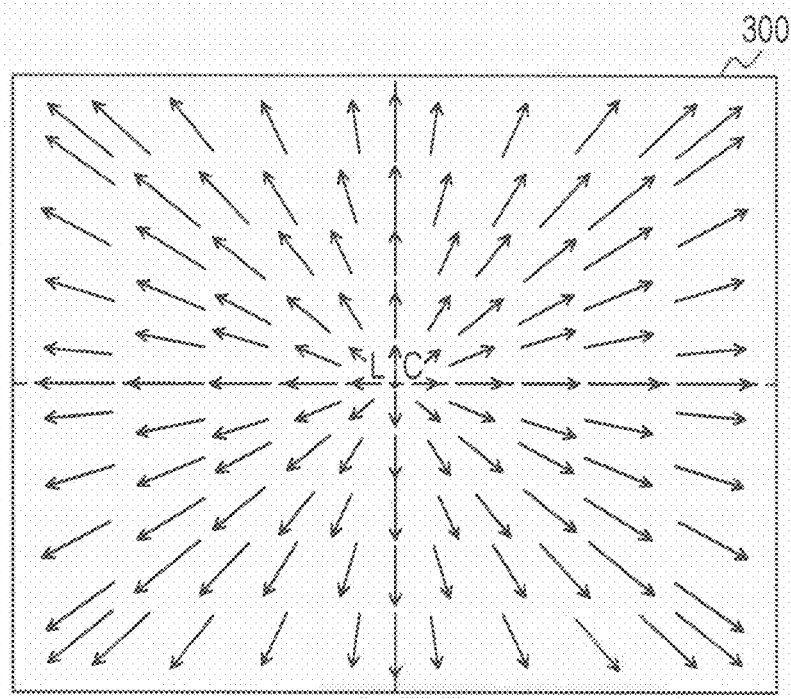

A phenomenon, in which, owing to the refractive index of a lens varying depending on the wavelength of light, the magnification of an image varies depending on the color of light and hence a color shift occurs, is called magnification chromatic aberration. FIGS. 3A and 3B schematically illustrate the state of magnification chromatic aberration occurring on an image plane 300 of a captured image. As the magnification chromatic aberration occurring on the image plane 300, FIG. 3A illustrates the magnitude of the color shift thereof, using a contour line. In addition, with respect to the same state of occurrence of the magnification chromatic aberration as in FIG. 3A, FIG. 3B illustrates the magnitude and the direction of the color shift using a vector. In addition, in FIGS. 3A and 3B, a state is illustrated in which the center C of the image plane 300 (the intersection of lines passing through the centers of the vertical direction and the horizontal direction on the image plane 300, respectively) is coincident with the optical axis L of a lens. As illustrated in FIGS. 3A and 3B, in a normal situation, the magnification chromatic aberration is a phenomenon in which the color shift occurs in a concentric manner with the optical axis at the center. In addition, a color shift amount increases with an increase in an image height from the optical axis, for example.

As illustrated in FIGS. 3A and 3B, the optical axis L of the lens is coincident with the center C of the image plane 300, and the color shift occurs in a concentric circle with the optical axis L of the lens at the center, namely, in a point-symmetric manner. However, in an actual image pickup device, owing to the installation error of a lens in an imaging optical system, the optical axis L of the lens and the center C of the image plane 300 are misaligned or the point symmetry of a color shift amount is lost. Therefore, in some case, magnification chromatic aberration may occur in a state in which the pattern of a color shift is biased.

Figure 4A:
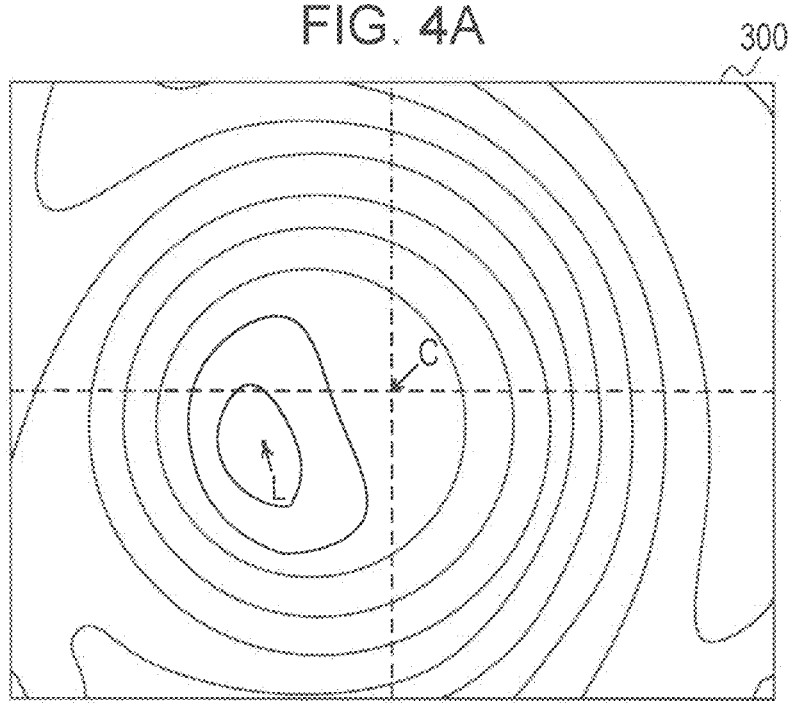
FIGS. 4A and 4B are diagrams for explaining an actual pattern of occurrence of magnification chromatic aberration occurring owing to individual variability of a lens.
Figure 4B:
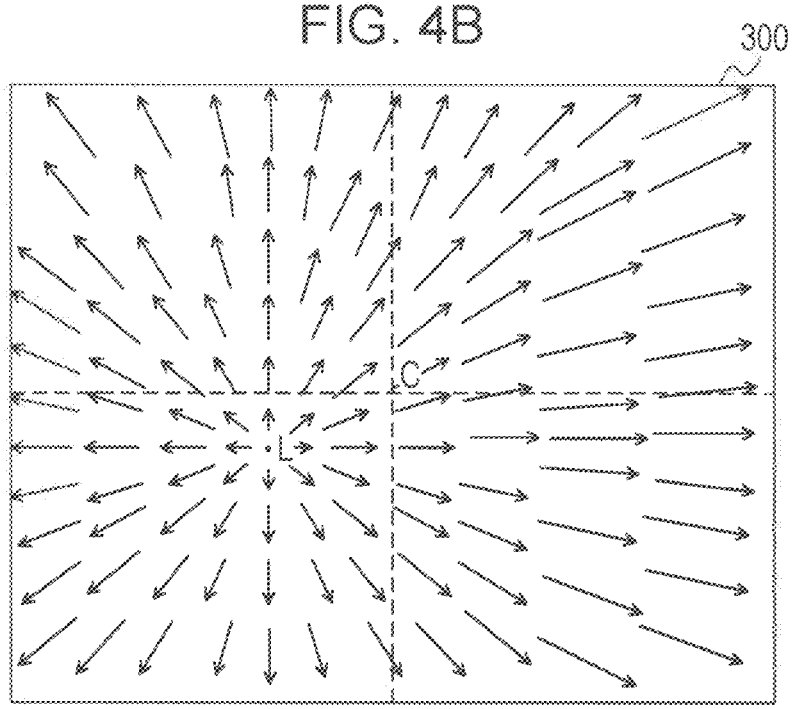

FIGS. 4A and 4B illustrate an example of the state of occurrence of magnification chromatic aberration in which the pattern of a color shift is biased. First, the magnification chromatic aberration illustrated in FIGS. 4A and 4B is in a state in which the optical axis L is out of the center C of the image. For example, this means that image heights are different between image positions located at the same distance from the center C in the image plane 300. In addition, for example, as illustrated in FIG. 4A, the concentric shape of a contour line indicating a shift amount with the optical axis L at the center is distorted. Namely, the point symmetry of a color shift amount due to the magnification chromatic aberration is lost. For example, according to an embodiment of the present invention, the magnification chromatic aberration is corrected also in response to a state in which a color shift pattern is biased as illustrated in FIGS. 4A and 4B. Hereinafter, this point will be described.

[Expression Method for Magnification Chromatic Aberration in Embodiment of Present Invention]

First, in an embodiment of the present invention, it is assumed that magnification chromatic aberration is approximately expressed as follows. In the same way as in FIG. 4B, using a vector, FIG. 5A illustrates the amount and the direction of a color shift in the image plane 300 on which magnification chromatic aberration occurs in a state in which a color shift pattern is biased. In an embodiment of the present invention, the magnification chromatic aberration is approximately expressed under the condition that the magnification chromatic aberration in which the color shift pattern is biased, illustrated in FIG. 5A, is separated into an aberration component illustrated in the image plane 300 in FIG. 5B and an aberration component illustrated in the image plane 300 in FIG. 5C.

As illustrated in FIG. 5B, the aberration component illustrated in FIG. 5B is an aberration component that appears in such a way that a color shift amount is point-symmetric with the center C of the image plane 300 at the center, in a state in which the center C of the image plane 300 is coincident with the optical axis L. In addition, for example, the color shift amount varies so as to increase with an increase in an image height (a distance from the optical axis L). Is may be considered that this is an aberration component which appears depending only on the characteristic of a lens with the individual variability factor of the lens such as the installation error thereof or the like being excluded. In addition, in the present specification, hereinafter, the aberration illustrated in FIG. 5B is referred to as "concentric aberration".

In addition, the aberration component illustrated in FIG. 5C is an aberration component that appears in such a way that the vector of a color shift is the same in the whole image plane 300. Namely, with respect to the aberration component, in any part of the image plane 300, the color shift amount thereof is the same and the color shift direction thereof is also the same. It may be considered that this is an aberration component that uniformly appears in the whole image plane without depending on the position of the optical axis L and the image height. The aberration component is an aberration component that appears depending on the existence of an installation error, for example. In addition, in the present specification, hereinafter, the aberration illustrated in FIG. 5C is referred to as "uniform aberration".

[Description of Occurrence of Uniform Aberration Component]

In a normal situation, since there is a difference in thickness between the center and the edge of a lens, and hence a color shift amount varies depending on an image height, the magnification chromatic aberration occurs. However, as described above, in the magnification chromatic aberration in a state in which the pattern of a color shift is biased, when correction is simply performed only on the concentric aberration component, adequate correction effect is not obtained.

Accordingly, the inventors of the present application carried out a test on the basis of the assumption that the magnification chromatic aberration in a state in which the pattern of a color shift is biased occurs owing to the occurrence of the uniform aberration component illustrated in FIG. 5C in addition to the concentric aberration illustrated in FIG. 5B. Namely, the inventors of the present application carried out a test in which the magnification chromatic aberration correction is performed in a configuration in which the correction of the concentric aberration component is used in combination with the correction of the uniform aberration component. As the test result, for example, it was confirmed that adequate practicable correction effect is obtained.

The above-mention occurrence of the uniform aberration component can be described as follows. The point will be described with reference to FIG. 6 and FIG. 7. It may be considered that an installation error to become the variability factor of a lens includes an eccentricity element due to the shift of the optical axis of a lens from its proper position in a planar direction and an inclination element due to the shift of the optical axis of the lens from its proper angle, for example.

First, with reference to FIG. 6, the occurrence of the uniform aberration component corresponding to the eccentricity of a lens will be described. Here, for example, the position of a lens 101a, indicated by a dashed line, corresponds to a proper positional state in which there is no eccentricity. In such a state, it is assumed that the image heights of green (G) light and red (R) light obtained in accordance with an object height y0 are $y_g$ and $y_r$, respectively. At this time, the lateral magnification ratios βg and βr of the lens 101a corresponding to the G light and the R light, respectively, are represented by the following expressions.

$$\beta g = y_g/y_0$$

$$\beta r = y_r/y_0$$

In addition, on the basis of the above expressions, the image heights $y_g$ and $y_r$ of the G light and the R light are represented by the following expressions, respectively.

$$y_g = y_0 \cdot \beta g$$

$$y_r = y_0 \cdot \beta r$$

Net, by obtaining a difference between the two expressions illustrated above, the color shift amount (magnification chromatic aberration amount) Δy1 of the R light with respect to the G light in a state in which there is no eccentricity can be obtained in accordance with the following expression.

$$\Delta y_1 = y_r - y_g = y_0 \cdot (\beta r - \beta g)$$

The above expression is a function relating to the object height $y_0$. In response to the change of the object height y0, the image heights yg and yr also change. Accordingly, the above expression indicates that the color shift amount in a state in which there is no eccentricity changes in response to a distance from an image height.

Next, a state is assumed in which eccentricity due to a displacement amount Δshift is created by moving the lens 101a from a position indicated by a dashed line to a position indicated by a solid line. At this time, an object height $y_{01}$ where the image focus location of the G light is the same as in a state before the eccentricity is obtained on the basis of the above-mentioned expressions representing the image heights $y_g$ and $y_r$, in accordance with the following expressions.

$$y_g - \Delta \text{shift} = (y_{01}) \cdot \beta g$$

$$y_{01} = (y_g - \Delta \text{shift})/\beta g$$

In addition, the image focus location $y_{r1}$ of the R light at this time is obtained on the basis of the above-mentioned expressions representing the image heights $y_g$ and $y_r$, and the above expression, in accordance with the following expressions.

$$y_{r1} - \Delta \text{shift} = y_{01} \cdot \beta r$$

$$y_{r1} = \beta r \cdot (y_g - \Delta \text{shift})/\beta g + \beta \text{shift}$$

Accordingly, the color shift amount $\Delta y_2$ of the R light with respect to the G light after the eccentricity can be obtained in accordance with the following expression.

$$\Delta y_2 = y_{r1} - y_g$$
$$= (yg \cdot (\beta r - \beta g)/\beta g) - (\beta r \cdot \Delta \text{shift})/\beta g + \Delta \text{shift}$$
$$= (\beta r - \beta g) \cdot y_0 + ((\beta g - \beta r)/\beta g) \cdot \Delta \text{shift}$$

In addition, in the same way as the above-mentioned calculation expression of the color shift amount Δy1 before the eccentricity, the above expression is also the function of the object height y0, and accordingly, it is indicated that the color shift amount Δy2 after the eccentricity also changes depending on an image height.

In addition, a difference between the color shift amounts before and after the eccentricity, namely, a color shift variation amount, can be represented in accordance with the following expression.

$$\Delta y_2 - \Delta y_1 = ((\beta g - \beta r)/\beta g) \cdot \Delta \text{shift}$$

Here, on the right-hand side of the above expression, a term the coefficient of which is the object height y0 is eliminated. Namely, the above expression indicates that the variation amount of a color shift between before and after the eccentricity does not change depending on an image height but changes depending only on the eccentricity amount (Δshift). In addition, this indicates that, depending on the eccentricity of a lens, a color shift uniformly occurs in the same color shift direction and with the same color shift amount in the whole image plane. Namely, it is indicated that the uniform aberration component occurs.

Next, with reference to FIG. 7, the occurrence of the uniform aberration component corresponding to the inclination of a lens will be described. Here, for example, the position of the lens 101a, indicated by a dashed line, corresponds to a proper positional state in which no inclination occurs. In such a state, the color shift amount Δy1 of the R light with respect to the G light is represented by the above-mentioned calculation expression of the color shift amount Δy1.

Next, a state is assumed in which the lens 101a is inclined in such a way that its optical axis is pointed in a direction to which an angle θ is given with respect to its optical axis in a positional state indicated by a dashed line. At this time, under the condition that a distance from the lens 101a to an image plane is "s", the object height y01 where the image focus location of the G light is the same as in a state before the eccentricity is obtained on the basis of the above-mentioned expressions representing the image heights $y_g$ and $y_r$, in accordance with the following expression.

$$y_{01} = (y_g \cdot \cos \theta - s \cdot \sin \theta)/\beta g$$

In addition, the image focus location yr1 of the R light at this time is obtained on the basis of the above-mentioned expressions representing the image heights yg and yr and the above expression, in accordance with the following expressions.

$$y_{r1} \cdot \cos\theta - s \cdot \sin\theta = (\beta r/\beta g) \cdot (y_g \cdot \cos\theta - s \cdot \sin\theta)$$

$$y_{r1} = (\beta r/\beta g) \cdot y_g + ((\beta g - \beta r)/\beta g) \cdot (s \cdot \tan\theta)$$

Accordingly, the color shift amount $\Delta y_2$ of the R light with respect to the G light after the inclination can be obtained in accordance with the following expression.

$$\Delta y_2 = y_{r1} - y_g$$
$$= (\beta r - \beta g) \cdot y_0 + ((\beta g - \beta r)/\beta g) \cdot (s \cdot \tan\theta)$$

The above expression is also the function of the object height y0, and accordingly, it is understood that the color shift amount Δy2 after the inclination also changes depending on the image height.

On that basis, a difference between the color shift amounts before and after the inclination can be represented in accordance with the following expression.

$$\Delta y_2 - \Delta y_1 = ((\beta g - \beta r)/\beta g) \cdot (s \cdot \tan\theta)$$

In addition, also in the above expression, a term the coefficient of which is the object height y0 is eliminated. Accordingly, the above expression indicates that the variation amount of a color shift does not change depending on the image height but changes depending only on the inclination angle θ of the optical axis. Namely, it is also indicated that the uniform aberration component occurs depending on the inclination of the lens.

Figure 6:
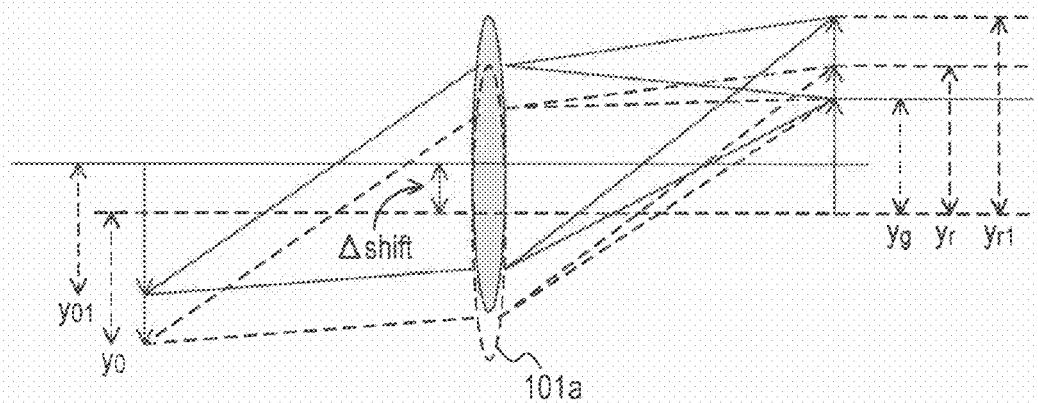
FIG. 6 is a diagram for explaining occurrence of a uniform aberration component.
Figure 7:
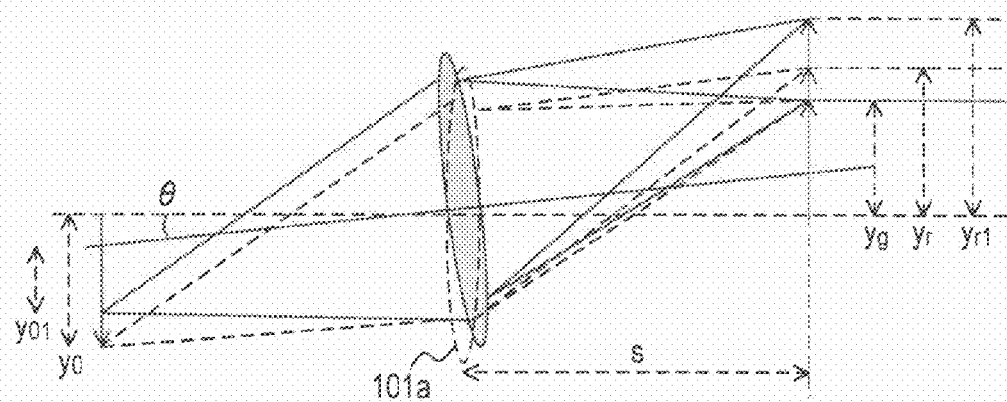
FIG. 7 is a diagram for explaining occurrence of a uniform aberration component.

In addition, on the basis of the descriptions of FIGS. 6 and 7, it may be considered that, even in a state in which both the eccentricity and the inclination of the lens occur owing to the actual installation error or the like of the lens, the uniform aberration component occurs in such a way that the color shift amount thereof is determined on the basis of the eccentricity amount and the inclination angle of the lens. In addition, it is considered that the uniform aberration component actually occurring in an image pickup device occurs as the sum of uniform aberration components each of which occurs owing to the eccentricity of each lens in a lens group.

[Configuration of Magnification Chromatic Aberration Correction Unit]

The magnification chromatic aberration correction unit 210 (FIG. 2) according to an embodiment of the present invention performs image signal processing for magnification chromatic aberration correction, on the assumption that the above-mentioned magnification chromatic aberration can be separated into the above-mentioned concentric aberration component and uniform aberration component. Hereinafter, examples of the configuration and the signal processing of the magnification chromatic aberration correction unit 210 in a first embodiment of the present invention will be described.

Figure 8:
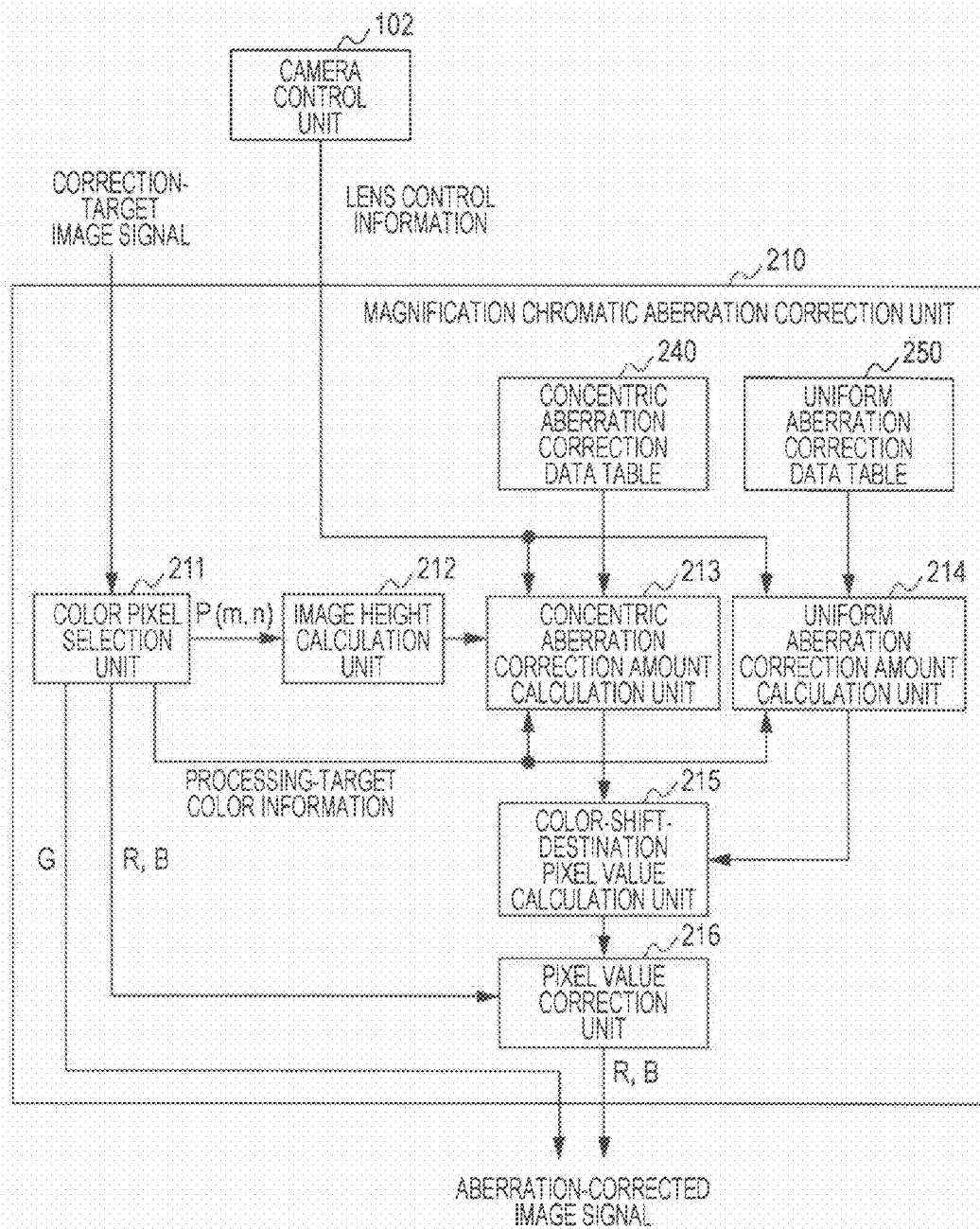
FIG. 8 is a diagram illustrating an example of a configuration of a magnification chromatic aberration correction unit according to a first embodiment of the present invention.

FIG. 8 illustrates an example of a configuration corresponding to the first embodiment of the present invention, as the magnification chromatic aberration correction unit 210 illustrated in FIG. 2. The magnification chromatic aberration correction unit 210 illustrated in FIG. 8 includes a color pixel selection unit 211, an image height calculation unit 212, a concentric aberration correction amount calculation unit 213, a uniform aberration correction amount calculation unit 214, a color-shift-destination pixel value calculation unit 215, and a pixel value correction unit 216. In addition, the magnification chromatic aberration correction unit 210 stores and holds a concentric aberration correction data table 240 and a uniform aberration correction data table 250.

As described above, the correction-target image signal input by the magnification chromatic aberration correction unit 210 has the RAW image data format, and includes color pixel signals individually corresponding to the colors of red (R), green (G), and blue (B) in accordance with the array of color filters for the pixels of a light-receiving element in the photoelectric conversion unit, for example. The color pixel selection unit 211 selects and extracts an R pixel signal and a B pixel signal from the input correction-target image signal, and sequentially outputs, with predetermined timing, to the pixel value correction unit 216 a pixel signal selected, as a processing-target pixel, from the R pixel signal and the B pixel signal, for example. In addition, the color pixel selection unit 211 selects and extracts a G pixel signal, and outputs the G pixel signal as the G signal component of an aberration-corrected pixel signal to be output from the magnification chromatic aberration correction unit 210. In addition, the magnification chromatic aberration correction unit 210 according to the first embodiment of the present invention corrects the pixel value of each of pixels forming an R image plane and pixels forming a B image plane that are targets. The color pixel selection unit 211 also outputs information of the coordinates P (m, n) of the processing-target pixel to the image height calculation unit 212. The color pixel selection unit 211 recognizes the coordinates of each pixel at the time of color pixel selection processing. Furthermore, the color pixel selection unit 211 outputs, to the concentric aberration correction amount calculation unit 213 and the uniform aberration correction amount calculation unit 214, processing-target color information indicating which of R and G the color of a pixel selected as a processing-target pixel is.

The image height calculation unit 212 is a portion that calculates an image height on an image plane, which corresponds to the coordinates P (m, n) of an input processing-target pixel.

The concentric aberration correction data table 240 is a table that stores therein correction data corresponding to a concentric aberration component. An example of the table structure of the concentric aberration correction data table 240 and an example of an acquisition method for the correction data to be stored therein will be described later. In addition, actually, the concentric aberration correction data table 240 is stored in a memory included in the magnification chromatic aberration correction unit 210, the ROM 113 illustrated in FIG. 1, or the like, for example. The memory and the ROM 113 are examples of concentric aberration correction data holding units described in the claims.

The concentric aberration correction amount calculation unit 213 is a portion that calculates a correction amount corresponding to the concentric aberration component. For this purpose, the concentric aberration correction amount calculation unit 213 inputs, as lens control information, an aperture value, a zoom position, and a focus position from the camera control unit 102, and inputs an image height value calculated in the image height calculation unit 212. Furthermore, the concentric aberration correction amount calculation unit 213 inputs processing-target color information from the color pixel selection unit 211.

In the lens control information, the aperture value indicates an aperture value set for an aperture stop included in the optical lens unit 101. The zoom position indicates the position of a zoom lens included in the optical lens unit 101. The focus position indicates the position of a focus lens included in the optical lens unit 101. While, as described above, the camera control unit 102 performs camera control operations such as the exposure control, the zoom control, the focus control, and the like, the camera control unit 102 calculates and holds, as the control result thereof, the aperture value, the zoom position, and the focus position.

In addition, the concentric aberration correction amount calculation unit 213 selects from the concentric aberration correction data table 240 a correction amount corresponding to a combination of the aperture value, the zoom position, the focus position, the image height value, and a color indicated by the processing-target color information. In addition, using the selected correction amount, the concentric aberration correction amount calculation unit 213 calculates a correction amount corresponding to the concentric aberration component.

The uniform aberration correction data table 250 is a table that stores therein a correction amount corresponding to the uniform aberration component. An example of the table structure of the uniform aberration correction data table 250 and an example of an acquisition method for the data of the correction amount to be stored therein will be described later. In addition, actually, the uniform aberration correction data table 250 is also stored in a memory included in the magnification chromatic aberration correction unit 210, the ROM 113 illustrated in FIG. 1, or the like, for example. The memory and the ROM 113 are examples of uniform aberration correction data holding units described in the claims.

The uniform aberration correction amount calculation unit 214 is a portion that calculates a correction amount corresponding to the uniform aberration component. For this purpose, the uniform aberration correction amount calculation unit 214 inputs aperture value information, zoom position information, and focus position information from the camera control unit 102. In addition, the uniform aberration correction amount calculation unit 214 inputs processing-target color information from the color pixel selection unit 211. In addition, the uniform aberration correction amount calculation unit 214 selects, from the uniform aberration correction data table 250, correction data corresponding to a combination of the aperture value information, the zoom position information, the focus position information, and a color indicated by the processing-target color information. In addition, using the selected correction amount, the uniform aberration correction amount calculation unit 214 calculates a correction amount corresponding to the uniform aberration component.

The color-shift-destination pixel value calculation unit 215 is a portion that calculates the pixel value of a color-shift-destination pixel, using the correction amount corresponding to the concentric aberration component and the correction amount corresponding to the uniform aberration component, calculated in such a way described above. The color-shift-destination pixel is a pixel on which light is actually focused owing to a shift due to the magnification chromatic aberration, the light being to be intrinsically focused on the position of the processing-target pixel.

The pixel value correction unit 216 performs processing for correcting the pixel value of each processing-target pixel. For this purpose, the pixel value correction unit 216 performs processing for rewriting the pixel value of the processing-target pixel with the pixel value of the color-shift-destination pixel calculated by the color-shift-destination pixel value calculation unit 215. A portion including the color-shift-destination pixel value calculation unit 215 and the pixel value correction unit 216 is an example of a pixel value correction unit described in the claim.

In addition, for example, a digital signal processor (DSP) or the like executes a program, and hence individual portions in the magnification chromatic aberration correction unit 210 illustrated in FIG. 8 are realized. In addition, at least a function of a portion in the magnification chromatic aberration correction unit 210 may be realized by the execution of a program by the CPU 111. In addition, individual portions or at least a function of a portion in the magnification chromatic aberration correction unit 210 may also be realized with hardware.

[Example of Structure of Concentric Aberration Correction Data Table]

Figure 9:
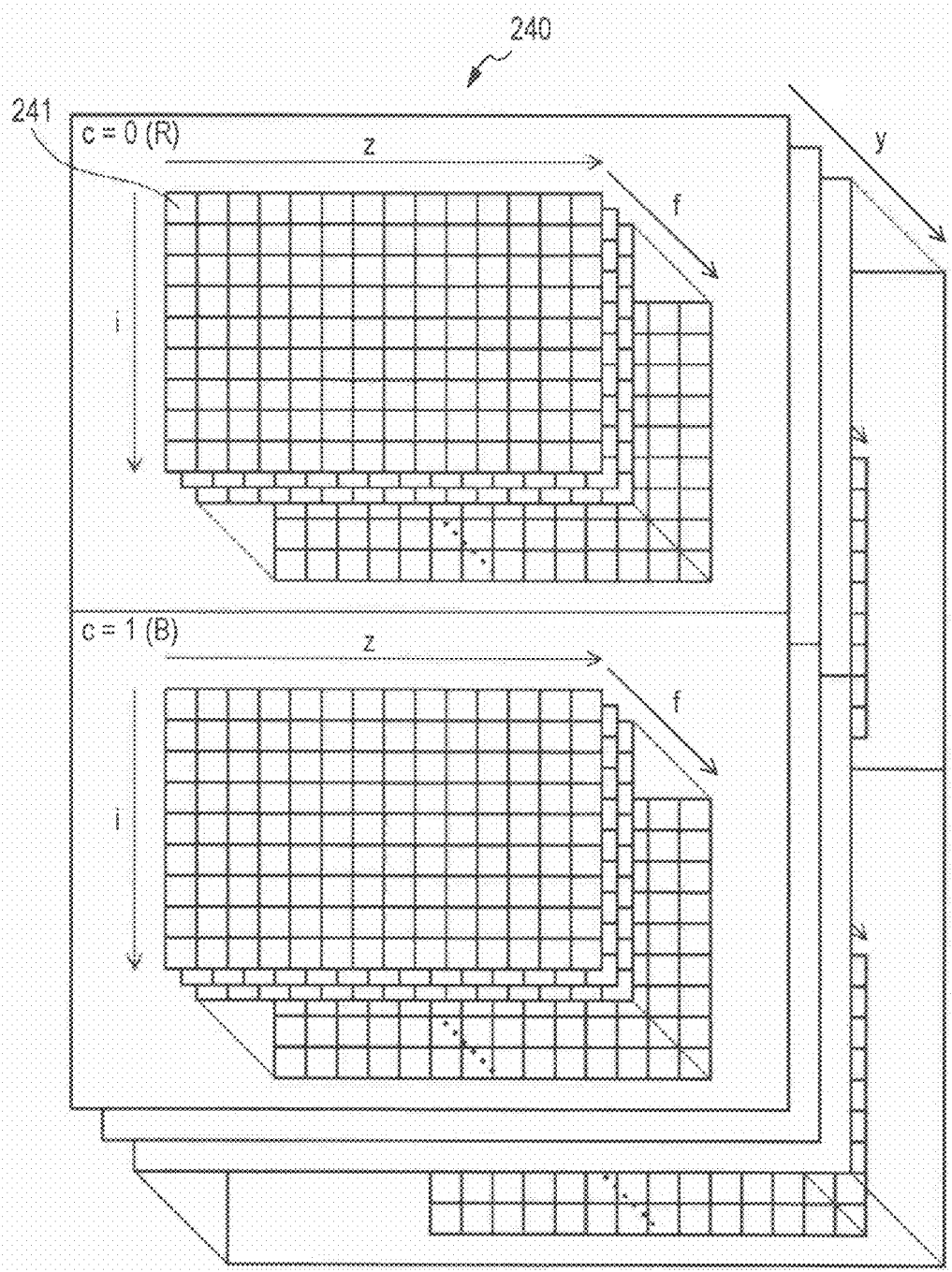
FIG. 9 is a diagram illustrating an example of a structure of a concentric aberration correction data table.

Next, with reference to FIG. 9, an example of the structure of the concentric aberration correction data table 240 will be described. FIG. 9 schematically illustrates an example of the structure of the concentric aberration correction data table 240. When this figure is described, it is assumed that a variable i ($0 \leq i < ni$) indicates an aperture value, a variable z ($0 \leq z < nz$) indicates a zoom position, a variable f ($0 \leq f < nf$) indicates a focus position, and a variable y ($0 \leq f < ny$) indicates an image height value. For example, each value of an actual aperture value, an actual zoom position, an actual focus position, and an actual image height value may have a fractional portion. However, it may be assumed that each of the aperture value, the zoom position, the focus position, and the image height value indicated by the variables i, z, f, and y is an integer number value. In addition, a variable c ($0 \leq c < 2$) indicates the color (processing-target color) of light to be a correction processing target. While the processing-target color includes two colors, R and B, here, it is assumed that the variable c indicates red (R) when the variable c is "0", and the variable c indicates blue (B) when the variable c is "1".

First, the concentric aberration correction data table 240 illustrated in this figure is generally segmented with respect to the individual processing-target colors of R and B indicated by the variable c. On that basis, first, for the processing-target color of R, a two-dimensional table is provided that stores therein (ni×nz) pieces of correction data 241, obtained in response to a matrix (combination) of the aperture value i and the zoom position z.

The pieces of correction data 241 in the above-mentioned two-dimensional table are values corresponding to one focus position. Therefore, in such a way as illustrated in this figure, nf two-dimensional tables are provided that store therein the correction data 241 obtained in response to individual focus positions f ranging from "0" to "nf−1". Accordingly, a three-dimensional table is obtained that stores therein the correction data 241 corresponding to the combination of the aperture value i, the zoom position z, and the focus position f.

In addition, the three-dimensional table described above is a table that corresponds to one image height value y. Therefore, in such a way as further illustrated in this figure, ny three-dimensional tables are prepared that stores therein pieces of correction data 241 individually corresponding to image height values y ranging from "0" to "ny−1". Accordingly, a four-dimensional table is obtained that stores therein the correction data 241 corresponding to the combination of the aperture value i, the zoom position z, the focus position f, and the image height value y. In addition, the four-dimensional table is also prepared in response to the processing-target color of B (c=1).

In this way, the concentric aberration correction data table 240 stores therein the correction data 241 obtained in response to each of the combinations of the aperture value i, the zoom position z, the focus position f, the image height value y, and the processing-target color c. Namely, the concentric aberration correction data table 240 has a structure as a five-dimensional table. Accordingly, the number of pieces of correction data 241 that form the concentric aberration correction data table 240 turns out to be (ni×nz×nf×ny×nc). The structure of the concentric aberration correction data table 240 means that a color shift amount occurring, as the concentric aberration component, along an image height direction varies depending on conditions of the optical system, such as the aperture stop, the zoom position, the focus position, and the like, and individual elements such as an image height and the color of light.

[Example of Acquisition Method for Correction Data Corresponding to Concentric Aberration Component]

Next, an example of an acquisition method for the correction data 241 in the concentric aberration correction data table 240 will be described. For example, the characteristic of a lens adopted for the optical lens unit 101 is a typical characteristic. This means that, for example, the variation of a color shift amount due to an image height in the concentric aberration illustrated in FIGS. 3A and 3B, or the like is also a typical characteristic of a lens. Therefore, by performing simulation on the basis of the characteristic of a lens, the correction data 241 forming the concentric aberration correction data table 240 can be obtained. More specifically, for example, the correction data 241 corresponding to R light is obtained as follows. Namely, with respect to R light and G light, simulation is performed under a combination condition of individual parameters such as one aperture value i, one zoom position z, one focus position f, and one image height value y, and the color shift amount of the R light with respect to the G light, obtained by this simulation, is calculated. In addition, a correction amount is calculated that can cancel the color shift amount and cause the position of the R light to coincide with the position of the G light, and the correction amount is defined as the above-mentioned correction data 241. By also performing this simulation with respect to each of combination conditions of all other parameters, all of the pieces of correction data 241 are obtained that correspond to the R light. In addition, in the same way, with respect to B light, simulation is performed for the B light and the G light with respect to each of combination conditions of the above-mentioned parameters, the color shift amount of the B light with respect to the G light is obtained, and hence the correction data 241 is obtained.

In addition, as described above in FIG. 5A, the concentric aberration component does not depend on the individual variability of the imaging optical system, and it is assumed that the shift amount of the concentric aberration component is determined depending only on the characteristic of a lens itself. On the basis of this, the concentric aberration correction data table 240 including the correction data 241 obtained on the basis of the simulation performed in such a way as described above may be commonly used for a product as the video camera 100, for example.

In addition, while the magnification chromatic aberration occurs not only in the R light and the B light but also in the G light, the magnification aberration correction may be performed so that the relative shifts of image focus locations between R, G, and B coincide with one another, for example. Therefore, in an embodiment of the present invention, it is assumed that the G light is used as a reference and the magnification chromatic aberration correction is performed so that the remaining R light and G light are focused on the same position as that of the G light, as a result. Therefore, in an embodiment of the present invention, when the correction data 241 is obtained, the color shift amounts of the R light and the B light with respect to the G light are obtained.

In addition, in the present specification, a "correction amount" is an "aberration correction amount" necessary for solving a color shift, and the unit thereof is magnification, a pixel value, a relative value for an image plane size, or the like. In addition, the color shift amount is a color shift amount occurring owing to aberration, and means "the amount of occurrence of aberration". In addition, the unit thereof is one of magnification, a pixel value, and a relative value for an image plane size.

While, in the above description, first, the color shift amount is obtained, and the correction data 241 as a correction amount is obtained on the basis of the obtained color shift amount, the color shift amount may be stored as the correction data 241 without change. In this case, after converting the color shift amount, represented as the correction data 241, into the correction amount, the concentric aberration correction amount calculation unit 213 may calculate the value of a correction amount necessary for actual processing, on the basis of the converted correction amount. Specifically, for example, if the magnification is the unit, a relationship between the correction amount and the color shift amount is represented by an equation, (correction amount=1/color shift amount). In addition, if the pixel value or the relative value for an image plane size is the unit, a relationship between the correction amount and the color shift amount is represented by an equation, (correction amount=−color shift amount). In any case, the two above relationships are simple, and accordingly, the conversion between the color shift amount and the correction amount can be easily performed with a quite small calculation amount.

[Example of Structure of Uniform Aberration Correction Data Table]

Figure 10:
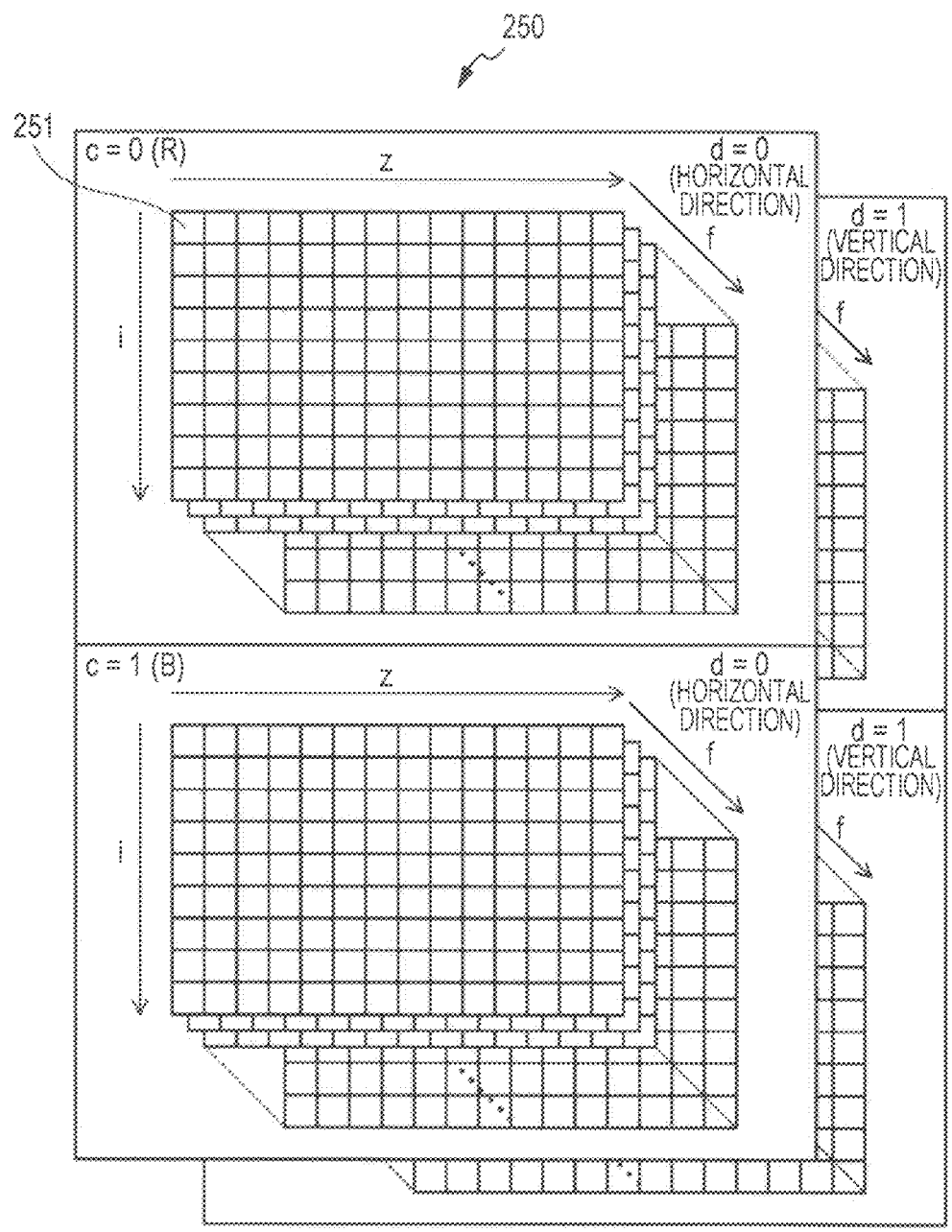
FIG. 10 is a diagram illustrating an example of a structure of a uniform aberration correction data table.

FIG. 10 illustrates an example of the structure of the uniform aberration correction data table 250. As illustrated in FIG. 10, the uniform aberration correction data table 250 stores therein correction data 251 corresponding to each combination of parameters such as an aperture value i, a zoom position z, a focus position f, a processing-target color c, and a correction amount direction component d. Namely, the uniform aberration correction data table 250 has a structure as a five-dimensional table.

While the color shift amount as the uniform aberration component changes depending on individual elements such as conditions of the optical system based on an aperture stop, a zoom position, and a focus position and the color of light, the color shift amount as the uniform aberration component does not change depending on the image height, as described above. Therefore, the uniform aberration correction data table 250 is formed as a table that does not include the correction data 251 based on the image height value y.

In addition, the uniform aberration component can be treated in such a way that a vector indicating the moving direction and displacement amount thereof is separated into a horizontal direction displacement amount component and a vertical direction displacement amount component. Therefore, in the uniform aberration correction data table 250, the correction amount direction component d corresponding to a horizontal direction and a vertical direction is set as a parameter.

In addition, image pickup devices having optical handshake correction functions have prevailed. In an optical handshake correction method, a lens group (optical antivibration lens group) used for changing an optical axis in response to the state of hand shake is driven so that the lens group is inclined in pan and tilt directions. Alternatively, the optical antivibration lens group is moved in a planar direction perpendicular to the optical axis. The change of the positional state of such an optical antivibration lens group as described above is also a factor that changes the color shift amount due to aberration. Therefore, when the video camera 100 includes an optical antivibration lens group, it may be assumed that the uniform aberration correction data table 250 has the following structure. Namely, it is assumed that the uniform aberration correction data table 250 has the structure of a six-dimensional table obtained by further combining the structure of the five-dimensional table illustrated in FIG. 10 with the parameter of the position of the optical antivibration lens group. In addition, in the same way, the concentric aberration correction data table 240 may also have the structure of a six-dimensional table obtained by further combining the structure of the five-dimensional table illustrated above in FIG. 9 with the parameter of the position of the optical antivibration lens group. In this regard, however, the change of the position of the optical antivibration lens group mainly affects a color shift amount due to the uniform aberration. Therefore, for example, the combination of the positional parameters of the optical antivibration lens group is highly effective for the uniform aberration correction.

In addition, as a hand-shake correction function, there is also a method in which an imager (corresponds to the photoelectric conversion unit 103 in FIG. 1) is driven in response to the state of hand shake so that the imager is moved along the plane direction thereof. In this case, in place of the above-mentioned positional parameter of the optical antivibration lens group, the position of the imager may be combined as a parameter.

In addition, as the combination of parameters used for forming the concentric aberration correction data table 240 and the uniform aberration correction data table 250, one of parameters illustrated in FIG. 9 and FIG. 10 may be excluded. Specifically, when a single focus lens is adopted, the zoom position z is fixed, and hence it is not necessary to combine the zoom position z as a parameter.

Furthermore, lens control information used for forming the concentric aberration correction data table 240 and the uniform aberration correction data table 250 is not limited to the examples cited above. In the above description, it is assumed that the lens control information includes the aperture stop, the zoom position, and the focus position. It may be assumed that these indicate the setting state of a movable portion in the optical lens unit 101 (FIG. 1). For example, when the optical lens unit 101 has a structure that includes some kind of a movable portion other than the aperture stop, the zoom position, and the focus position, a parameter of information indicating the setting state of the movable portion may be combined.

[Example of Acquisition Method for Correction Data Corresponding to Uniform Aberration Component]

An example of an acquisition method for the correction data 251 in the uniform aberration correction data table 250 will be described. The color shift amount as the concentric aberration component does not depend on individual variability due to the installation error of the imaging optical system or the like. On the other hand, the uniform aberration component occurs depending on the installation error of the imaging optical system or the like, and the color shift amount thereof changes depending on the individual variability, as understood also on the basis of the descriptions of FIG. 6 and FIG. 7. Therefore, in order to obtain the correction data 251 in the uniform aberration correction data table 250, it is necessary to perform measurement and analysis for each product in a production process, for example.

Then, a specific example of a method for obtaining the correction data 251 will be described. First, as a first example, for example, with respect to an aperture value i, a zoom position z, and a focus position f, typical mi values, typical mz values, and typical mf values are preliminarily defined, respectively. In addition, with respect to each combination pattern of these aperture value i, zoom position z, and focus position f, the correction data 251 is obtained as follows. Namely, the color shift amount of each of R light and B light with respect to G light, which occurs in the center of an image plane obtained by imaging, and the color shift direction thereof are measured. Next, on the basis of the measured color shift amount and color shift direction, the correction data 251 corresponding to each of a vertical direction component and a horizontal direction component is obtained.

For example, as illustrated above in FIGS. 3A and 3B, FIG. 5B, or the like, the color shift amount as the concentric aberration component depends on the image height, and becomes about zero in the center of the image plane of a captured image. Accordingly, it may be considered that the color shift occurring in the center of the image plane corresponds to the uniform aberration component.

Next, a second example of the method will be described. Also in the second example, in the same way as in the first example, after typical mi values, typical mz values, and typical mf values are preliminarily defined, measurement is performed with respect to each combination pattern of these aperture value i, zoom position z, and focus position f. On that basis, in the second example, it is assumed that measurement is performed by capturing a chart image 400 illustrated in FIG. 11A.

Figure 11A:
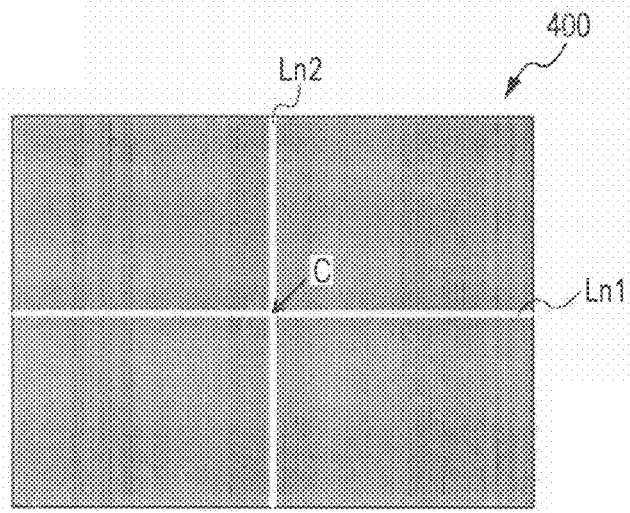
FIGS. 11A to 11C are diagrams illustrating examples of a chart image used when correction data of the uniform aberration correction data table is acquired.

In the chart image 400 illustrated in FIG. 11A, a straight line Ln1 passing through the center C of an image plane along a horizontal direction and a straight line Ln2 passing through the center C of an image plane along a vertical direction are indicated. In addition, for example, in these two straight lines Ln1 and Ln2, a predetermined color different from a background color is actually set.

In addition, at the time of measurement, the color shift amount of each of the R light and the B light with respect to the G light, which occurs in a vertical direction with respect to the straight line Ln1 in the horizontal direction, is measured. Since, with respect to the concentric aberration component, the color shift thereof occurs in such a way that the color shift spreads from the center of the image plane in a concentric manner, no color shift in the vertical direction occurs in the straight line Ln1 in the horizontal direction. Accordingly, the measurement of the color shift in the vertical direction occurring in the straight line Ln1 in the horizontal direction means that a vector component in the vertical direction of a color shift amount due to the uniform aberration component can be measured in a state in which no color shift due to the concentric aberration component occurs.

In addition, the measurement of the color shift amount at this time may be performed with respect to each column in a pixel array, or may be individually performed at regular intervals. For example, by setting the interval to a value as large as possible within a range in which the reliability of a measurement result is not lost, a time necessary for the measurement can be reduced. In addition, with respect to each of the R light and the B light, the average value of the vector components in the vertical direction measured in such a way as described above is calculated.

Next, in the same way, the color shift amount of each of the R light and the B light with respect to the G light, which occurs in a horizontal direction with respect to the straight line Ln2 in the vertical direction, is measured, and with respect to each of the R light and the B light, the average value of the measured color shift amounts is calculated. In addition, on the basis of the same reason as described above, the measurement of the color shift in the horizontal direction occurring in the straight line Ln2 in the vertical direction means that a vector component in the horizontal direction of a color shift amount due to the uniform aberration component can be measured in a state in which no color shift due to the concentric aberration component occurs. In addition, on the basis of individual vector components in the vertical direction and the horizontal direction corresponding to the R light and the B light, calculated in such a way as described above, a correction amount is calculated with respect to each of a horizontal direction component and a vertical direction component, and the correction amount is defined as the correction data 251.

In addition, with respect to the method for acquiring the correction data, which uses the chart image in such a way as in the second example, various types can be considered in addition to FIG. 11A. Therefore, other examples that use other chart images will be described with reference to FIGS. 11B and 11C and FIGS. 12A to 12C.

First, FIG. 11B will be described. In a chart image 400A illustrated in FIG. 11B, at positions on both right and left sides along a virtual horizontal line Lh passing through the center C of an image, horizontal bars 401 and 401 are depicted, respectively. In the same way, at positions on both upper and lower sides along a virtual vertical line Lv passing through the center C of an image, vertical bars 402 and 402 are depicted, respectively. In this case, by measuring the color shift amount of each of the R light and the B light with respect to the G light, which occurs in a direction perpendicular to the horizontal bars 401 and 401, the vector component in a vertical direction of a color shift amount due to the uniform aberration component is measured. In this case, by measuring the color shift amount of each of the R light and the B light with respect to the G light, which occurs in a direction perpendicular to the vertical bars 402 and 402, the vector component in a horizontal direction of a color shift amount due to the uniform aberration component is measured.

Figure 11B:
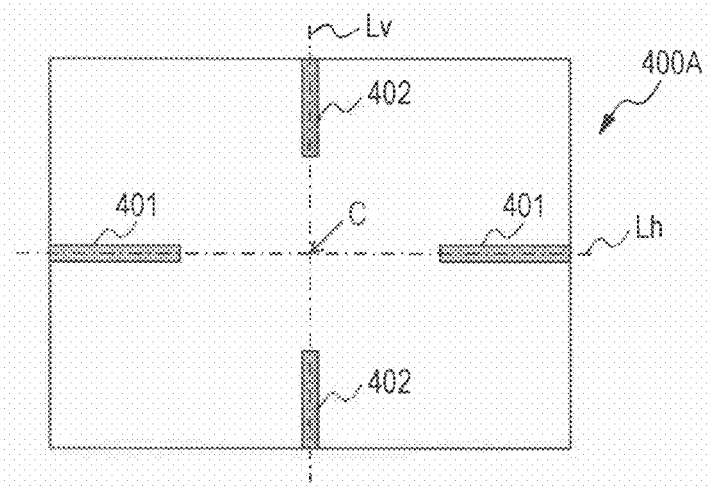
Figure 11C:
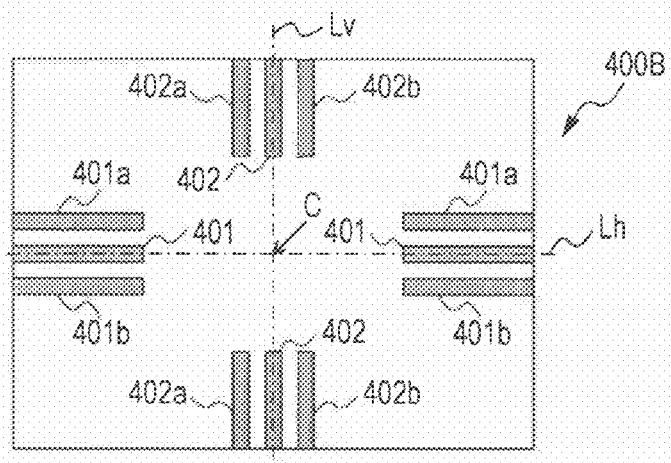

Next, in a chart image 400B illustrated in FIG. 11C, horizontal bars 401a and 401b are further added at regular intervals above and under each of the right horizontal bar 401 and the left horizontal bar 401 illustrated in FIG. 11B. In this case, with respect to each of the right and left horizontal bars 401, the right and left horizontal bars 401a, and the right and left horizontal bars 401b in the chart image 400B, a color shift amount occurring in the vertical direction is measured. In the same way, with respect to each of the upper and lower vertical bars 402, upper and lower vertical bars 402a, and upper and lower vertical bars 402b in the chart image 400B, a color shift amount occurring in the horizontal direction is measured. In this case, since the number of pixels able to be measured in the vicinity of the horizontal center and the vertical center of an image can be increased, measurement reproducibility (noise tolerance) can be expected to be improved.

Figure 12A:
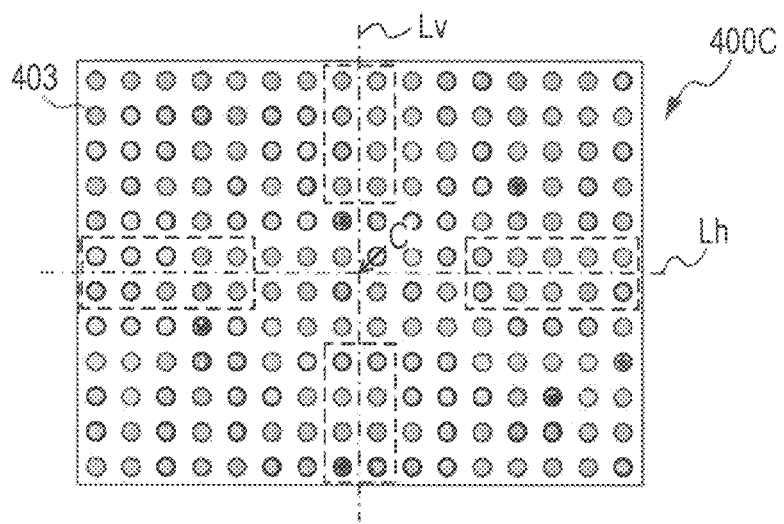
FIGS. 12A to 12C are diagrams illustrating examples of a chart image used when the correction data of the uniform aberration correction data table is acquired.

Next, in a chart image 400C illustrated in FIG. 12A, dots 403 are arrayed on the whole image in predetermined numbers of rows and columns. In addition, for example, at the time of measurement, a color shift amount in a portion indicated by a dashed line is measured. Namely, the color shift amounts in a vertical direction, which occur in dots 403 in regions on both right and left sides along a virtual horizontal line Lh, are measured. In addition, the color shift amounts in a horizontal direction, which occur in dots 403 in regions on both upper and lower sides along a virtual vertical line Lv are measured. For example, while the chart image 400C is one of chart images usually used in the measurement of aberration, the correction data 251 according to an embodiment of the present invention can also be obtained on the basis of measurement in which such a usual chart image is used.

Figure 12B:
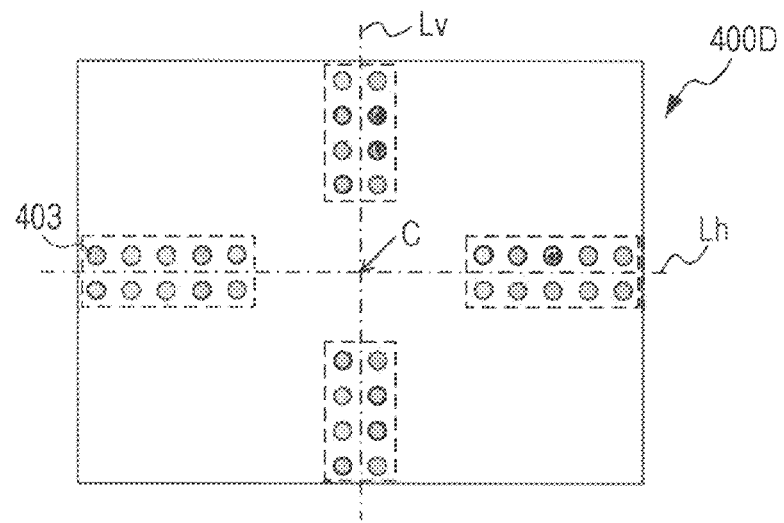

In addition, a chart image 400D illustrated in FIG. 12B specializes in acquiring the correction data 251 for the uniform aberration in an embodiment of the present invention, and only uses dots 402 indicated by a dashed line portion from FIG. 12A above described, for example.

Figure 12C:
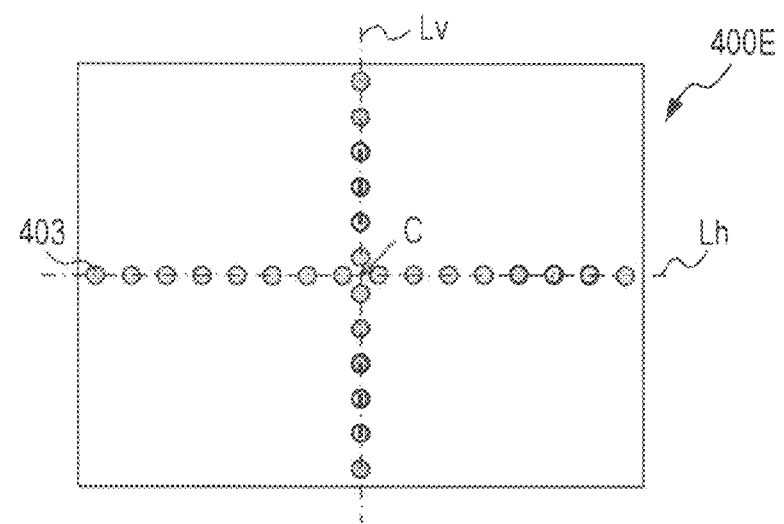

In addition, a chart image 400E illustrated in FIG. 12C includes a pattern in which the straight line Ln1 and the straight line Ln2 illustrated in FIG. 11A are replaced with the array of the dots 402. Accordingly, its measurement method is the same as in FIG. 11A.

Since, in the above-mentioned first example of the acquisition method for the correction data 251, a color shift amount in the center of the image plane of a captured image is only measured, the quantity of work and time and effort for measurement are small, and hence the first example has a high efficiency in this regard. On the other hand, in the second example described with reference to FIG. 11A, color shift amounts around the straight lines L1 and L2 set on the whole image are measured. Therefore, the measurement range is widened, and hence a high-precision measurement result can be obtained. In regard to this point, the examples illustrated in FIGS. 11B and 11C, and FIGS. 12A to 12C are also the same as the second example. In any case, in the measurement methods in which chart images are used, described with reference to FIGS. 11A to 11C and FIGS. 12A to 12C, a predetermined region including the virtual horizontal line and the virtual vertical line passing through the center of an image obtained by imaging is used as a target, and the color shift amounts in the vertical direction and the horizontal direction are individually measured.

In an embodiment of the present invention, in such a way as described above, the concentric aberration correction data table 240 and the uniform aberration correction data table 250 are created and stored. While the concentric aberration correction data table 240, as illustrated in FIG. 9, is a five-dimensional table, only the image height value y is a parameter relating to an image plane position. In addition, since the uniform aberration component does not depend on a pixel position, the five-dimensional table including the combination of the parameters of the optical system and the horizontal direction component and vertical direction component of the aberration is created, as illustrated in FIG. 10. On the other hand, for example, in a technique of the related art, correction data is used that further includes, with respect to each pixel, a correction value corresponding to each of the combinations of the parameters of an optical system. Compared with such correction data, in an embodiment of the present invention, even if the concentric aberration correction data table 240 is combined with the uniform aberration correction data table 250, its data size is greatly reduced. In addition, for example, a configuration may be considered in which one image plane is segmented into blocks having sizes of about (20×15) pixels, a color shift displacement amount in the center coordinates of each block is stored, and the stored color shift amount is interpolated and used at the time of correction processing. However, since, even in such a configuration, data corresponding to a position on an image is held even in units of blocks, an embodiment of the present invention has a far smaller data size.

In addition, while, for example, with respect to the uniform aberration correction data table 250, measurement is performed for each product in order to deal with the individual variability of a lens, the combination patterns of limited numbers of aperture values i, zoom positions z, and focus positions f are used as representatives, at the time of the measurement. On that basis, at the time of the measurement, it is only necessary to measure a color shift in the center of an image plane or in a portion corresponding to the straight lines L1 and L2 in the chart image 400 illustrated in FIG. 11A. In any case, with such a small quantity of work, even if measurement is performed for individual products, the increase of the quantity of work, which becomes a factor to disturb the quantity production of products, is smaller.

[Example of Processing Procedure of Magnification Chromatic Aberration Correction Unit]

Figure 13:
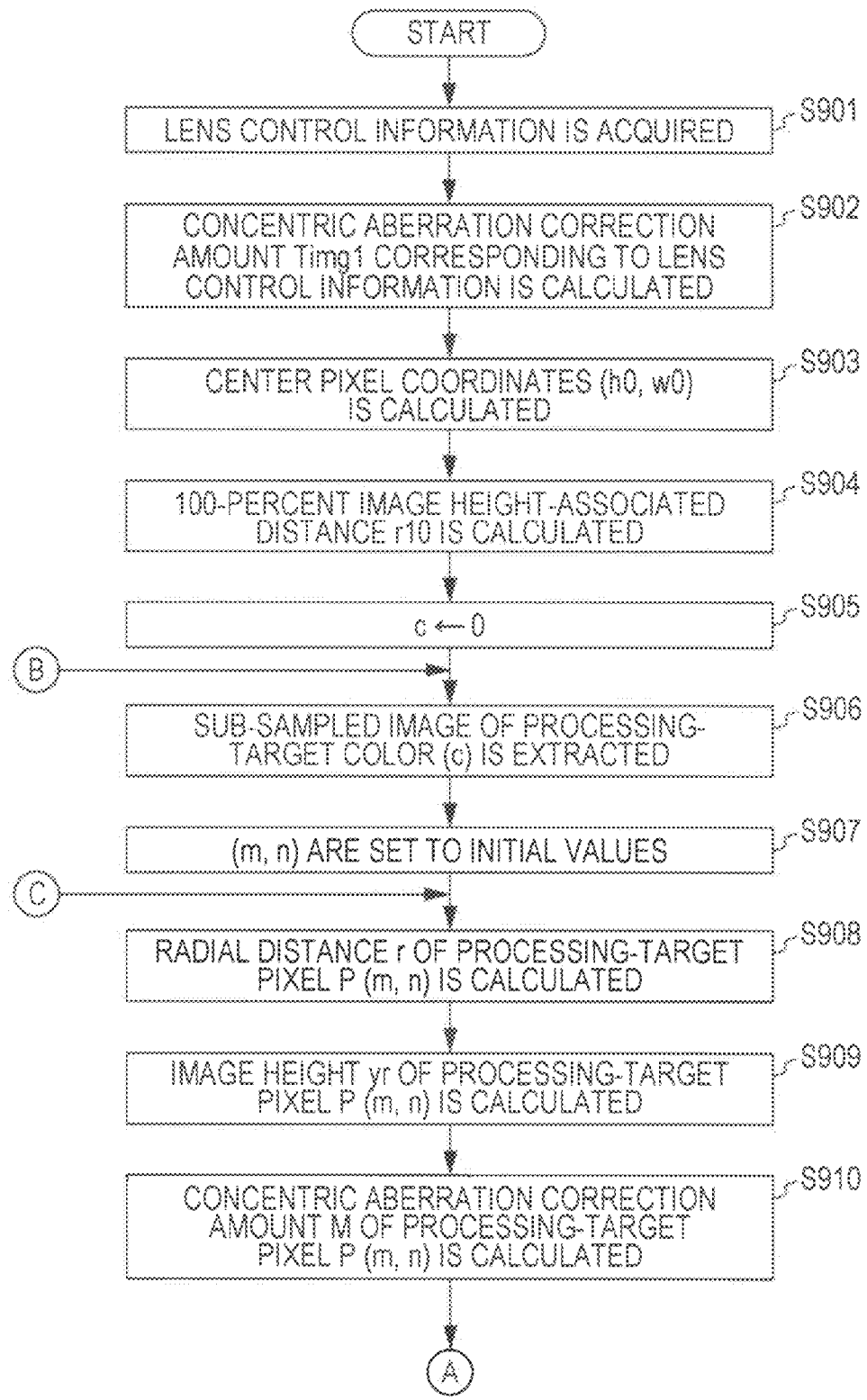
FIG. 13 is a diagram illustrating an example of a processing procedure executed by the magnification chromatic aberration correction unit.
Figure 14:
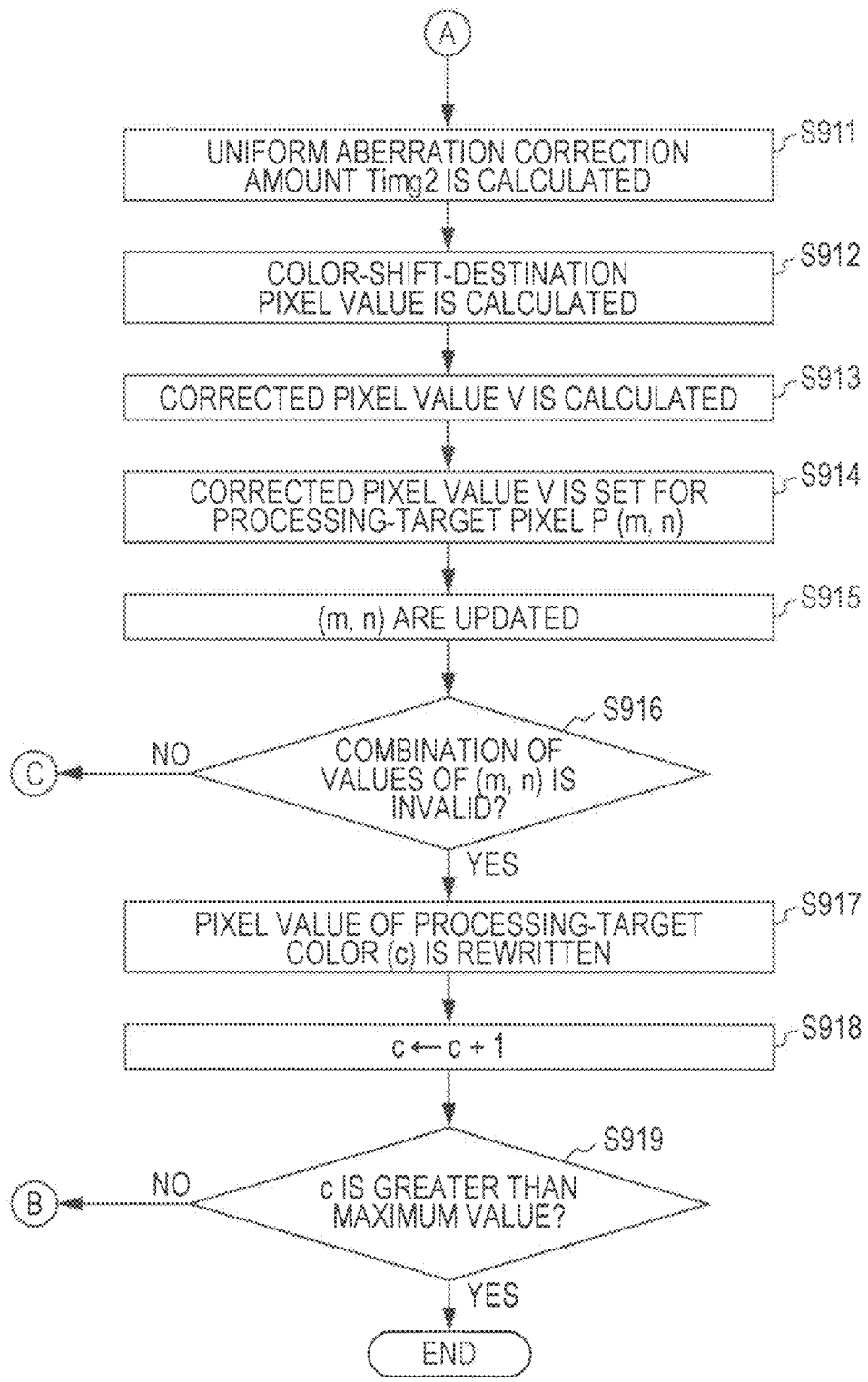
FIG. 14 is a diagram illustrating an example of a processing procedure executed by the magnification chromatic aberration correction unit.

Flowcharts illustrated in FIGS. 13 and 14 illustrate an example of a processing procedure performed by the magnification chromatic aberration correction unit 210 illustrated in FIG. 8. In addition, processing performed in each step illustrated in this figure is arbitrarily performed by one of individual portions that form the magnification chromatic aberration correction unit 210. In addition, for example, processing performed in each step illustrated in this figure is realized by the execution of a program by the CPU 111 or the digital signal processor (DSP). In addition, processing performed in each step illustrated in this figure may also be realized with hardware.

First, the concentric aberration correction amount calculation unit 213 and the uniform aberration correction amount calculation unit 214 acquire lens control information from the camera control unit 102 (Step S901). Here, as described above, the lens control information is information of an aperture value, a zoom position, and a focus position, currently set in the optical lens unit 101.

Next, the concentric aberration correction amount calculation unit 213 calculates a concentric aberration correction amount Timg1 corresponding to the lens control information acquired in Step S901 described above (Step S902). For example, the concentric aberration correction amount Timg1 may be calculated as follows.

Here, it is assumed that the aperture value, the zoom position, and the focus position, which correspond to the lens control information acquired in Step S901 described above, are represented by $p_i$, $p_z$, and $p_f$, respectively. In addition, it is assumed that each of the aperture value $p_i$, the zoom position $p_z$, and the focus position $p_f$ includes an integer portion (i) and a fractional portion (f) ranging to a predetermined decimal place, and is represented by one of the following expressions.

$$P_i = p_{ii} + p_{if}$$

$$P_z = p_{zi} + p_{zf}$$

$$P_f = p_{fi} + p_{ff}$$

In addition, when selecting an arbitrary correction data 241 in the concentric aberration correction data table 240, the concentric aberration correction amount calculation unit 213 designates the correction data 241 as follows. Namely, using the combination of the aperture value i, the zoom position z, the focus position f, the image height value y, and the processing-target color c that are based on integer numbers, the correction data 241 is designated. As described above, this corresponds to it that the concentric aberration correction amount calculation unit 213 stores the correction data 241 each piece of which corresponds to the combination of the aperture value i, the zoom position z, the focus position f, the image height value y, and the processing-target color c that are based on integer numbers. The correction data 241 designated in this way is represented as Tca1[i][z][f][y][c].

In addition, the concentric aberration correction amount calculation unit 213 accesses and reads out all pieces of the correction data 241 designated by Tca1[$p_{ii}$][$p_{zi}$][$p_{fi}$][y][c], from the concentric aberration correction data table 240. At this time, with respect to each of the image height value y and the processing-target color c, all values stored in the concentric aberration correction data table 240 are targets. Accordingly, the number of pieces of the correction data 24 designated by Tca1[$p_{ii}$][$p_{zi}$][$p_{fi}$][y][c] is represented by (ny×nc).

In addition, the concentric aberration correction amount calculation unit 213 accesses and reads out all pieces of the correction data 241 designated by Tca1[$p_{ii}$+1][$p_{zi}$+1][$p_{fi}$+1][y][c], from the concentric aberration correction data table 240. The number of pieces of the correction data 24 designated by Tca1[$p_{ii}$+1][$p_{zi}$+1][$p_{fi}$+1][y][c] is also represented by (ny×nc).

Next, the concentric aberration correction amount calculation unit 213 calculates the concentric aberration correction amount Timg1[y][c]. In order to perform the calculation, calculation based on the following expression is performed using the correction data 24 indicated by Tca1[$p_{ii}$][$p_{zi}$][$p_{fi}$][y][c] and Tca1[$p_{ii}$+1][$p_{zi}$+1][$p_{fi}$+1][y][c], described above.

$$T_{img1}[y][c] = \sum_{i=0}^{1} \sum_{j=0}^{1} \sum_{k=0}^{1} T_{ca1}[p_{ii}+i][p_{zi}+j][p_{fi}+k][y][c] \cdot$$
$$\{(1-i) + (-1)^{i+1} \cdot p_{if}\} \cdot \{(1-j) + (-1)^{j+1} \cdot p_{zf}\} \cdot$$
$$\{(1-k) + (-1)^{k+1} \cdot p_{ff}\}$$

Namely, on the basis of the integer number values of the aperture value pi, the zoom position pz, and the focus position pf, pieces of the correction data 241 to be an interpolation source are acquired. These are Tca1[$p_{ii}$][$p_{zi}$][$p_{fi}$][y][c] and Tca1[$p_{ii}$+1][$p_{zi}$+1][$p_{fi}$+1][y][c]. In addition, using the correction data 241 to be an interpolation source and the individual fractional values $p_{if}$, $p_{zf}$, and $p_{ff}$ of the aperture value $p_i$, the zoom position $p_z$, and the focus position $p_f$, three-dimensional linear interpolation is performed. An interpolation value calculated in this way is a concentric aberration correction amount Timg1[y][c]. In addition, the number of the concentric aberration correction amounts Timg1[y][c] is also (ny×nc). In addition, while, here, the concentric aberration correction amount Timg1[y][c] is calculated using linear interpolation, another interpolation processing method or another calculation method may be adopted.

Next, the image height calculation unit 212 calculates center pixel coordinates C (h0, W0) on an image formed on the basis of the pixel array of a correction-target image signal (Step S903). The center pixel coordinates C are used when the image height yr of each processing-target pixel P (m, n) described later is calculated. Here, on the above-mentioned image, the center pixel coordinates C (h0, W0) correspond to the position of an optical axis obtained in response to the concentric aberration component. This corresponds to the position of a lens optical axis on the imaging plane of an imaging element, in an ideal state in which no installation error is considered, for example. In addition, as the pixel array in this case, there is a Bayer array, for example.

In addition, as the simplest example of calculation processing for the center pixel coordinates C (h0, W0), when the size in a vertical direction and the size in a horizontal direction of an image, formed by all colors that form the correction-target image signal, are h and w, respectively, the center pixel coordinates are calculated as C (h/4, W/4).

In this regard, however, actually, in some cases, the center pixel coordinates C (h0, W0) are set to a position to which the lens optical axis is moved with respect to the imaging plane of an imaging element on the basis of the design condition or the like of the optical lens unit 101. In such a case, it is desirable to calculate the center pixel coordinates C (h0, W0) to which the above-mentioned shift amount of the lens optical axis is reflected. In addition, since the position of the lens optical axis is fixed in this case, in place of the execution of the calculation processing performed in Step S903, for example, processing may be performed in which the values of the center pixel coordinates C (h0, W0) have been stored and the values are read out. In addition, for example, there is a hand-shake correction function in which a lens optical axis is physically inclined. When the video camera 100 according to an embodiment of the present invention includes such a hand-shake correction function, it is desirable to dynamically calculate the values of the center pixel coordinates C (h0, W0) in accordance with the position of the lens optical axis with respect to an image, which is changed in response to hand-shake correction control. Accordingly, regardless of the change of the position of the lens optical axis due to the hand-shake correction control, the magnification chromatic aberration correction can be performed with a higher degree of accuracy.

Subsequently, the image height calculation unit 212 calculates a distance (100-percent image height-associated distance) r10 corresponding to a 100-percent image height (Step S904). On an image plane formed by the pixel array of a correction-target image signal, the 100-percent image height indicates the image height of a position farthest from the center of the image plane. Accordingly, for example, the 100-percent image height-associated distance r10 is a straight-line distance from the intersection of diagonal lines of a quadrangular image plane to the corner thereof. In this regard, however, here, it is assumed that the 100-percent image height-associated distance r10 is a straight-line distance on a color image plane including the color pixels of only R or B, which are to be the targets of processing subsequently performed. For example, when the pixel array is a Bayer array, a color image plane (R image plane) including only R pixels is h/2 high and w/2 wide. In the same way, a color image plane (B image plane) including only B pixels is also h/2 high and w/2 wide. Accordingly, each of the 100-percent image height-associated distances of the R image plane and the B image plane is represented by the following expression. In addition, in the following expression, "sqrt" indicates a square-root operation.

$$\mathrm{sqrt}((h/4)^2+(w/4)^2)$$

Subsequently, for example, the color pixel selection unit 211 assigns "0" to a variable c indicating a processing-target color (Step S905). In an embodiment of the present invention, it is assumed that the processing-target color the variable c for which corresponds to "0" is red (R) and the processing-target color the variable c for which corresponds to "1" is blue (B).

Next, the color pixel selection unit 211 extracts from the correction-target image signal the sub-sampled image of the processing-target color indicated by the current variable c (Step S906). Namely, the color pixel selection unit 211 extracts an image signal including only the pixels of the processing-target color indicated by the variable c.

Next, with respect to the combination of variables (m, n) indicating the coordinates of the processing-target pixel P from among pixels forming the sub-sampled image of the processing-target color, the color pixel selection unit 211 sets an initial value (Step S907). For example, data indicating the coordinates (m, n) of the processing-target pixel P is transferred to the image height calculation unit 212.

For example, the image height calculation unit 212 calculates the radial distance r of the processing-target pixel coordinates P (m, n) transferred from the color pixel selection unit 211 (Step S908), and furthermore converts the calculated radial distance r into the image height value yr (Step S909). First, for example, using the individual coordinate values of the processing-target pixel P (m, n) and the center pixel coordinates (h0, w0) calculated in the above-mentioned Step S903, the radial distance r can be calculated in accordance with the following expression.

$$r=\mathrm{sqrt}((m-h0)^2+(n-w0)^2)$$

Next, the image height value $y_r$ to which the processing-target pixel P (m, n) corresponds can be calculated in accordance with the following expression. In the following expression, an image height value corresponding to the image height 100-percent is ny−1. In addition, r10 indicates the 100-percent image height-associated distance calculated in the above-mentioned Step S904.

$$y_r=(r/r10)\times(ny-1)$$

In addition, the image height value $y_r$ calculated in accordance with the above expression includes an integer portion (i) and a fractional portion (f), and accordingly, the image height value $y_r$ is represented by the following expression.

$$y_r=y_{ri}-y_{rf}$$

Subsequently, processing for calculating a concentric aberration correction amount M that corresponds to the processing-target pixel P is performed by the concentric aberration correction amount calculation unit 213 (Step S910). In order to perform this processing, first, the concentric aberration correction amount calculation unit 213 inputs processing-target color information indicating the current variable c, from the color pixel selection unit 211. In addition, the concentric aberration correction amount calculation unit 213 inputs the image height value $y_r$ calculated in the above-mentioned Step S909, from the image height calculation unit 212. On that basis, on the basis of the current variable c and the integer portion yri of the image height value yr, the concentric aberration correction amount calculation unit 213 selects the two following correction amounts from among the concentric aberration correction amounts Timg1 calculated in Step S902. Namely, the concentric aberration correction amount calculation unit 213 selects a correction amount designated by Timg1[$y_{ri}$][c] and a correction amount designated by Timg1[$y_{ri}$+1][c].

Next, using the concentric aberration correction amounts Timg1[$y_{ri}$][c] and Timg1[$y_{ri}$+1][c] and the image height value y, the concentric aberration correction amount calculation unit 213 calculates a concentric aberration correction amount M with respect to the processing-target pixel P. For example, the concentric aberration correction amount M can also be calculated in accordance with calculation for linear interpolation based on the following expression. In addition, the concentric aberration correction amount M is correction magnification.

$$M = \sum_{i=0}^{1} T_{img1}[y_{ri}+i][ch] \cdot \{(1-i)+(-1)^{i+1} \cdot y_{rf}\}$$

Subsequently, as illustrated in FIG. 14, the uniform aberration correction amount calculation unit 214 performs processing for calculating a uniform aberration correction amount Timg2 (Step S911). For this purpose, first, using the aperture value $p_i$, the zoom position $p_z$, and the focus position $p_f$, acquired in the above-mentioned Step S901, the uniform aberration correction amount calculation unit 214 acquires the necessary correction data 251. Namely, the uniform aberration correction amount calculation unit 214 reads out and acquires from the uniform aberration correction data table 250 all pieces of the correction data 251 designated by Tca2

$[p_{ii}][p_{zi}][p_{fi}][d][c]$. In addition, the uniform aberration correction amount calculation unit 214 reads out and acquires all pieces of the correction data 251 designated by $Tca2[p_{ii}+1][p_{zi}+1][p_{fi}+1][d][c]$. The number of pieces of the correction data 251 acquired as $Tca2[p_{ii}][p_{zi}][p_{fi}][d][c]$ is four (md×mc). In the same way, the number of pieces of the correction data 251 acquired as $Tca2[p_{ii}+1][p_{zi}+1][p_{fi}+1][d][c]$ is also is four.

Next, using $Tca2[p_{ii}][p_{zi}][p_{fi}][d][c]$ and $Tca2[p_{ii}+1][p_{zi}+1][p_{fi}+1][d][c]$, acquired in such a way as described above, the uniform aberration correction amount calculation unit 214 performs the following calculation, for example. Accordingly, a uniform aberration correction amount Timg2[d][c] is calculated.

$$T_{img2}[d][c] = \sum_{i=0}^{1}\sum_{j=0}^{1}\sum_{k=0}^{1} T_{ca2}[p_{ii}+i][p_{zi}+j][p_{fi}+k][d][c] \cdot$$
$$\{(1-i)+(-1)^{i+1} \cdot p_{if}\} \cdot \{(1-j)+(-1)^{j+1} \cdot p_{zf}\} \cdot$$
$$\{(1-k)+(-1)^{k+1} \cdot p_{ff}\}$$

Namely, in the above expression, in the same way as in the concentric aberration correction amount Timg1 described above, the uniform aberration correction amount Timg2[d][c] is calculated in accordance with three-dimensional linear interpolation processing.

Next, the color-shift-destination pixel value calculation unit 215 calculates the pixel value of a color-shift-destination pixel (Step S912). When the pixel value of the color-shift-destination pixel is calculated, first, the color-shift-destination pixel value calculation unit 215 calculates the coordinates of the color-shift-destination pixel. For this purpose, for example, the color-shift-destination pixel value calculation unit 215 inputs the concentric aberration correction amount M calculated in Step S910 and the uniform aberration correction amount Timg2[d][c] calculated in Step S911. In addition, the color-shift-destination pixel value calculation unit 215 calculates the coordinate values of a color-shift-destination pixel Pd (m1, n1) in accordance with the following expressions.

$m1=(m-h0)\times M+h0+Timg2[0][c]$ $n1=(n-w0)\times M+w0+Timg2[1][c]$

Next, the color-shift-destination pixel value calculation unit 215 calculates the pixel value of the color-shift-destination pixel Pd (m1, n1), and outputs the pixel value as a corrected pixel value V (Step S913). As will be appreciated from Timg2[d][c] included in the above expression, each coordinate value of the color-shift-destination pixel Pd (m1, n1) includes a fractional portion. On the basis of interpolation processing that utilizes the pixel values of predetermined pixel located near the color-shift-destination pixel Pd (m1, n1), the pixel value correction unit 216 calculates the corrected pixel value V that is the pixel value of the color-shift-destination pixel Pd (m1, n1). In addition, the pixel value correction unit 216 sets the calculated corrected pixel value V as the pixel value of the current processing-target pixel P (m, n) (Step S914).

When the processing operations so far are performed, the color pixel selection unit 211 performs update with respect to the combination of the values of the variables (m, n) indicating the processing-target pixels P, for example (Step S915). In response to this, the change of the processing-target pixel P is performed. Next, the color pixel selection unit 211 determines whether or not the current variable (m, n) is the combination of invalid values (Step S916). For example, when unprocessed pixels remain in a processing-target color corresponding to the current variable c, the variable (m, n) after the update thereof performed in Step S915 includes the combination of valid values corresponding to one of the unprocessed pixels. On the other hand, it is assumed that the variable (m, n) updated in Step S915 after processing for all color pixels in the current processing-target color is terminated is the combination of invalid values corresponding to none of color pixels in the current processing-target color. When, in Step S916, it is determined that the current variable (m, n) is not the combination of invalid values, the processing operation returns to the processing in Step S908 because an unprocessed color pixel remains. On the other hand, when, in Step S916, it is determined that the current variable (m, n) is the combination of invalid values, the pixel value correction unit 216 performs subsequent processing.

Namely, when, in Step S916, it is determined that the current variable (m, n) is the combination of invalid values, there is a state in which corrected pixel values V are individually set for all pixels in the current processing-target color. Therefore, the pixel value correction unit 216 inputs from the color pixel selection unit 211 the signal of a sub-sampled image based on the processing-target color of R or B, indicated by the current variable c. In addition, the pixel value of each of pixels forming the sub-sampled image is rewritten with the corrected pixel value V set for the pixel (Step S917). The signal of the sub-sampled image the pixel values of which are rewritten in this way is a signal, the magnification chromatic aberration of which is corrected, and is a signal component corresponding to R or B in the aberration-corrected image signal.

In response to the termination of the above-mentioned processing in Step S918, the color pixel selection unit 211 increments the variable c, for example (Step S918). When the variable c is changed from "0" to "1" on the basis of the processing, the processing-target color is changed from R to B, for example, and the processing-target color information output from the color pixel selection unit 211 is also changed from a value indicating R to a value indicating B.

Next, the color pixel selection unit 211 determines whether or not the current variable c is greater than a maximum value (Step S919), and when it is determined that the current variable c is less than the maximum value, the processing operation returns to the processing in Step S906. Accordingly, for example, the processing operation turns out to shift from the magnification chromatic aberration correction the target of which is R light, performed so far, to the magnification chromatic aberration correction the target of which is B light. In addition, when the processing is executed again up to Step S918 and, as a result, it is determined in Step S919 that the current variable c is greater than the maximum value, the magnification chromatic aberration correction corresponding to one frame of an image turns out to be performed, for example. In response to this, chrominance signals individually corresponding to R an B, in which the pixel value thereof are rewritten, and a chrominance signal of G, which is output with no change from the color pixel selection unit 211, are output from the magnification chromatic aberration correction unit 210. Each of these chrominance signals of R, B, and G becomes an aberration-corrected image signal.

2. Second Embodiment

Example of Configuration of Magnification Chromatic Aberration Correction Unit

Subsequently, a second embodiment of the present invention will be described. In the first embodiment described above, using the concentric aberration correction data table 240 and the uniform aberration correction data table 250, preliminarily stored, a correction amount is obtained, and the magnification chromatic aberration correction processing is performed. On the other hand, in the second embodiment, a configuration is adopted in which a correction amount is obtained on the basis of an image signal obtained by imaging and magnification chromatic aberration is corrected.

Figure 15:
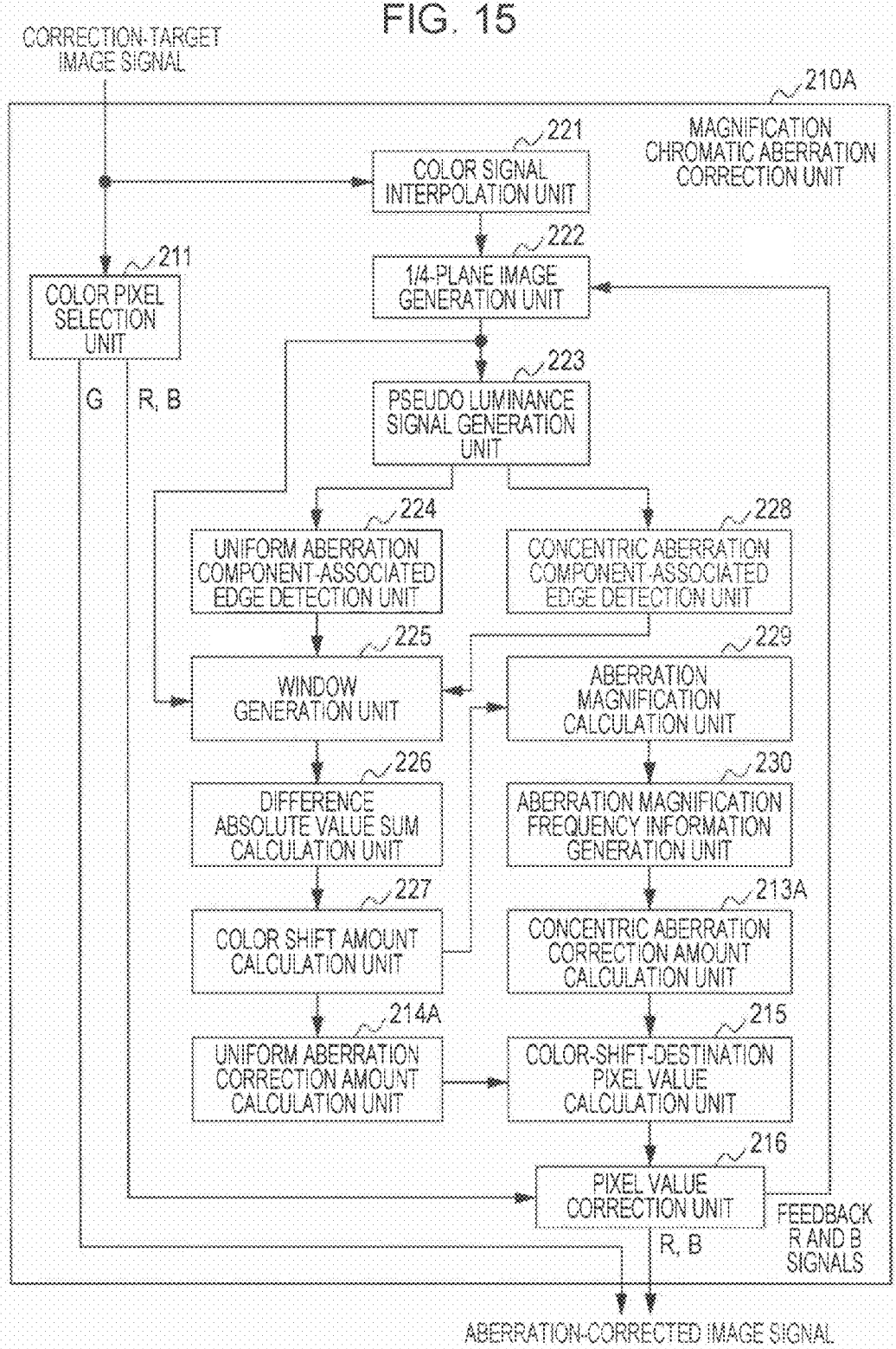
FIG. 15 is a diagram illustrating an example of a configuration of a magnification chromatic aberration correction unit according to a second embodiment of the present invention.

FIG. 15 illustrates an example of the configuration of a magnification chromatic aberration correction unit 210A according to the second embodiment. For example, the magnification chromatic aberration correction unit 210A is provided in place of the magnification chromatic aberration correction unit 210 illustrated in FIG. 2 as a portion corresponding to the first embodiment. In addition, in this figure, the same symbol is assigned to the same portion as in that in FIG. 8, and the description thereof will be omitted.

The magnification chromatic aberration correction unit 210A illustrated in FIG. 15 includes a color pixel selection unit 211, a color signal interpolation unit 221, a 1/4-plane image generation unit 222, a pseudo luminance signal generation unit 223, a uniform aberration component-associated edge detection unit 224, and a window generation unit 225. In addition, the magnification chromatic aberration correction unit 210A includes a difference absolute value sum calculation unit 226, a color shift amount calculation unit 227, a uniform aberration correction amount calculation unit 214A, a concentric aberration component-associated edge detection unit 228, an aberration magnification calculation unit 229, and an aberration magnification frequency information generation unit 230. In addition, the magnification chromatic aberration correction unit 210A includes a concentric aberration correction amount calculation unit 213A, a color-shift-destination pixel value calculation unit 215, and a pixel value correction unit 216.

In addition, in the following description of FIG. 15, in order to provide a comprehensible explanation, as a matter of convenience, a case will be cited in which an R signal is corrected as a processing target. The magnification chromatic aberration correction unit 210A also performs processing for magnification chromatic aberration correction the target of which is the R signal, described later, on a B signal in the same way.

The color signal interpolation unit 221 is a portion that inputs a correction-target image signal and performs processing for interpolating the G signal located at the position of each R pixel of the correction-target image signal. For example, with respect to the interpolation processing, a bilinear interpolation method may be adopted as described later with reference to FIG. 20.

The 1/4-plane image generation unit 222 is a portion that generates a 1/4-plane image. In the Bayer array, the G pixels account for a half of pixels forming the whole image area, and the R pixels and the B pixels account for quarters of pixels forming the whole image area, respectively. After the above-mentioned processing for generating the interpolated G signals corresponding to the R pixel positions, the interpolated G signals based on the interpolated G pixels the number of which corresponds to a quarter of pixels forming the whole image area are obtained. Therefore, the 1/4-plane image generation unit 222 generates an image signal including only the interpolated G pixels. The image signal is a 1/4-plane image corresponding to the interpolated G signals. In addition, in the same way, the 1/4-plane image generation unit 222 generates a 1/4-plane image that corresponds to the R signal including only the R pixels.

In addition, at the time of the correction of uniform aberration, the 1/4-plane image generation unit 222 generates the 1/4-plane image that corresponds to the R signal, using the R signal extracted from the correction-target image signal. On the other hand, at the time of the correction of concentric aberration, the 1/4-plane image generation unit 222 generates the 1/4-plane image, using the correction-target image signal corrected with respect to the uniform aberration component. Namely, the 1/4-plane image is generated using the R signal subjected to the uniform aberration correction, fed back from the pixel value correction unit 216.

The pseudo luminance signal generation unit 223 is a portion that generates a pseudo luminance signal using the two 1/4-plane images generated in such a way as described above. For example, when the 1/4-plane image corresponding to the interpolated G signal and the 1/4-plane image corresponding to the R signal are used, processing for calculating the average of the pixel value of the interpolated G pixel and the pixel value of the R pixel located at the same position is performed with respect to all pixel positions on the 1/4-plane image. A pseudo luminance signal is obtained on the basis of the average value of each pixel position calculated in such a way. The generation of the pseudo luminance signal is performed for the following edge detection processing. While, for edge detection, it is desirable to use a luminance signal from which color information is removed, the RAW image data includes only chrominance signals of R, G, and B and includes no luminance signal component Y. Therefore, the pseudo luminance signal is generated in such a way as described above.

The uniform aberration component-associated edge detection unit 224 is a portion that inputs the pseudo luminance signal and detects an edge occurring in response to the uniform aberration. Usually, a color shift due to the magnification chromatic aberration significantly occurs in the edge portion of an image. Namely, in an embodiment of the present invention, magnification chromatic aberration is detected by detecting an edge in a captured image, and the uniform aberration component-associated edge detection unit 224 performs, for uniform aberration correction, edge detection corresponding to the detection of a uniform aberration component. The vector of a color shift occurring in response to a uniform aberration component may be expressed by the synthesis of a vector component in a horizontal direction and a vector component in a vertical direction. Therefore, the uniform aberration component-associated edge detection unit 224 detects an edge with respect to the horizontal direction and the vertical direction of an image plane. In addition, at the time of the edge detection, as the type of the change direction of the pixel value thereof, it is also detected whether the detected edge is a rising edge or a negative-going edge. An example of a method for such an edge detection processing will be described later.

The window generation unit 225 is a portion that sets windows for the interpolated G signal and R signal with the position of the detected edge at the center, the edge being detected by the uniform aberration component-associated edge detection unit 224 or the concentric aberration component-associated edge detection unit 228 described later. For example, these windows are partial image areas, formed with a predetermined number of horizontal pixels and a predetermined number of vertical pixels, on the 1/4-plane image generated by the 1/4-plane image generation unit 222. In addition, the window of the interpolated G signal and the window of the R signal may have the same size.

The difference absolute value sum calculation unit 226 is a portion that calculates a difference absolute value sum with respect to each shifted position with the positional relationship between the two windows set in such a way as described above being shifted. In addition, with respect to the shift direction of the window, the window is shifted in the same direction as that of an edge that has been the source of window generation. In response to the edge of the uniform aberration component, the window is shifted along the horizontal direction or the vertical direction in accordance with the edge direction thereof. In addition, since the color shift amount of the R light with respect to the G light is intended to be obtained with the G signal being used as a reference signal, the window of the interpolated G signal is fixed, and the window of the R signal is shifted. In addition, while the shift amount is just an example, the range amount of the shift may be set to about five pixels along each of the vertical direction and the horizontal direction.

In addition, a difference absolute value between the interpolated G pixel and the R pixel that have been located at the same position is calculated with respect to each shifted position, and all of the difference absolute values individually obtained with respect to the coordinates thereof are summed up. Accordingly, a difference absolute value sum corresponding to one edge is obtained. In addition, the difference absolute value sum is also called Sum of Absolute Difference (SAD). In addition, the sum of squared differences (SSD) may be obtained. The above-mentioned window setting performed by the window generation unit 225 and the above-mentioned calculation of the difference absolute value sum performed by the difference absolute value sum calculation unit 226 are performed with respect to each detected edge.

The color shift amount calculation unit 227 is a portion that calculates a corresponding color shift amount with respect to each image portion of the detected edge, using the calculated difference absolute value sum. Here, the calculated color shift amount is the color shift amount of the R signal with respect to the G signal that is a reference signal. In addition, in an embodiment of the present invention, for example, by performing an interpolation operation, a color shift amount based on a sub-pixel unit smaller than a pixel unit is calculated.

The uniform aberration correction amount calculation unit 214A is a portion that calculates a correction amount (uniform aberration correction amount) corresponding to the uniform aberration component, on the basis of the above-mentioned color shift amount of the R signal calculated on the basis of the above-mentioned edge detection result obtained by the uniform aberration component-associated edge detection unit 224. In addition, when the uniform aberration correction amount is calculated, the detection results of the rising edge and the negative-going edge that correspond to the color shift amounts are used as described later.

The color-shift-destination pixel value calculation unit 215 is a portion that calculates the pixel value (corrected pixel value) of a color-shift-destination pixel on the basis of an input aberration correction amount. First, in response to the calculation of the uniform aberration correction amount performed by the uniform aberration correction amount calculation unit 214A, the color-shift-destination pixel value calculation unit 215 obtains the coordinates of a color-shift-destination pixel in the R signal on the basis of the uniform aberration correction amount, and calculates the pixel value of the obtained coordinates. The pixel value of the color-shift-destination pixel calculated on the basis of the uniform aberration correction amount is a corrected pixel value only corresponding to the uniform aberration component in the magnification chromatic aberration.

The pixel value correction unit 216 according to the second embodiment rewrites each of the pixel values of the R pixels with the pixel value of a corresponding color-shift-destination pixel. Accordingly, the R signal corrected with respect to the uniform aberration component is obtained. The R signal the uniform aberration of which is corrected is input to the 1/4-plane image generation unit 222, and is generated as the 1/4-plane image of the R signal. The pseudo luminance signal generation unit 223 generates a pseudo luminance signal corresponding to the concentric aberration correction, using the 1/4-plane image, which includes the R signal corrected with respect to the uniform aberration component, and the interpolated G signal.

The concentric aberration component-associated edge detection unit 228 is a portion that inputs the above-mentioned pseudo luminance signal corresponding to the concentric aberration correction, and performs edge detection corresponding to the concentric aberration. The pseudo luminance signal input by the concentric aberration component-associated edge detection unit 228 is generated using the 1/4-plane image including the R signal subjected to the uniform aberration correction, fed back from the pixel value correction unit 216. In addition, the direction of an edge detected by the concentric aberration component-associated edge detection unit 228 is a direction along the radial direction from the center of an image plane. In addition, the concentric aberration component-associated edge detection unit 228 also detects whether the detected edge is a rising edge or a negative-going edge. An example of a method for the edge detection processing will be described later.

Also in response to an edge detection result obtained by the concentric aberration component-associated edge detection unit 228, the window generation unit 225, the difference absolute value sum calculation unit 226, and the color shift amount calculation unit 227 perform the same processing as described above. In this regard, however, in the difference absolute value sum calculation unit 226, in response to the concentric aberration component, the shift of the window of the R signal with respect to the window of the interpolated G pixels becomes a shift along the radial direction with the center of an image plane being set as a reference. Accordingly, the color shift amount calculation unit 227 calculates the color shift amount of the R pixel with respect to the interpolated G pixel in the radial direction with separating the color shift amount into parts relating to the rising edge and the negative-going edge.

The aberration magnification calculation unit 229 is a portion that converts the color shift amount calculated in response to the concentric aberration correction into an aberration magnification. Here, the aberration magnification is a magnification value in a state in which the calculated color shift amount of the R signal is obtained, under the condition that a magnification value "1" corresponds to a state in which there is no color shift with respect to a G interpolated signal. For example, the aberration magnification can be calculated on the basis of a ratio between an image height to which a G pixel to be a reference corresponds and the image height of a color shift destination determined in accordance with the calculated color shift amount.

The aberration magnification frequency information generation unit 230 is a portion that creates the histogram of plural aberration magnifications individually calculated in response to edges in the R signal by the aberration magnification calculation unit 229. Namely, the aberration magnification frequency information generation unit 230 generates information (aberration magnification frequency information) indicating the distribution of the occurrence rate of an aberration magnification. In addition, the aberration magnification is calculated in response to each detected edge, and accordingly, one of the rising edge and the negative-going edge corresponds to the aberration magnification. The histogram of the aberration magnification is created with respect to each of the aberration magnification corresponding to the rising edge and the aberration magnification corresponding to the negative-going edge.

The concentric aberration correction amount calculation unit 213A in the second embodiment is a portion that calculates a concentric aberration correction amount on the basis of the aberration magnification frequency information generated in such a way as described above. For this purpose, first, the concentric aberration correction amount calculation unit 213A calculates an aberration magnification value adopted for actual correction, on the basis of the aberration magnification frequency information. For example, the calculated aberration magnification value may be treated as the concentric aberration correction amount.

In response to the input of the concentric aberration correction amount, the color-shift-destination pixel value calculation unit 215 calculates the pixel value of the color-shift-destination pixel of the R signal, based on the concentric aberration component, with respect to each of R pixels forming the R signal subjected to the uniform aberration correction. In addition, with respect to each of R pixels forming the R signal subjected to the uniform aberration correction, the pixel value correction unit 216 performs processing for rewriting the R pixel with the pixel value of a color-shift-destination pixel calculated in response to the R pixel. The rewriting of pixel values corresponds to the correction of the concentric aberration.

In addition, owing to the completion of the rewriting of pixel values at this time, correction corresponding to the uniform aberration component and the concentric aberration component turns out to be performed. Namely, the magnification chromatic aberration correction turns out to be performed. In addition, individual portions in the magnification chromatic aberration correction unit 210A also perform the processing operations described so far on the B signal, and outputs the B signal subjected to the magnification chromatic aberration correction. These R signal and B signal subjected to the magnification chromatic aberration correction form the individual components of R and B in an aberration-corrected image signal. In addition, while, in the above description, the R signal and the B signal are subjected to the aberration correction in this order, the B signal and the R signal may be subjected to the aberration correction in this order. Even if the aberration correction is performed in any order, the same result of the magnification chromatic aberration correction is obtained as a result. In addition, the aberration correction operations for the R signal and the B signal may be simultaneously performed.

[Example of Processing Procedure of Magnification Chromatic Aberration Correction Unit]

Figure 16:
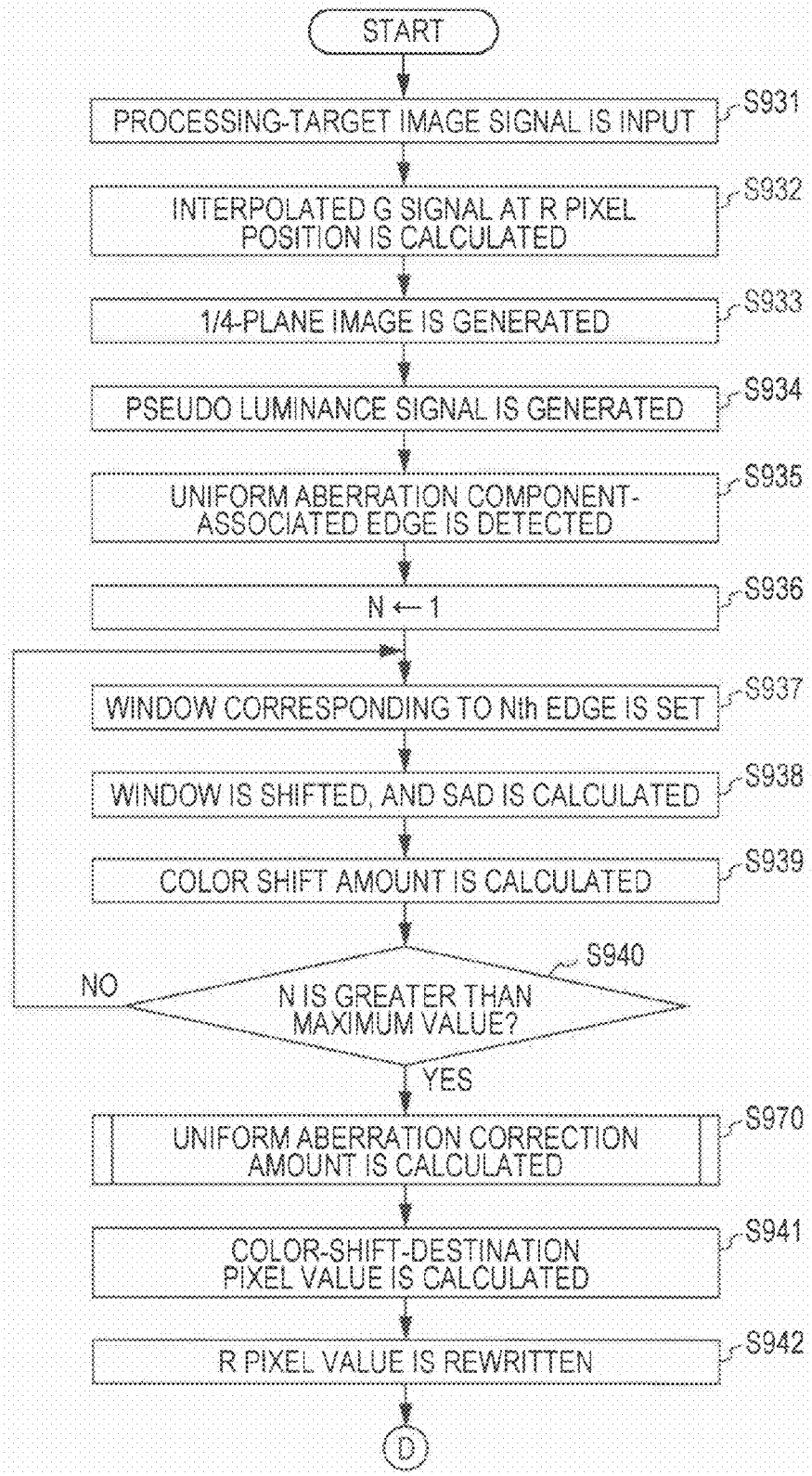
FIG. 16 is a diagram illustrating an example of a processing procedure executed by the magnification chromatic aberration correction unit.
Figure 17:
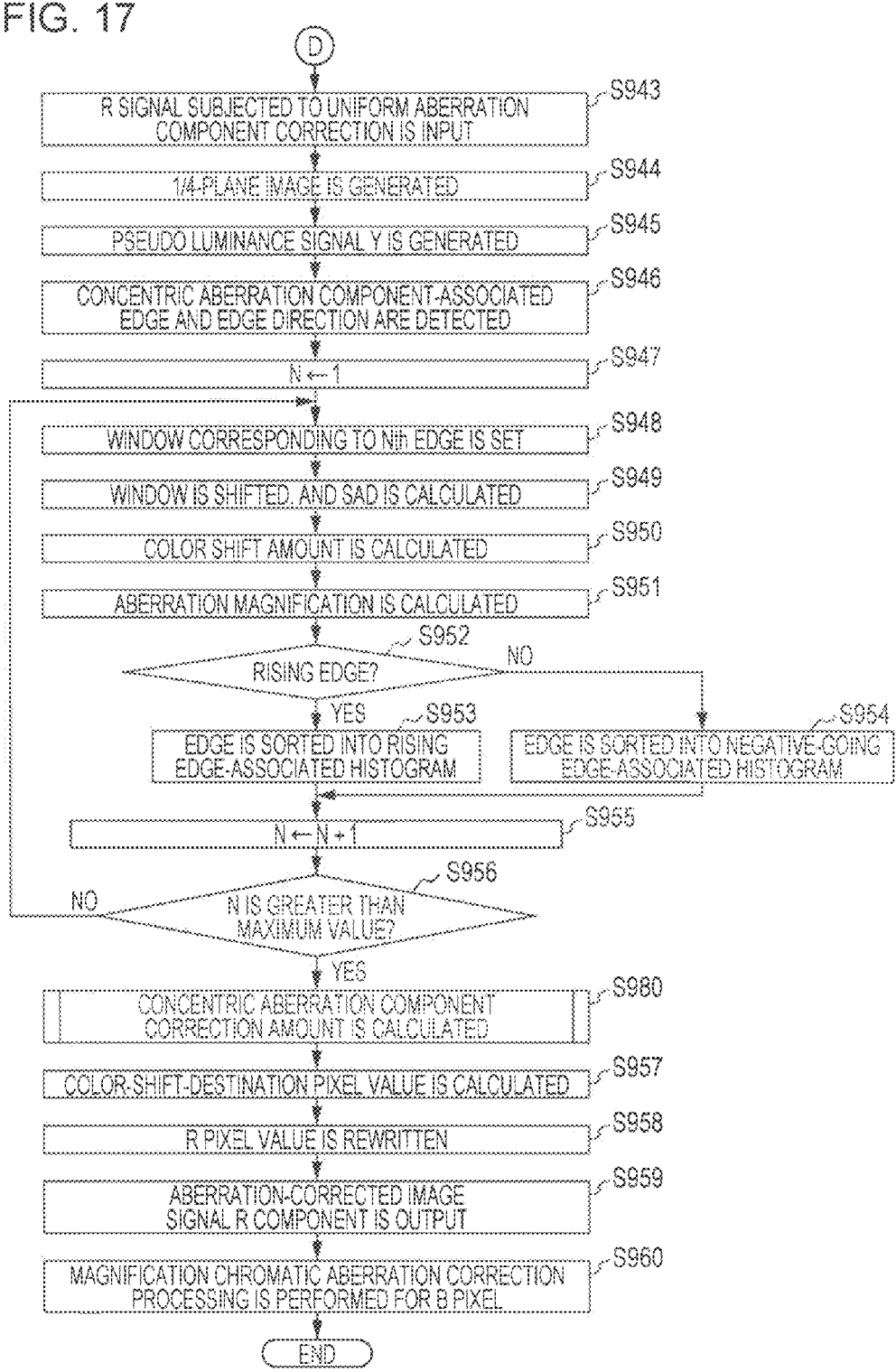
FIG. 17 is a diagram illustrating an example of a processing procedure executed by the magnification chromatic aberration correction unit.

FIGS. 16 and 17 illustrate an example of processing procedure for the magnification chromatic aberration correction performed by the magnification chromatic aberration correction unit 210A. A processing operation performed in each of steps illustrated in these figures is arbitrarily performed by the magnification chromatic aberration correction unit 210A. In addition, for example, the processing operation performed in each of steps illustrated in these figures may also be realized by the execution of a program by the CPU 111 or the DSP. In addition, the processing operation performed in each of steps illustrated in these figures may also be realized with hardware. In addition, in the processing illustrated in these figures, first, correction processing for an R signal in a correction-target image signal is performed, and subsequently, correction processing for a B signal in the correction-target image signal is performed.

In FIG. 16, first, the color signal interpolation unit 221 inputs the processing-target pixel signal corresponding to one frame, for example (Step S931), and generates an interpolated G signal corresponding to the position of an R pixel in the input processing-target pixel signal (Step S932).

Figure 20:
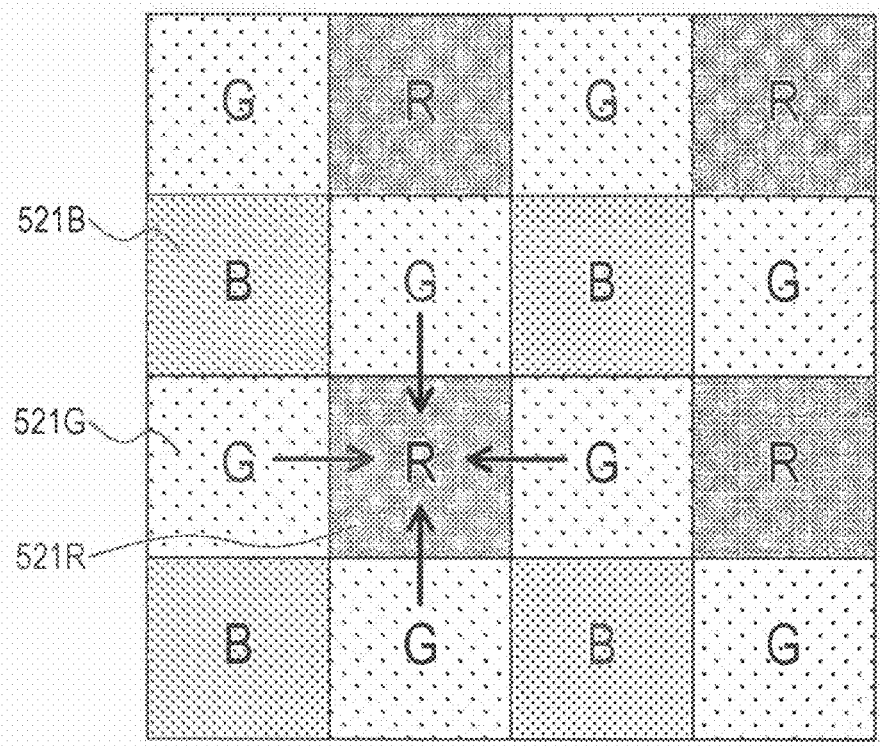
FIG. 20 is a diagram for explaining an example of interpolated G signal calculation processing executed by a color signal interpolation unit according to the second embodiment of the present invention.

A specific example of the interpolated G signal generation processing performed in the above-mentioned Step S932 will be described with reference to FIG. 20. FIG. 20 schematically illustrates the correction-target image signal input by the color signal interpolation unit 221 with associating the correction-target image signal with the pixel array pattern of R, G, and B in an imaging element. In addition, the pixel array pattern is a pattern based on the Bayer array. In the Bayer array, an R pixel 521R, a G pixel 521G, a B pixel 521B that are color pixels corresponding to the colors of R, G, and B, respectively, are individually arrayed on the basis of a 1:2:1-pixel number allocation, in accordance with a predetermined array rule. In addition, when the interpolated G signal corresponding to an R pixel position is generated, the arithmetic average of the pixel values of the four G pixels 521G adjacently located on the left, right, upper, and lower sides of one R pixel 521R is calculated in such a way as illustrated in FIG. 20. The arithmetic average value is the pixel value of the G pixel corresponding to the position of the one R pixel, in the interpolated G signal. Namely, here, the interpolated G signal is generated on the basis of bilinear interpolation. In addition, the generation of the interpolated G signal based on the interpolation processing is performed with respect to each of R pixel positions in a whole image area. In addition, when a G signal corresponding to the position of the B pixel 521B is interpolated, a processing operation, in which the interpolated pixel value of G is calculated on the basis of the arithmetic average of the pixel values of the four G pixels 521G adjacently located on the left, right, upper, and lower sides of one B pixel 521B, is performed with respect to each of B pixel positions in the whole image area, in the same way.

Next, the R signal in the correction-target image signal, generated by the color signal interpolation unit 221, and the interpolated G signal generated by the color signal interpolation unit 221 are input to the 1/4-plane image generation unit 222. In addition, a 1/4-plane image including the input R signal and a 1/4-plane image including the interpolated G signal are generated (Step S933).

Next, the pseudo luminance signal generation unit 223 generates a pseudo luminance signal on the basis of the 1/4-plane image including the R signal and the 1/4-plane image including the interpolated G signal (Step S934). For example, also as described above, the pseudo luminance signal performs a calculation operation based on the following expression, under the condition that the pixel value of one R pixel in the 1/4-plane image including the R signal is Vr and the pixel value of the interpolated G pixel located at the same position as that of the R pixel in the 1/4-plane image including the interpolated G signal is Vg.

$$(Vr+Vg)/2$$

Namely, for example, in such a way as the above expression, the average value of the two pixels is calculated. The calculated average value indicates a luminance value at the pixel position. In addition, the calculation of a luminance value is performed on all pixels forming the 1/4-plane image. A signal including luminance values obtained in such a way is the pseudo luminance signal.

The pseudo luminance signal generated in the above-mentioned Step S934 is supplied to the uniform aberration component-associated edge detection unit 224. The uniform aberration component-associated edge detection unit 224 performs edge detection processing corresponding to the uniform aberration component, on the supplied pseudo luminance signal (Step S935).

Figure 21:
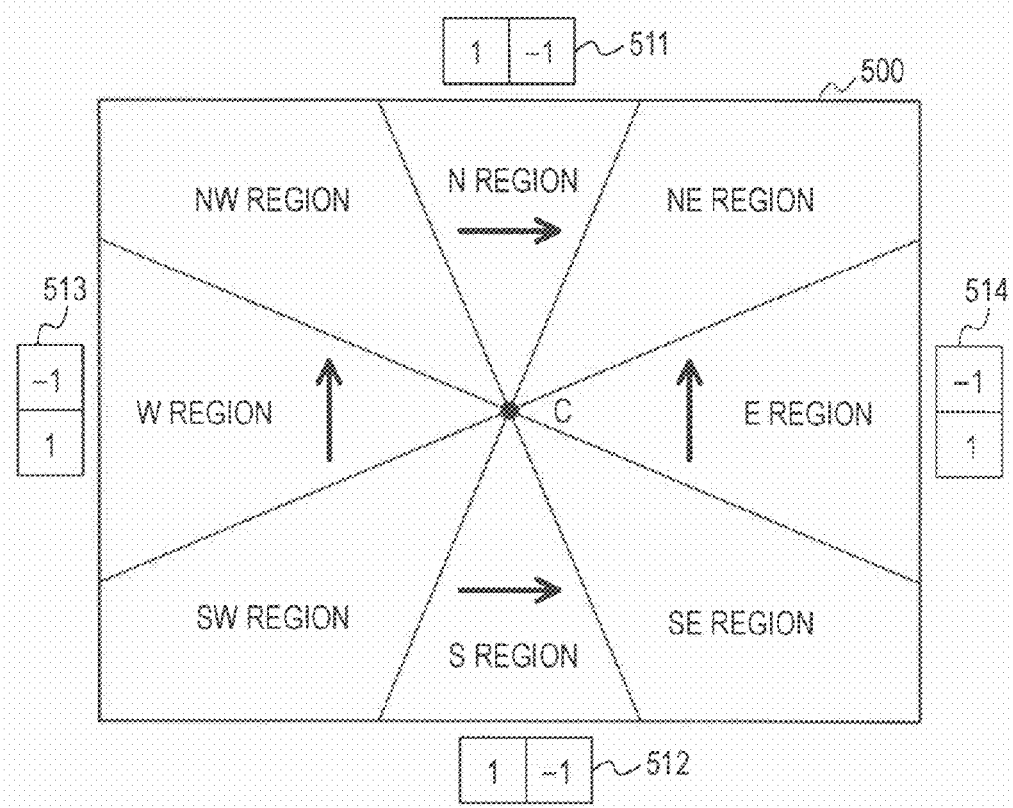
FIG. 21 is a diagram illustrating an example of edge detection processing executed by a uniform aberration component-associated edge detection unit according to the second embodiment of the present invention.

A specific example of a method for the edge detection processing corresponding to the uniform aberration component, performed by the uniform aberration component-associated edge detection unit 224, will be described with reference to FIG. 21. FIG. 21 illustrates an image plane 500 formed by the pseudo luminance signal. The uniform aberration component-associated edge detection unit 224 segments the image plane 500 into eight regions such as an N region, an NE region, an E region, an SE region, an S region, an SW region, a W region, and an NW region, using parting lines along radial directions the origin of which is in the coordinates C of the pixel of the central position of the image plane 500.

In addition, in the N region, by setting a kernel 511 for a filter in the uniform aberration component-associated edge detection unit 224, an edge in a horizontal direction is detected in accordance with a detection direction from the left of the image plane 500 to the right thereof, for example. In the same way, also in the S region, by setting a kernel 512, which is the same as the kernel 511, for the filter, an edge in a horizontal direction is detected in accordance with a detection direction from the left of the image plane 500 to the right thereof.

In addition, in the W region, by setting a kernel 513 for the filter in the uniform aberration component-associated edge detection unit 224, an edge in a vertical direction is detected in accordance with a detection direction from the bottom of the image plane 500 to the top thereof, for example. In the same way, also in the E region, by setting a kernel 514, which is the same as the kernel 513, for the filter, an edge in a vertical direction is detected in accordance with a detection direction from the bottom of the image plane 500 to the top thereof. In addition, the edge detection direction may be set to a direction opposite to the above-mentioned direction.

The W region and the E region are regions in which radial directions the origin of which is in the center pixel coordinates C in the image plane 500 are nearly horizontal. Accordingly, it may be assumed that the W region and the E region are regions in which, while the concentric aberration component occurs along the horizontal direction, the concentric aberration component hardly occurs along the vertical direction. Accordingly, it may be assumed that an edge in the vertical direction, detected in the W region or the E region, corresponds to a color shift along the vertical direction, which occurs in response to the uniform aberration. On the basis of the same reason, it may also be assumed that an edge in the horizontal direction, detected in the N region or the S region, corresponds to a color shift along the horizontal direction, which occurs in response to the uniform aberration. In this way, by performing the edge detection in such a way as described with reference to FIG. 21, in an embodiment of the present invention, it is possible to efficiently detect an edge in a direction corresponding to the occurrence of the uniform aberration, from a captured image obtained by taking an image of a natural picture.

In addition, when the edge detection is performed in Step S935, the uniform aberration component-associated edge detection unit 224 also detects, with respect to each detected edge, whether the detected edge is a rising edge or a negative-going edge, as the type of the change direction of the pixel value thereof. The rising edge is an edge that changes from a state in which luminance is low to a state in which luminance is high along the detection direction of the edge. The negative-going edge is an edge that changes from a state in which luminance is high to a state in which luminance is low along the detection direction of the edge.

When the N region is cited as an example, the edge detection direction is a direction from the left of the image plane to the right thereof. When the edge detection is performed along the edge detection direction on the basis of the kernel 511, the output of the filter becomes a positive value at the rising edge, and becomes a negative value at the negative-going edge. Accordingly, depending on whether the value of the output of the filter is positive or negative when an edge is detected, it can be determined whether the edge is the rising edge or the negative-going edge. In the same way, with respect to the other E region, N region, and S region, the uniform aberration component-associated edge detection unit 224 also detects the type of the change direction of the pixel value of each of detected edges. In addition, a filter other than the filter in which the kernel is used as illustrated in FIG. 21 may also be used for the filter for the edge detection, and various kinds of usual configurations or usual algorithms may also be adopted, for example.

In accordance with the above-mentioned Step S935, one or more edges are detected depending on each of image portions the luminance changes of which indicate changes greater than or equal to a certain value. Subsequent processing operations from Step S936 to Step S941 are processing operations performed in response to each of edges detected in the above-mentioned Step S935.

For example, first, the window generation unit 225 assigns "1", which is an initial value, to a variable N corresponding to a number assigned to a detected edge (Step S936), and sets a window corresponding to a Nth edge, for each of the R signal and the interpolated G signal (Step S937). Namely, for the 1/4-plane image of the R signal, generated in the above-mentioned Step S933, the window generation unit 225 sets a window which has a predetermined size with a position at the center, the Nth edge being detected at the position. In the same way, for the same position of the 1/4-plane image of the interpolated G signal, generated in the above-mentioned Step S933, the window generation unit 225 also sets a window which has the same size.

Next, for example, after fixing the window of the interpolated G signal, set in the above-mentioned Step S937, the difference absolute value sum calculation unit 226 shifts the window of the R signal within a range of a predetermined displacement amount. In addition, while shifting the window, the difference absolute value sum calculation unit 226 calculates a difference absolute value sum with respect to the pixel values of the interpolated G signal and R signal located at the same position, in such a way as described with reference to FIG. 15 (Step S938).

In addition, the shift direction of the window of the R signal in Step S938 is as follows, depending on the detection direction of the Nth edge. Namely, when the Nth edge is an edge in the vertical direction, detected in the W region or the E region, the window of the R signal is shifted in the vertical direction. On the other hand, when the Nth edge is an edge in the horizontal direction, detected in the N region or the S region, the window of the R signal is shifted in the horizontal direction. Accordingly, a color shift amount along the direction of the detected edge can be appropriately obtained.

Figure 22:
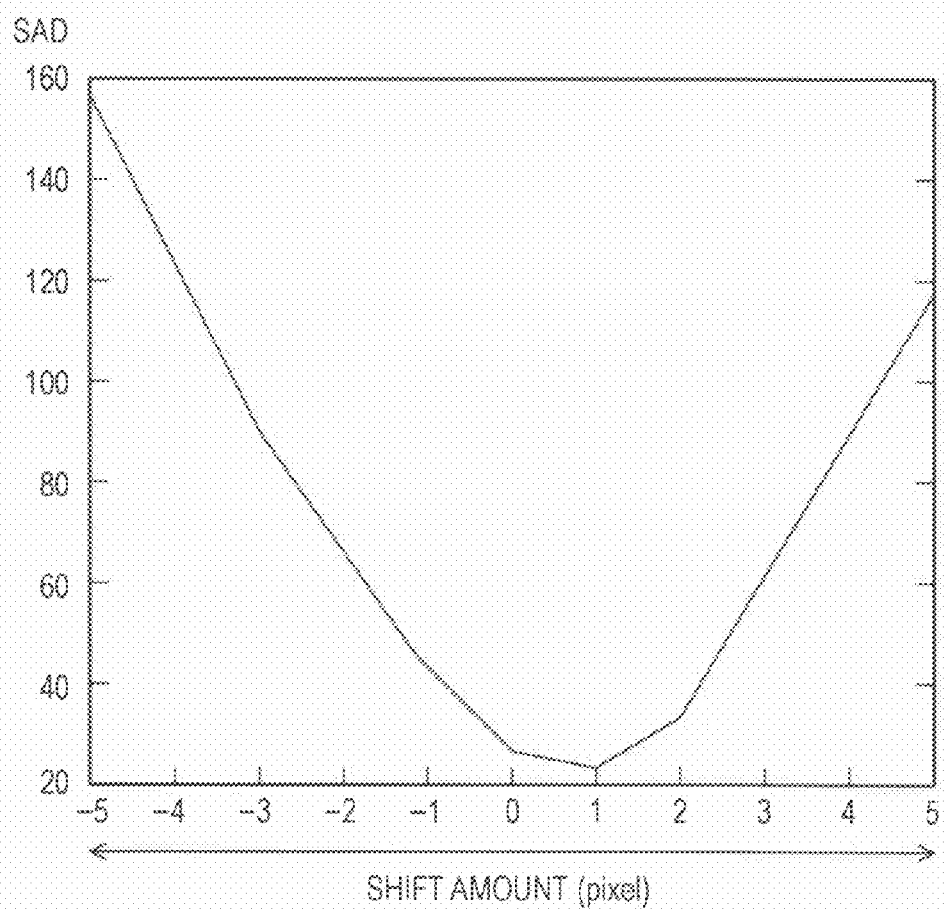
FIG. 22 is a diagram illustrating an example of a calculation result of a difference absolute value sum obtained by a difference absolute value sum calculation unit according to the second embodiment of the present invention.

FIG. 22 illustrates a relationship between the difference absolute value sum (SAD value), calculated in response to one edge in Step S938, and the shift amount of the window. For example, in FIG. 22, the difference absolute value sum is a minimum value at the shift amount of "+1", and the difference absolute value sum increases with the value of the shift amount changing from "+1". A correlation between the window of the interpolated G pixel and the window of the R pixel becomes higher with the difference absolute value sum becoming smaller, and the correlation becomes lower with the difference absolute value sum becoming greater. In addition, a shift amount corresponding to the minimum difference absolute value sum corresponds to the color shift amount of the R signal with respect to the interpolated G signal. In the example illustrated in FIG. 22, when the window of the R pixel is shifted by a shift amount corresponding to a "+1" pixel, with respect to the window of the interpolated G signal, the difference absolute value sum has the lowest value. Namely, the color shift amount of the R signal with respect to the interpolated G signal in the case of this figure corresponds to the shift amount corresponding to the "+1" pixel.

In addition, the window setting performed by the window generation unit 225 and the calculation processing for the difference absolute value sum, performed by the difference absolute value sum calculation unit 226, are examples of methods of block matching processing for an image. In an embodiment of the present invention, for example, the correlation between the interpolated G signal and the R signal may be calculated using another block matching method or the like.

Subsequently, the color shift amount calculation unit 227 calculates a color shift amount corresponding to the Nth edge from the difference absolute value sum calculated in the above-mentioned Step S938 (Step S939). In addition, as described above, the color shift amount here is calculated down to the sub-pixel unit smaller than the pixel unit, on the basis of an interpolation operation, for example.

Next, for example, the window generation unit 225 determines whether or not the current variable N is greater than a maximum value (Step S940). Here, when the variable N is less than or equal to the maximum value, an edge a color shift amount for which has not been calculated remains. Therefore, in this case, the processing operation returns to the processing in Step S937, and the calculation of a color shift amount for a subsequent edge is performed.

In addition, when, owing to the calculation of color shift amounts for all edges, it is determined in Step S940 that the N becomes greater than the maximum value, the uniform aberration correction amount calculation unit 214A calculates a uniform aberration correction amount (Step S970). While the calculation processing for the uniform aberration correction amount is performed using the color shift amount for each edge, calculated in the above-mentioned Step S939, and the type of the change direction of the pixel value of each edge, detected in the edge detection processing in Step S935, the calculation processing will be described later.

Next, first, the color-shift-destination pixel value calculation unit 215 calculates the pixel value (corrected pixel value) of a color-shift-destination pixel that corresponds to a color shift amount component occurring in response to the uniform aberration, using the uniform aberration correction amount calculated in the above-mentioned Step S970 (Step S941). As described above, with respect to the pixel value of the color-shift-destination pixel, after the coordinates of the color-shift-destination pixel are obtained in units of sub-pixels, the pixel value of the coordinates is calculated using interpolation processing. The processing is performed for each of the R pixels in the R signal. Next, the color-shift-destination pixel value calculation unit 215 rewrites the pixel value of each of the R pixels in the R signal with the calculated pixel value of the color-shift-destination pixel (Step S942). Owing to the processing operations performed so far, first, the uniform aberration component of the R signal turns out to be corrected.

Processing illustrated in FIG. 17 is correction processing for the concentric aberration component of the R signal. For this purpose, first, the 1/4-plane image generation unit 222 inputs the R signal the uniform aberration component of which has been corrected on the basis of the pixel value rewriting processing in the above-mentioned Step S943 (Step S943). In addition, the 1/4-plane image of the input R signal is generated (Step S944).

Next, the pseudo luminance signal generation unit 223 generates a pseudo luminance signal using the 1/4-plane image of the R signal, generated in the above-mentioned Step S944, and the 1/4-plane image of the interpolated G signal, generated in the above-mentioned Step S933 (Step S945).

The pseudo luminance signal generated in the above-mentioned Step S945 is input to the concentric aberration component-associated edge detection unit 228. In addition, the concentric aberration component-associated edge detection unit 228 detects an edge corresponding to the concentric aberration component, from the input pseudo luminance signal (Step S946).

Figure 23:
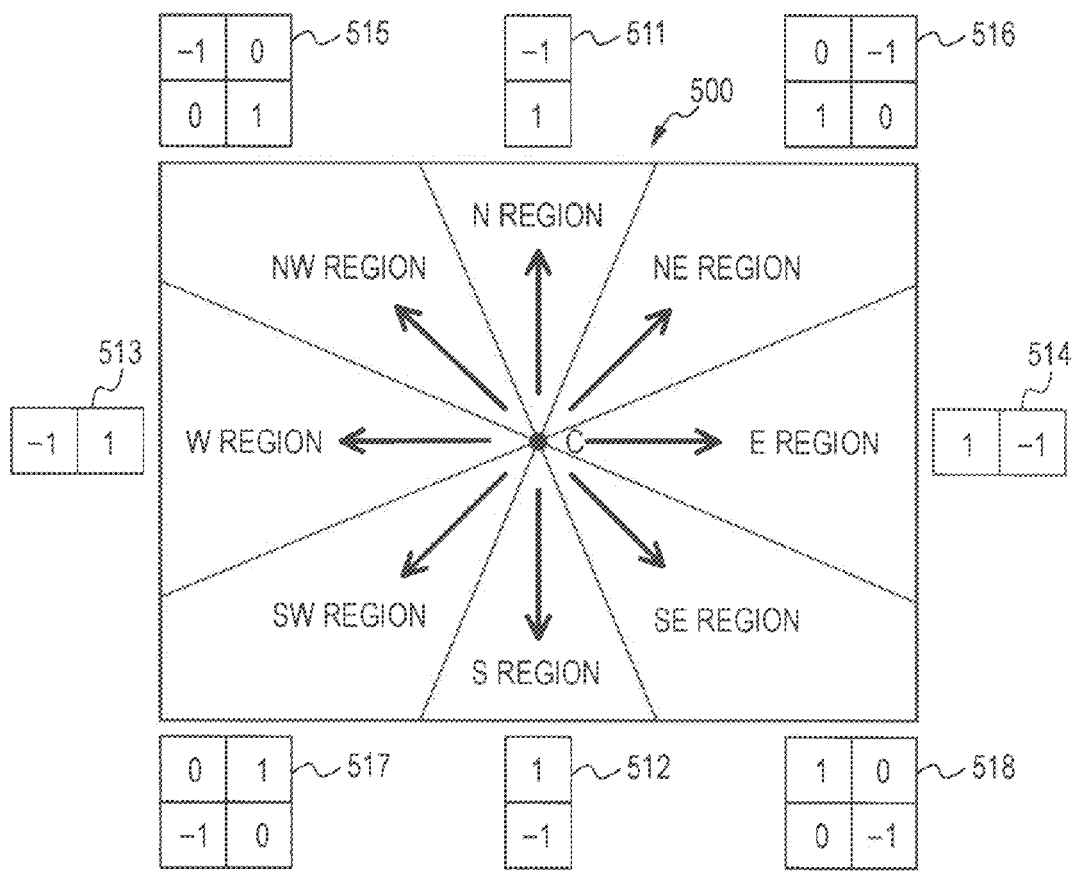
FIG. 23 is a diagram illustrating an example of edge detection processing executed by a concentric aberration component-associated edge detection unit according to the second embodiment of the present invention.

An example of a method for the above-mentioned edge detection processing corresponding to the concentric aberration component will be described with reference to FIG. 23. FIG. 23 illustrates the image plane 500 formed by the pseudo luminance signal. In the same way as in FIG. 21, at the time of edge detection, the concentric aberration component-associated edge detection unit 228 segments the image plane 500 into eight regions such as the N region, the NE region, the E region, the SE region, the S region, the SW region, the W region, and the NW region. In addition, in this case, an edge in the radial direction (image height direction) is detected in each of these regions. For this purpose, kernels 511, 516, 514, 518, 512, 517, 513, and 515 are set for the above-mentioned eight regions such as the N region, the NE region, the E region, the SE region, the S region, the SW region, the W region, and the NW region, respectively. In addition, at the time of edge detection in Step S946, in the same way as the above-mentioned uniform aberration component-associated edge detection unit 224, the concentric aberration component-associated edge detection unit 228 also detects whether each of detected edges is a rising edge or a negative-going edge. In addition, since the concentric aberration is aberration that occurs in the image height direction, namely, the radial direction, an edge may be detected in at least one of the above-mentioned eight regions, for example, in order to hold the processing to a minimum. In addition, the image plane 500 may be segmented into regions the number of which is greater than eight. In an embodiment of the present invention, on ground that the correction amount is calculated with a high degree of accuracy and the calculation amount does not greatly exceed an allowable range, the edge detection is performed in eight directions, for example.

Next, the window generation unit 225 assigns "1" to a variable N corresponding to a number assigned to a detected edge (Step S947), and sets a window corresponding to a Nth edge, for each of the R signal and the interpolated G signal (Step S948). In addition, the R signal the window of which is set in this Step S949 is the 1/4-plane image subjected to the uniform aberration correction, generated in Step S944.

Next, after fixing the window of the interpolated G signal, the difference absolute value sum calculation unit 226 calculates a difference absolute value sum (SAD) with shifting the window of the R signal (Step S949). In this Step S949, the window is shifted along the radial direction (image height direction) in which the Nth edge is detected.

Next, the color shift amount calculation unit 227 calculates a color shift amount corresponding to the Nth edge from the difference absolute value sum calculated in the above-mentioned Step S949, for example, using the interpolation operation in the same way as in the above-mentioned Step S939 (Step S950). Next, the aberration magnification calculation unit 229 calculates an aberration magnification from the color shift amount calculated in the above-mentioned Step S950 (Step S951).

Next, the aberration magnification frequency information generation unit 230 determines whether or not the Nth edge is detected as a rising edge (Step S952). When it is determined that the Nth edge is a rising edge, the aberration magnification frequency information generation unit 230 registers the aberration magnification, calculated in response to the Nth edge, in a rising edge-associated histogram (Step S953). Namely, the histogram includes a bin corresponding to each aberration magnification. In Step S954, the frequency of a bin to which the aberration magnification calculated in response to the Nth edge corresponds is incremented. On the other hand, when, in Step S952, it is determined that the Nth edge is not a rising edge, the aberration magnification frequency information generation unit 230 registers the aberration magnification, calculated in response to the Nth edge, in a negative-going edge-associated histogram (Step S954).

Next, for example, after incrementing the variable N (Step S955), the window generation unit 225 determines whether or not the variable N is a maximum value (Step S956). Until, in this Step S956, it is determined that the variable N is the maximum value, the processing operations from Step S948 to Step S954 are repeated.

Figure 24:
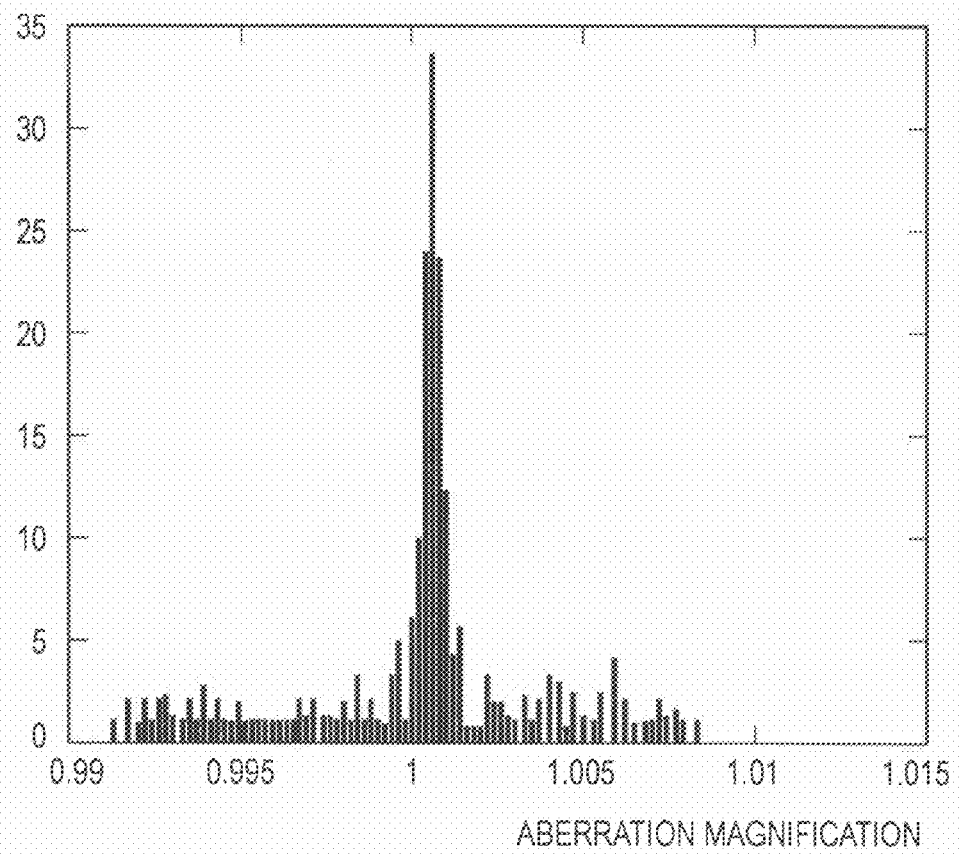
FIG. 24 is a diagram illustrating an example of a histogram created by an aberration magnification frequency information generation unit according to the second embodiment of the present invention.

In a stage in which, in Step S956, it is determined that the Nth edge is the maximum value, the rising edge-associated histogram and the negative-going edge-associated histogram are formed in which the statistics of the occurrence rates of the aberration magnifications of all of detected rising edges and detected negative-going edges are compiled. FIG. 24 illustrates an example of the rising edge-associated histogram or the negative-going edge-associated histogram, obtained in this stage. In this way, the rising edge-associated histogram and the negative-going edge-associated histogram illustrate the occurrence rates of aberration magnifications with the frequencies thereof.

Next, the concentric aberration correction amount calculation unit 213A calculates a concentric aberration correction amount (Step S980). For the calculation of the concentric aberration correction amount, information of the occurrence rates of aberration magnifications corresponding to rising edges, indicated by the rising edge-associated histogram, is used. In addition, information of the occurrence rates of aberration magnifications corresponding to negative-going edges, indicated by the negative-going edge-associated histogram, is used. An example of a processing procedure for the calculation of the concentric aberration correction amount performed in Step S980 will be described later.

In addition, for example, the formation of the rising edge-associated histogram and the negative-going edge-associated histogram that correspond to Step S953 and S954, respectively, may be performed in such a way that the formation is individually performed in ring-shaped regions in which image heights are about the same. In response to this, the concentric aberration correction amount is also calculated in each of the ring-shaped regions. Accordingly, since the concentric aberration correction amount corresponding to an image height is obtained, aberration correction can be performed with a higher degree of accuracy.

Next, with respect to each of the R pixels, the color-shift-destination pixel value calculation unit 215 calculates the pixel value (corrected pixel value) of a color-shift-destination pixel that corresponds to the concentric aberration correction amount calculated in the above-mentioned concentric aberration correction amount calculation unit 213A (Step S957). The pixel value correction unit 216 rewrites the pixel value of each of the R pixels with the corrected pixel value calculated in the above-mentioned Step S957 (Step S958). Accordingly, the R signal turns out to be subjected to the uniform aberration correction and the concentric aberration correction. Namely, the magnification chromatic aberration correction turns out to be performed. As a result, for example, the pixel value correction unit 216 outputs the R signal the magnification chromatic aberration of which is corrected in the above-mentioned Step S958, as an R component in an aberration-corrected image signal (Step S959).

Subsequently, in the same processing procedure as that performed so far from Step S931 to Step S959, magnification chromatic aberration correction is performed the correction processing target of which is the B signal in the processing target image signal (Step S960). Owing to the execution of the processing so far, for example, the magnification chromatic aberration correction for one frame image turns out to be performed.

[Necessity of Edge Change Direction Detection]

As understood from the description so far, in the second embodiment of the present invention, at the time of edge detection, the change direction of the edge is detected. Namely, it is detected whether the edge is a rising edge or a negative-going edge. In addition, the change direction of the edge is used for the calculation of an aberration correction amount. In the magnification chromatic aberration correction according to the second embodiment of the present invention, the detection result of the change direction of the edge is used on the basis of the following reason. In addition, hereinafter, in order to provide a comprehensible explanation, as a matter of convenience, the concentric aberration component in the magnification chromatic aberration will be described.

Figure 25:
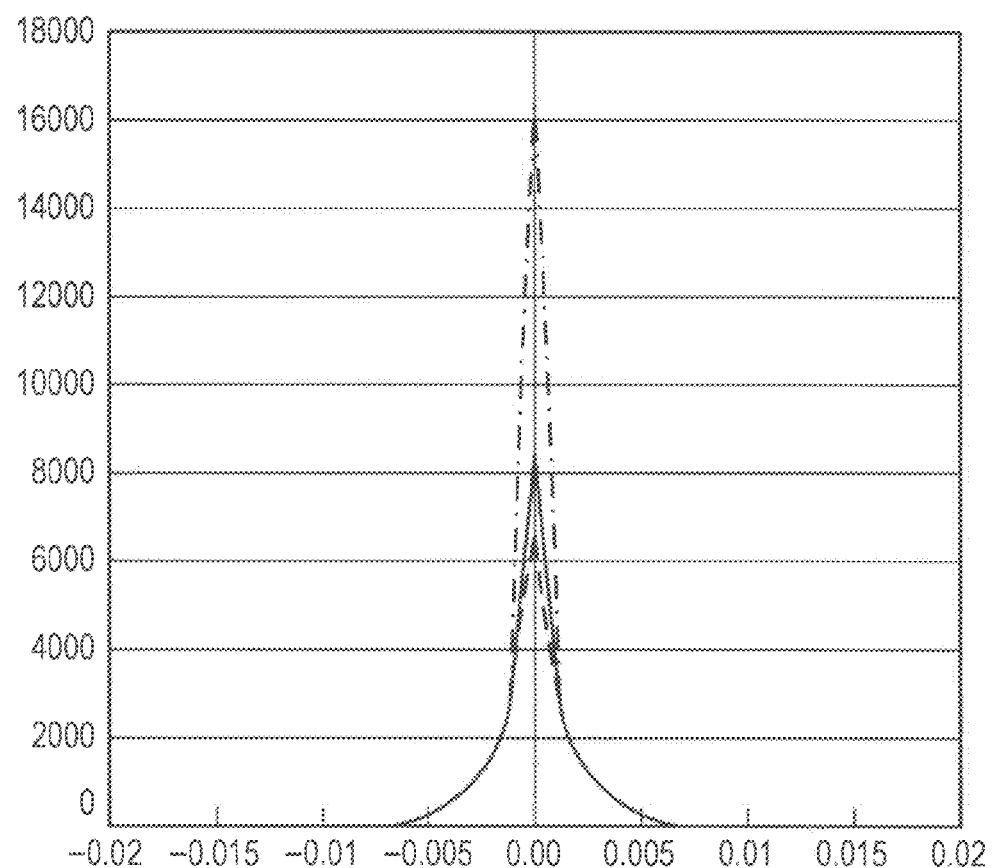
FIG. 25 is a diagram illustrating an example of line image intensity distribution on an optical axis.

FIGS. 25 and 26 illustrate line image intensity distribution functions (Line Spread Function: LSF). FIG. 25 illustrates a line image intensity distribution obtained on an image center position (image height: "0") corresponding to the optical axis of a lens, and FIG. 26 illustrates a line image intensity distribution on an image height the value of which is a predetermined value based on an absolute value more than or equal to "0", located at a certain distance from the image center position. A horizontal axis corresponds to an image height, and a vertical axis corresponds to optical intensity. In addition, here, the value of an image height on the horizontal axis indicates, with a positive value, an image height direction corresponding to a predetermined radial direction, and indicates, with a negative value, an image height direction corresponding to a radial direction point-symmetrical to the former radial direction. In addition, a solid line indicates an R component, a dashed-dotted line indicates a G component, and a dashed line indicates a B component.

In FIG. 25, the peaks of the line image intensity distributions of the individual colors of R, G, and B are coincide with one another at the image height "0". In addition, it may be assumed that the distribution profiles thereof are profiles in which the distributions are almost bilaterally symmetric with respect to the image height "0". On the other hand, in FIG. 26, image heights vary at which the peaks of the line image intensity distributions of the individual colors of R, G, and B appear. This corresponds to the concentric aberration in the magnification chromatic aberration. In addition, as the distribution profiles, the bases thereof spread compared with those in FIG. 25, and the symmetric properties thereof with respect to the peaks are lost. This figure illustrates a shape in which a base portion on a side on which the image height value is high with respect to the peak widely spreads compared with that on a side on which the image height value is low.

In the example illustrated in FIG. 26, with respect to the peak of the distribution profile, a base shape on the side on which the image height value is high is correlated to the characteristic of the negative-going edge, and a base shape on the side on which the image height value is low is correlated to the characteristic of the rising edge. Accordingly, depending on the phenomenon that, in such a way as described above, the shape of the line image intensity distribution becomes asymmetric with the increase in the image height, the color shift amounts occurring in the rising edge and the negative-going edge in an image owing to the concentric aberration become different from each other.

For example, in a technique of the related art, it is not detected whether an edge is a rising edge or a negative-going edge, and one histogram reflecting the statistics of aberration magnifications with respect to all detected edges is created. In this case, actually, since a color shift amount varies depending on whether an edge is a rising edge or a negative-going edge, the peaks of two frequencies individually corresponding to the rising edge and the negative-going edge appear in the histogram. In this case, for example, a correction amount is obtained on the basis of an aberration magnification corresponding to one of the peaks. As a result, a correction result turns out to be obtained in which aberration correction is performed only on one of the rising edge and the negative-going edge and aberration correction is not adequately performed on the other of the rising edge and the negative-going edge. It is confirmed that an image corrected in such a way tends to give the impression that the image does not visually obtain an adequate correction effect.

To that end, as an embodiment of the present invention, for example, when the concentric aberration is corrected, detected edges are sorted into the rising edge and the negative-going edge, and a histogram is formed with respect to each of the rising edge and the negative-going edge. Accordingly, an aberration magnification, namely, a correction amount can be accurately calculated with respect to each of the rising edge and the negative-going edge.

[Example of Concentric Aberration Correction Amount Calculation Processing]

The concentric aberration correction amount calculation processing performed in Step S980 in FIG. 17 uses the statistical results of histograms individually obtained in response to the rising edge and the negative-going edge in such a way as described above. While some examples of the concentric aberration correction amount calculation processing are considered, the concentric aberration correction amount calculation processing will be described with reference to four examples, here.

First, as s first example, an aberration magnification (rising edge-associated mode aberration magnification) is specified that corresponds to a maximum frequency in a rising edge-associated histogram. In the same way, an aberration magnification (negative-going edge-associated mode aberration magnification) is specified that corresponds to a maximum frequency in a negative-going edge-associated histogram. In addition, the simple average of these mode aberration magnifications is calculated. Using this calculated value, a correction amount is calculated. In addition, a rising edge-associated aberration magnification and a negative-going edge-associated aberration magnification may be determined on the basis of aberration magnifications corresponding to mode values in the rising edge-associated histogram and the negative-going edge-associated histogram, respectively.

In addition, as a second example, the weighted average of the rising edge-associated mode aberration magnification and the negative-going edge-associated mode aberration magnification is calculated, and using the value of the weighted average, a correction amount is obtained. A weight coefficient used in the calculation of the weighted average is set as follows, for example. First, for example, one image height to be a representative is preliminarily determined, and the point image intensity distribution of the optical lens unit 101 is measured at the image height. Alternatively, in place of the measurement, a point image intensity distribution defined as the specification of the optical lens unit 101 is prepared. In addition, a ratio between the area of a right side and the area of a left side is calculated with the peak of the shape of the point image intensity distribution being set as a boundary therebetween. On the basis of the area ratio, the weight coefficients of the rising edge-associated mode aberration magnification and the negative-going edge-associated mode aberration magnification are calculated. In addition, for example, it may be considered that, actually, the combination of weight coefficients is changed with a chart image of a predetermined design being captured, and weight coefficients are adopted when an image subjected to correction is favorable.

Figure 27A:
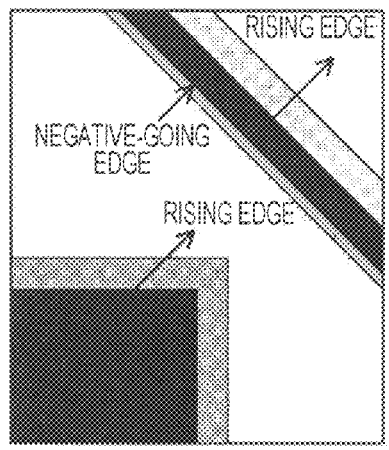
FIGS. 27A to 27D are diagrams illustrating examples of a correction result for a rising edge and a negative-going edge in an image.

Here, an advantageous effect of the concentric aberration correction according to the second example will be described with reference to FIGS. 27A to 27D. FIG. 27A illustrates a portion in an image, obtained on the basis of an image signal before the concentric aberration correction. For example, in the image, a black portion is actually blue, and a white portion other than the black portion is actually white. In addition, a portion the edge of which is gradated by a color shift occurring owing to the concentric aberration is indicated with hatching. For example, actually, a yellow color or the like appears in the portion in which the color shift occurs. In the example in this figure, a case is illustrated in which the gradation of a rising edge portion becomes larger than that of a negative-going edge portion.

Figure 27B:
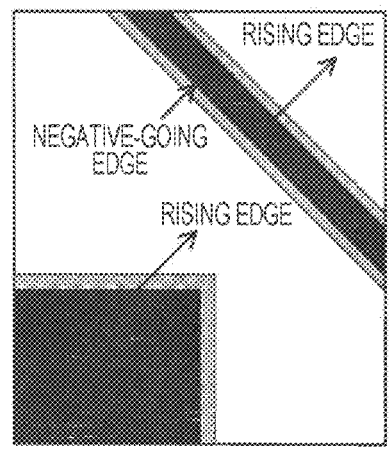

Compared to the image illustrated in FIG. 27A, FIG. 27B illustrates an image obtained when the concentric aberration correction is performed only on the basis of the rising edge-associated mode aberration magnification. In addition, compared to the image illustrated in FIG. 27A, FIG. 27C illustrates an image obtained when the concentric aberration correction is performed only on the basis of the negative-going edge-associated mode aberration magnification, for example.

Figure 27C:
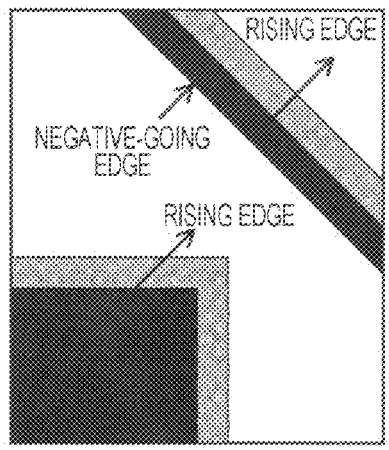

Namely, compared with the second example, FIGS. 27B and 27C illustrate results obtained when the concentric aberration correction is performed only on the basis of one of the rising edge-associated mode aberration magnification and the negative-going edge-associated mode aberration magnification without a weighted average being calculated.

In addition, FIGS. 27B and 27C also correspond to the result of the concentric aberration correction performed in the configuration, described above as the technique of the related art, in which an edge is detected without a rising edge and a negative-going edge being sorted out and one histogram reflecting the statistic of the aberration magnifications of detected edges is obtained. Namely, if correction is performed on the basis of an aberration magnification corresponding to the peak of the rising edge from among two peaks appearing in the histogram, the result illustrated in FIG. 27B is obtained. On the other hand, if correction is performed on the basis of an aberration magnification corresponding to the peak of the negative-going edge, the result illustrated in FIG. 27C is obtained.

Figure 27D:
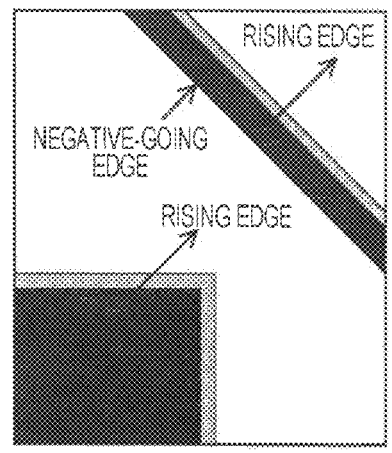

On the other hand, FIG. 27D illustrates an image obtained when the concentric aberration correction is performed on the basis of the weighted average of the rising edge-associated mode aberration magnification and the negative-going edge-associated mode aberration magnification.

As understood from these figures, in FIG. 27B, only a color shift in the rising edge portion is corrected, and a color shift in the negative-going edge portion remains uncorrected. On the other hand, in FIG. 27C, only a color shift in the negative-going edge portion is corrected, and a color shift in the rising edge portion remains uncorrected. Namely, when, in such a way as in the technique of the related art, the rising edge and the negative-going edge are not sorted out, a correction effect is biased, and an adequate correction effect is not obtained as a whole. On the other hand, in FIG. 27D corresponding to an embodiment of the present invention, with respect to each of the rising edge portion and the negative-going edge portion, a color shift is corrected in response to a degree based on a weighting coefficient. Namely, a high correction effect can be obtained as a whole.

Next, as a third example, the degree of reliability (degree of edge reliability) of each of the rising edge and the negative-going edge is obtained. In addition, a mode aberration magnification corresponding to an edge having a higher degree of edge reliability is adopted. For example, sometimes, a state happens in which one of the rising edge and the negative-going edge is clear and the other is obscure, depending on image content. For example, it may be considered that an edge appearing more clearly has a higher degree of reliability.

For example, the above-mentioned degree of edge reliability can be obtained on the basis of the difference absolute value sum calculated in Step S949 in FIG. 17. For example, in a figure in which the relationship between the shift position and the difference absolute value sum illustrated in FIG. 22 is illustrated, only one extreme value corresponding to a minimum value is obtained. However, actually, when an edge is not clear, a result is obtained in which plural extreme values corresponding to a minimum value appear. For this purpose, when the difference absolute value sum has been calculated in Step S949, the number of extreme values corresponding to a minimum value is determined, and a score according to the determined number of extreme values is provided. For example, the score is provided in such a way that the score has a maximum value when the number of extreme values corresponding to a minimum value is one and subsequently the value thereof decreases with the increase in the number of extreme values. In addition, every time Step S949 is repeatedly performed, the score is incremented with respect to each of the rising edge and the negative-going edge. Accordingly, in a stage in which color shift amounts are calculated with respect to all edges, an overall score corresponding to each of the rising edge and the negative-going edge turns out to be obtained. Namely, the overall score is the degree of edge reliability, and basically, it is considered that one of the rising edge and the negative-going edge, which has the higher overall score, has the higher degree of edge reliability.

Figure 18:
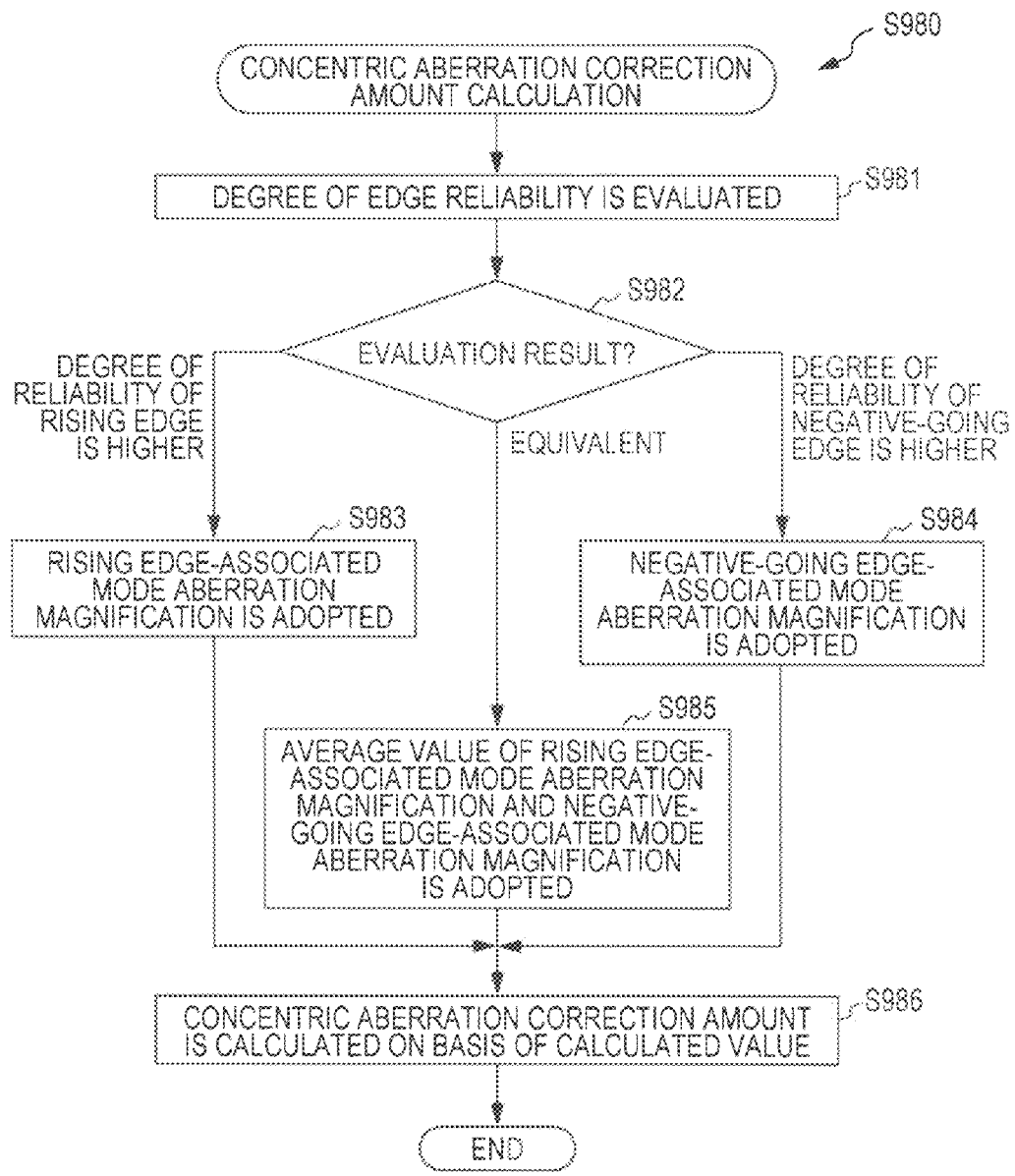
FIG. 18 is a diagram illustrating an example of a processing procedure for calculating a concentric aberration correction amount, executed by the magnification chromatic aberration correction unit.

As the processing for calculating the concentric aberration correction amount, performed in Step S980, a flowchart in FIG. 18 illustrates an example of processing in which the degree of edge reliability calculated in such a way as described above is used. First, the concentric aberration correction amount calculation unit 213A evaluates the degree of edge reliability (overall score) of each of the rising edge and the negative-going edge, calculated in such a way as described above (Step S981). The evaluation of the degree of edge reliability here is performed to determine whether or not the degree of edge reliability of the rising edge is equivalent to the degree of edge reliability of the negative-going edge, and if the degree of edge reliability of the rising edge is not equivalent to the degree of edge reliability of the negative-going edge, the evaluation of the degree of edge reliability is performed to determine which of the rising edge and the negative-going edge has the higher degree of edge reliability.

In addition, as specific processing for the evaluation performed in the above-mentioned Step S981, the following processing may be considered, for example. For example, under the condition that the overall score of the rising edge is A and the overall score of the negative-going edge is B, a difference value C is calculated in accordance with an operation based on (C=A−B). In addition, the absolute value of the difference value C is compared with a predetermined threshold value D, and if the absolute value of the difference value C is less than the predetermined threshold value D, an evaluation result is output which indicates that the degrees of reliability of both the rising edge and the negative-going edge are equivalent to each other. On the other hand, if the absolute value of the difference value C is greater than or equal to the predetermined threshold value D and the difference value C is positive, an evaluation result is output which indicates that the degree of reliability of the rising edge is higher than that of the negative-going edge. In addition, if the absolute value of the difference value C is greater than or equal to the predetermined threshold value D and the difference value C is negative, an evaluation result is output which indicates that the degree of reliability of the negative-going edge is higher than that of the rising edge.

Next, the concentric aberration correction amount calculation unit 213A determines the evaluation result output in the above-mentioned Step S981 (Step S982). It may be assumed that, in this Step S982, on the basis of the determination, the evaluation result indicates that the degree of reliability of the rising edge is higher than that of the negative-going edge. In this case, the concentric aberration correction amount calculation unit 213A adopts the rising edge-associated mode aberration magnification as an aberration magnification used for the calculation of a correction amount (Step S983). On the other hand, when, on the basis of the determination, the evaluation result indicates that the degree of reliability of the negative-going edge is higher than that of the rising edge, the concentric aberration correction amount calculation unit 213A adopts the negative-going edge-associated mode aberration magnification as an aberration magnification used for the calculation of a correction amount (Step S984).

Furthermore, when, in Step S982, it is determined that the evaluation result indicates that the degrees of reliability of both the rising edge and the negative-going edge are equivalent to each other, the concentric aberration correction amount calculation unit 213A calculates the average value of the rising edge-associated mode aberration magnification and the negative-going edge-associated mode aberration magnification. In addition, the calculated average value is adopted as an aberration magnification used for the calculation of a correction amount (Step S985). The average-value calculation processing may be processing for calculating the simple average in the first example, and may be processing for calculating the weighted average in the second example. In addition, the concentric aberration correction amount calculation unit 213A calculates a concentric aberration correction amount using the aberration magnification adopted in one of the above-mentioned Steps S983, S984, and S985 (Step S986).

In addition, as a fourth example, for example, the rising edge-associated mode aberration magnification is adopted for pixels in an image area in which the rising edge is detected, and a concentric aberration correction amount is calculated. On the other hand, a configuration may also be considered in which the negative-going edge-associated mode aberration magnification is adopted for pixels in an image area in which the negative-going edge is detected, and a concentric aberration correction amount is calculated.

[Example of Uniform Aberration Correction Amount Calculation Processing]

Aberration based on the above-mentioned rising edge and negative-going edge is prominent in the concentric aberration component that causes a color shift to occur depending on an image height. Accordingly, it is an effective way to perform correction, based on both the rising edge and the negative-going edge, on the concentric aberration in such a way as described above. However, while being small compared with in the concentric aberration, the color shifts also occur in the rising edge and the negative-going edge with respect to the uniform aberration component. For this purpose, in an embodiment of the present invention, correction based on both the rising edge and the negative-going edge is also performed for the uniform aberration. Therefore, in such a way as described above with reference to FIG. 21, the uniform aberration component-associated edge detection unit 224 detects whether an edge is a rising edge or a negative-going edge.

Figure 19:
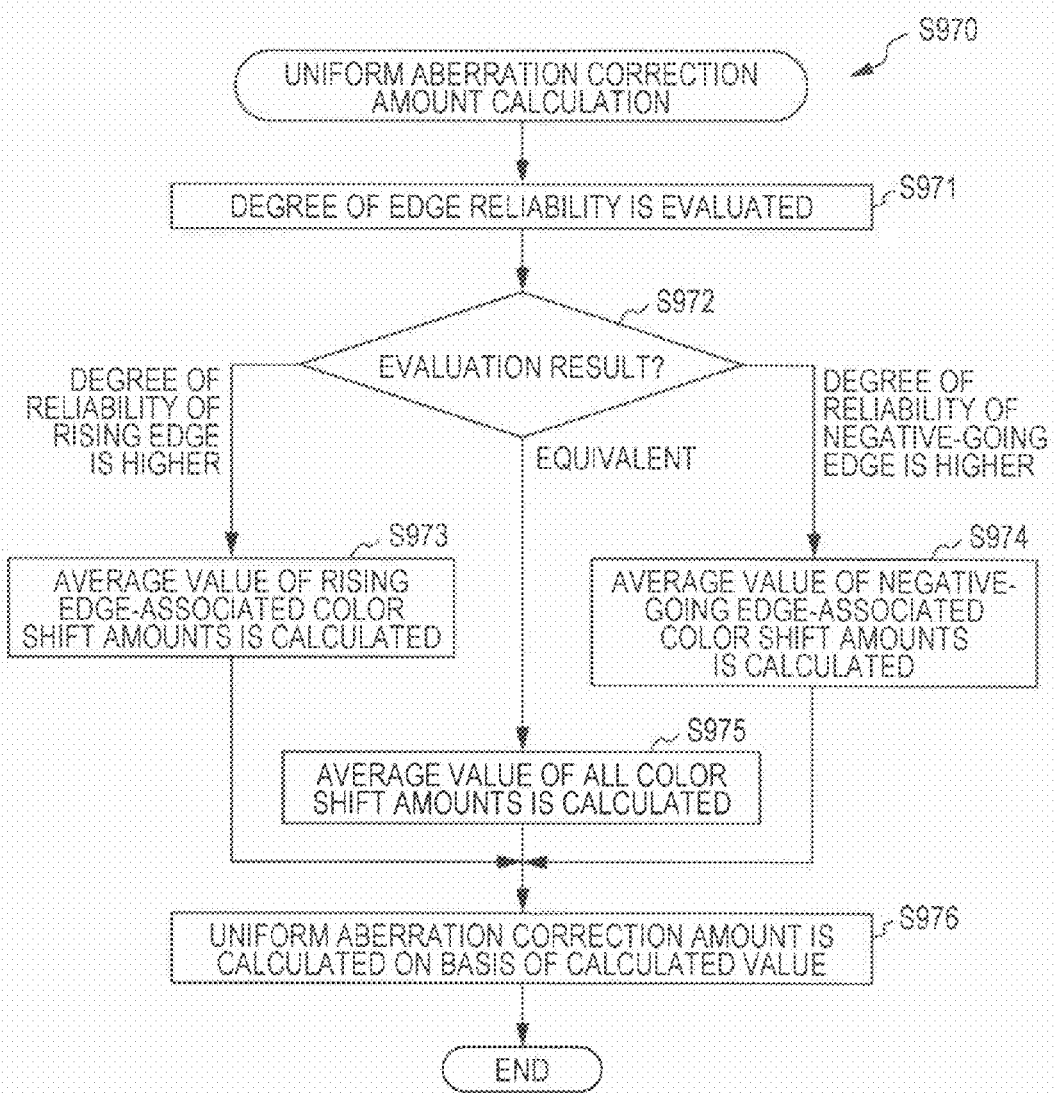
FIG. 19 is a diagram illustrating an example of a processing procedure for calculating a uniform aberration correction amount, executed by the magnification chromatic aberration correction unit.

In conformity with the third example of the calculation of the concentric aberration correction amount, described above with reference to FIG. 18, a flowchart in FIG. 19 illustrates an example of a processing procedure for calculating the uniform aberration correction amount on the basis of the degree of edge reliability. First, the uniform aberration correction amount calculation unit 214A evaluates the degree of reliability of the rising edge and the degree of reliability of the negative-going edge (Step S971). In addition, the degree of edge reliability, namely, the overall score, of each of the negative-going edge and the negative-going edge, which corresponds to the uniform aberration correction, is obtained on the basis of the difference absolute value sum calculated in Step S938 in FIG. 16, in conformity with the above description. Next, the uniform aberration correction amount calculation unit 214A determines what the evaluation result output in the above-mentioned Step S971 is (Step S972).

When, in the above-mentioned Step S972, it is determined that the evaluation result indicates that the degree of reliability of the rising edge is higher than that of the negative-going edge, the uniform aberration correction amount calculation unit 214A calculates the average value of all color shift amounts calculated in response to the rising edge (Step S973). On the other hand, when, in the above-mentioned Step S972, it is determined that the evaluation result indicates that the degree of reliability of the negative-going edge is higher than that of the rising edge, the uniform aberration correction amount calculation unit 214A calculates the average value of all color shift amounts calculated in response to the negative-going edge (Step S974). The color shift amount obtained in response to the uniform aberration correction includes a horizontal direction component and a vertical direction component. For example, the above-mentioned processing for calculating the average value is performed with respect to each of the horizontal direction component and the vertical direction component.

In addition, when, in Step S972, it is determined that the evaluation result indicates that the degrees of reliability of both the rising edge and the negative-going edge are equivalent to each other, the following processing is performed. Namely, the average value of color shift amounts of all edges including a combination of the rising edge and the negative-going edge is calculated (Step S975). The average-value calculation processing in Step S976 may also be processing for calculating a simple average, and may be processing for calculating a weighted average. In addition, the uniform aberration correction amount calculation unit 214A calculates a uniform aberration correction amount using the aberration magnification adopted in one of the above-mentioned Steps S973, S974, and S975 (Step S976).

In addition, a configuration may be adopted in which the calculation of the uniform aberration correction amount is performed in conformity with the second example of the calculation of the concentric aberration correction amount. Namely, a weighting coefficient corresponding to the color shift amount of each of the rising edge and the negative-going edge is obtained in such a way as described above. In addition, using the weighting coefficient, the weighted average of all color shift amounts is calculated, and the weighted average is defined as a correction amount.

In addition, in conformity with the calculation processing for the concentric aberration correction amount, in the calculation of the uniform aberration correction amount, histograms of color shift amounts may also be created with the histograms being associated with the rising edge and the negative-going edge, respectively, for example. In addition, using a color shift amount the occurrence rate of which is greatest in these histograms, a correction amount is obtained on the basis of processing conforming with one of the first to the third examples of the concentric aberration correction amount calculation, for example. In addition, at the time of the uniform aberration correction amount calculation, processing conforming with the fourth example of the concentric aberration correction amount calculation may also be applied.

In this regard, however, the inventors of the present invention, etc. confirm that, with respect to the correction of the uniform aberration component, a preferable correction effect is obtained on the basis of a correction amount calculated from the average value of the color shift amounts of the rising edge or the negative-going edge, with no histogram being used. Therefore, in an embodiment of the present invention, for example, as described with reference to FIG. 19, with respect to the correction of the uniform aberration component, a correction amount is obtained on the basis of the result of the calculation of the average value of color shift amounts while processing for creating a histogram is not performed. Accordingly, at the time of the calculation of a correction amount corresponding to the uniform aberration component, it is possible to reduce a calculation amount.

Furthermore, the inventors of the present invention, etc. also confirm that, with respect to the uniform aberration component, practicable correction effect is obtained even if correction is performed on the basis of a correction amount calculated from the average value of the color shift amounts of all detected edges, without the rising edge and the negative-going edge being sorted out.

However, in an embodiment of the present invention, for example, depending on the degree of an actually necessary correction effect, with respect to the concentric aberration, correction processing may also be adopted in which no histogram is used. Namely, with respect to the concentric aberration, a configuration may also be adopted in which correction is performed on the basis of a correction amount calculated from the average value of the color shift amounts of the rising edge or the negative-going edge. Furthermore, a configuration may also be adopted in which correction is performed on the basis of a correction amount calculated from the average value of the color shift amounts of all detected edges.

Third Embodiment

Example of Configuration of Magnification Chromatic Aberration Correction Unit Subsequently, a third embodiment of the present invention will be described. In the third embodiment, a configuration is adopted in which the concentric aberration is corrected using the concentric aberration correction data table 240 and the uniform aberration is corrected by calculating a correction amount on the basis of an image signal obtained by imaging, thereby correcting the magnification chromatic aberration.

FIG. 28 illustrates an example of the configuration of a magnification chromatic aberration correction unit 210B according to the third embodiment. In addition, in this figure, the same symbol is assigned to the same portion as in that in FIG. 8 or FIG. 15, and the description thereof will be omitted.

First, in accordance with the correction of the concentric aberration component, the magnification chromatic aberration correction unit 210B includes the color pixel selection unit 211, the image height calculation unit 212, the concentric aberration correction amount calculation unit 213, the color-shift-destination pixel value calculation unit 215, and the pixel value correction unit 216. In addition, the magnification chromatic aberration correction unit 210B stores and holds therein the concentric aberration correction data table 240. Namely, the magnification chromatic aberration correction unit 210B includes portions other than the uniform aberration correction amount calculation unit 214 and the uniform aberration correction data table 250 in functional portions in the magnification chromatic aberration correction unit 210 in FIG. 8. The uniform aberration correction amount calculation unit 214 and the uniform aberration correction data table 250 are portions only necessary in accordance with the correction of the uniform aberration component.

In addition, in accordance with the correction of the uniform aberration component, the magnification chromatic aberration correction unit 210B includes the color pixel selection unit 211, the color signal interpolation unit 221, the 1/4-plane image generation unit 222, the pseudo luminance signal generation unit 223, and the uniform aberration component-associated edge detection unit 224. In addition, the magnification chromatic aberration correction unit 210B includes the window generation unit 225, the difference absolute value sum calculation unit 226, the color shift amount calculation unit 227, and the uniform aberration correction amount calculation unit 214A. Namely, the magnification chromatic aberration correction unit 210B includes portions necessary in accordance with the correction of the uniform aberration, from among portions in the magnification chromatic aberration correction unit 210A in FIG. 15. In the configuration, the color signal interpolation unit 221 also inputs a correction-target image signal. In the same way, a correction amount calculated in the uniform aberration correction amount calculation unit 214A is input to the color-shift-destination pixel value calculation unit 215.

[Example of Processing Procedure of Magnification Chromatic Aberration Correction Unit]

An example of a processing procedure for magnification chromatic aberration correction performed in the above-mentioned magnification chromatic aberration correction unit 210B illustrated in FIG. 28 will be described. First, the magnification chromatic aberration correction unit 210B performs processing operations from Step S901 to Step S910, described above with reference to the flowchart illustrated in FIG. 13. The processing operations performed so far are procedures for calculating the concentric aberration correction amount M.

Figure 29:
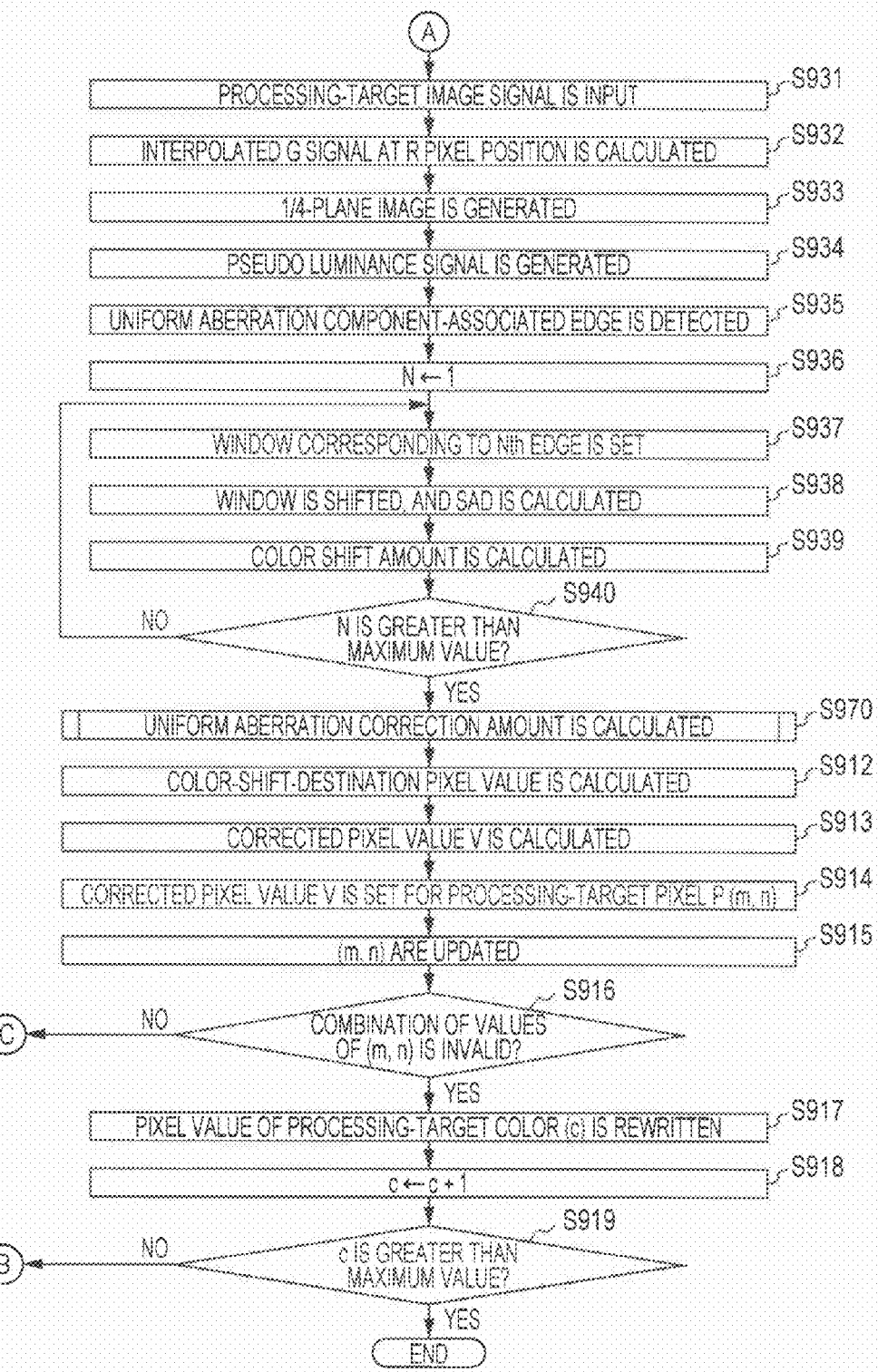
FIG. 29 is a diagram illustrating an example of a processing procedure executed by the magnification chromatic aberration correction unit.

In addition, a procedure illustrated in a flowchart in FIG. 29 is performed subsequent to Step S910. The procedure illustrated in FIG. 29 is configured in such a way that, in the flowchart in FIG. 14 illustrated above, processing operations from Step S931 to S970 in FIG. 16 are performed in place of Step S911. In addition, processing operations from Step S912 to S919 in FIG. 29 are the same as those in FIG. 14. In addition, for example, the procedure illustrated above in FIG. 19 may also be applied to Step S970. In addition, a processing operation performed in each step illustrated in FIG. 29 overlaps with that in FIG. 14 or FIG. 17, and hence the description thereof will be omitted here. In this regard, however, the color-shift-destination pixel value calculation unit 215 in this case inputs the concentric aberration correction amount M calculated in Step S910 and the uniform aberration correction amount calculated in Step S970. In addition, using these input correction amounts, the coordinate values of a color-shift-destination pixel Pd (m1, n1) are obtained on the basis of an operation conforming with the expressions described above.

The uniform aberration component is specific to each lens so as to deal with the individual variability of the lens. Therefore, in the first embodiment, it is assumed that measurement is performed for each product in a production process, in order to obtain the correction data 251 corresponding to the uniform aberration correction, for example. In an embodiment of the present invention, as described above, the combination patterns of a limited number of parameters are used as representatives, and hence the quantity of work necessary for measuring one product is reduced. However, in view of the production process, no matter how small the quantity of work is, it is desirable to eliminate the measurement work.

On the other hand, when a configuration is adopted in which a color shift amount and a correction amount are calculated from an image obtained by imaging and thereby correction is performed, in some cases, depending on the content of an actually captured image, it is difficult to calculate a color shift amount with a high degree of accuracy. In view of this, a configuration in which a correction amount is obtained from a correction data table and thereby correction is performed may stably obtain a more adequate correction effect.

For this purpose, in the third embodiment, correction utilizing a correction data table is performed for the concentric aberration component, and correction is performed for the uniform aberration component by calculating a color shift amount from a captured image. Since, as described above, a color shift amount as the concentric aberration component is determined in accordance with the characteristic of a lens, the same table obtained on the basis of simulation may be preliminarily stored in each of products with respect to the concentric aberration correction data table 240. Accordingly, the measurement work is not necessary for each product, and the stability of a correction effect also becomes high with respect to the concentric aberration. In addition, a calculation amount necessary for correction becomes smaller.

On the other hand, while, on the basis of a captured image, correction is performed for the uniform aberration component, a more stable correction effect may be expected, for example, compared with a case in which a correction based on a captured image is performed for both the concentric aberration component and the uniform aberration component. In addition, taking into consideration a gained benefit that a measurement work becomes unnecessary, it may be appropriate to perform correction for the uniform aberration component on the basis of a captured image. In such a way, in the third embodiment, a configuration is adopted that may be most rational when production efficiency, a calculation amount, and the stability of a correction effect are judged in a comprehensive manner.

4. Example of Modification

Figure 30A:
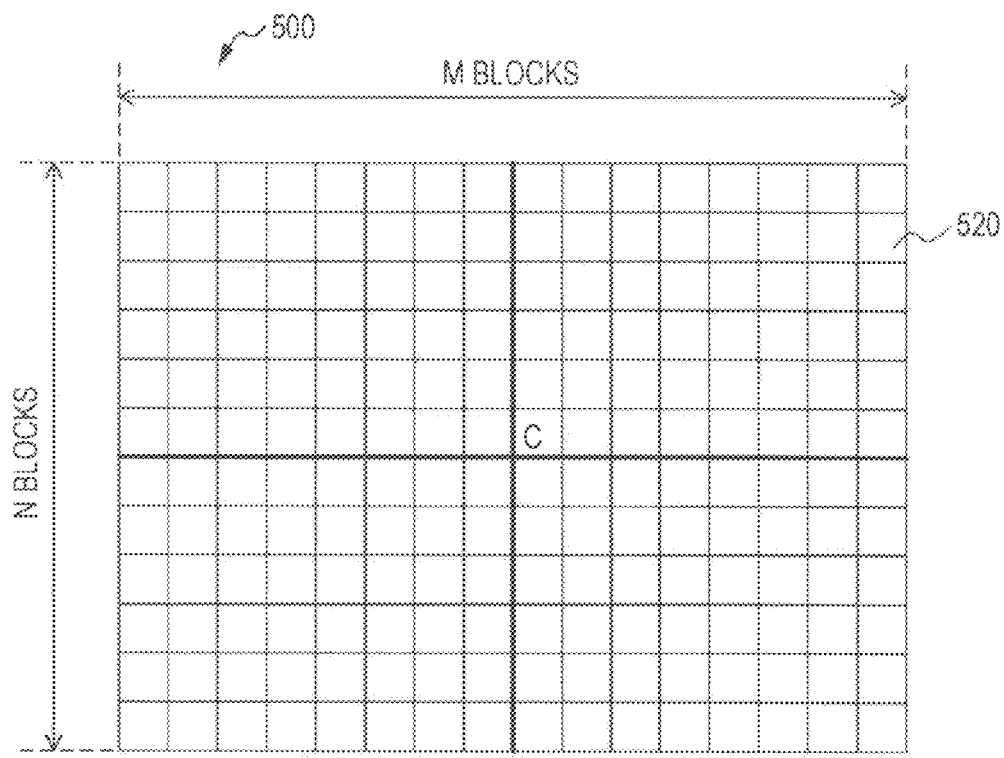
FIGS. 30A and 30B are diagrams for explaining an example of a modification to a method used for acquiring correction data in the concentric aberration correction data table according to the first embodiment of the present invention.
Figure 30B:
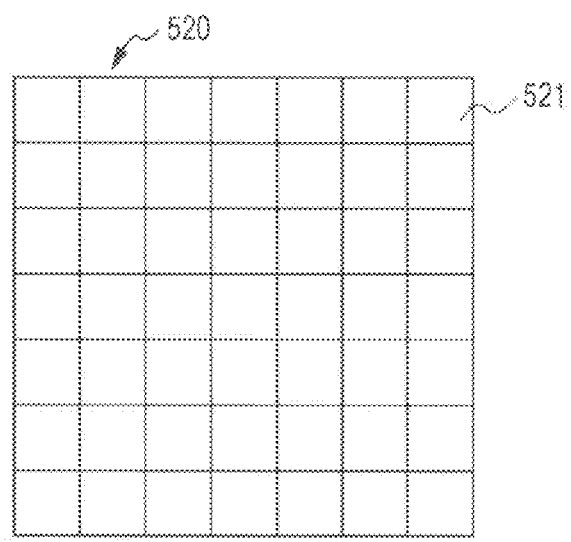

In addition, as an example of a modification to the first embodiment, with respect to the concentric aberration correction data table 240, another example of an acquisition method will be described with reference to FIG. 30. In the example of a modification, for example, a chart image of a predetermined design or the like is captured in response to each combination of an aperture value i, a zoom position z, and a focus position f. In addition, an image plane 500 obtained by capturing the chart image is divided into blocks 520 so that the image plane 500 is M blocks wide and N blocks high, in such a way as illustrated in FIG. 30A. For example, in such a way as illustrated in FIG. 30B, a predetermined number of pixels 521 are arrayed in a predetermined pattern, thereby forming one block 520. In addition, in this figure, an example is illustrated in which the pixels 521 are arrayed in accordance with (7 rows×7 columns).

On that basis, in each block 520, an averaged correction amount is calculated with respect to the concentric aberration. For this purpose, first, for example, in each block 520 in the image plane 500 according to one combination of an aperture value i, a zoom position z, and a focus position f, the color shift amount of each pixel 521, which corresponding to the concentric aberration, is obtained by performing edge detection in a radial direction, for example. In addition, on the basis of an interpolation operation or average value calculation that utilizes each of the color shift amounts of the pixels 521 forming one block 520, a color shift amount corresponding to the block 520 is calculated. In addition, a correction amount corresponding to the block 520 is calculated from the color shift amount. The correction amount corresponding to each of the blocks 520 is the correction data 241. In addition, the correction amount corresponding to each of the blocks 520 is calculated on the basis of the image plane 500 obtained by imaging with respect to each combination of an aperture value i, a zoom position z, and a focus position f.

The concentric aberration correction data table 240 including the correction data 241 obtained in such a way as described above is five-dimensional data including the combinations of aperture values i, zoom positions z, focus positions f, processing-target colors c, and the positions of the blocks 520, not illustrated in a figure. Compared with the concentric aberration correction data table 240 illustrated in FIG. 9, for example, it may be assumed that, in place of the image height value y, the position of the block 520 is set as a parameter. In addition, in response to this, when the concentric aberration correction is performed, the position of the block 520 including a processing-target pixel is calculated, in place of the calculation of the image height of the processing-target pixel.

In addition, the concentric aberration point-symmetrically occurs with respect to the center C of the image plane 500 illustrated in FIG. 30. Namely, the concentric aberration line-symmetrically occurs with respect to each of a horizontal line and a vertical line passing through the center C of the image plane 500. On the basis of this, for example, the correction data 241 corresponding to the blocks 520 in only one region from among four regions into which the image plane 500 is segmented by the above-mentioned horizontal line and vertical line is only stored, thereby allowing the concentric aberration correction data table 240 to be formed. In this case, the correction data 241 stored in response to one block 520 is also selected as the correction data 241 corresponding to the block 520 located at a symmetrical position with respect to the horizontal line or the vertical line. In such a way, compared with a case in which the correction amount data 241 corresponding to all blocks 520 in the image plane 500 is stored, the size of the centric aberration correction data table 240 may become a quarter thereof.

In addition, in the description so far, it has been assumed that imaging is performed using a lens preliminarily attached to an image pickup device such as, for example, the video camera 100 or the like. However, actually, in some cases, a conversion lens is attached to a lens portion in an image pickup device, and imaging is performed. For example, as the conversion lens, there are a wide conversion lens to deal with wider-angle imaging and a tele conversion lens to deal with more telephoto imaging. When, in the configurations of the first to the third embodiments and the example of a modification, such a conversion lens is attached, the magnification chromatic aberration correction may be performed as follows, for example. Namely, when the attachment of the conversion lens to the image pickup device is detected, the correction amount calculated in such a way as described so far is modified in accordance with the magnification of the attached conversion lens.

In addition, while, in the description so far, the configuration of the magnification chromatic aberration correction according to an embodiment of the present invention is applied to an image pickup device such as the video camera 100 or the like, the magnification chromatic aberration correction may be configured as an application program of a personal computer, for example.

In addition, an embodiment of the present invention illustrates an example used for realizing the present invention, and, as clearly specified in an embodiment of the present invention, a matter in an embodiment of the present invention and an invention specific matter in the claims have a correspondence relationship to each other. In the same way, an invention specific matter in the claims and a matter in an embodiment of the present invention to which the same name is assigned have a correspondence relationship to each other. In this regard, however, the present invention is not limited to the embodiments, and may be realized by making various modifications to the embodiments without departing from the scope of the present invention.

In addition, the processing procedures described in an embodiment of the present invention may be considered as a method including a sequence of these procedures. In addition, the processing procedures described in an embodiment of the present invention may also be considered as a program used for causing a computer to execute a sequence of these procedures or a recording medium used for storing the program. As the recording medium, for example, a compact disc (CD), a minidisc (MD), a digital versatile disk (DVD), a memory card, a Blu-ray Disc (registered trademark), or the like may be used.

The present application contains subject matter related to that disclosed in Japanese Priority Patent Application JP 2010-150142 filed in the Japan Patent Office on Jun. 30, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
    a concentric aberration correction amount calculation unit configured to calculate, with respect to a processing-target pixel in an input image signal, a concentric aberration correction amount for concentric aberration that is a component of magnification chromatic aberration, the concentric aberration causing a color shift to occur in a concentric manner from the center of an image such that the color shift continuously increases as a distance from the center of the image increases for all pixels in the input image signal, the concentric aberration correction amount calculation unit calculating the concentric aberration correction amount based on an aperture value, a zoom position, a focus position, an image height value, and a color, the concentric aberration correction amount calculation unit calculating the concentric aberration correction for at least two of three colors;
    a uniform aberration correction amount calculation unit configured to calculate, with respect to the processing-target pixel, a uniform aberration correction amount for uniform aberration that is a component of magnification chromatic aberration, the uniform aberration causing a color shift direction and a color shift amount to uniformly occur on a whole image, the uniform aberration correction amount calculation unit calculating the uniform aberration correction amount based on the aperture value, the zoom position, the focus position, and the color; and
    a pixel value correction unit configured to correct a pixel value of the processing-target pixel on the basis of the calculated concentric aberration correction amount and the calculated uniform aberration correction amount.

2. The image processing device according to claim 1, further comprising:
    a concentric aberration correction data holding unit configured to hold, as concentric aberration correction amount data, the concentric aberration correction amount corresponding to each concentric aberration condition including at least a combination of a color of light and an image height; and
    a uniform aberration correction data holding unit configured to hold, as uniform aberration correction amount data, the uniform aberration correction amount corresponding to each concentric aberration condition including at least a color of light, wherein the concentric aberration correction amount calculation unit selects the concentric aberration correction amount data corresponding to the concentric aberration condition to which the processing-target pixel corresponds, and calculates the concentric aberration correction amount using the selected concentric aberration correction amount data, and the uniform aberration correction amount calculation unit selects the uniform aberration correction amount data corresponding to the uniform aberration condition to which the processing-target pixel corresponds, and calculates the uniform aberration correction amount using the selected uniform aberration correction amount data.

3. The image processing device according to claim 2, wherein the concentric aberration correction amount data indicates a correction amount corresponding to a color shift amount in an image height direction, which occurs in response to the concentric aberration condition, and the uniform aberration correction amount data indicates a correction amount corresponding to a color shift amount and a color shift direction which occur in response to the uniform aberration condition.

4. The image processing device according to claim 2, wherein the uniform aberration correction amount data includes a horizontal direction correction amount obtained in response to a horizontal direction color shift amount measured in a predetermined region as a target, the predetermined region including a virtual vertical line passing through a central portion of a captured image, and a vertical direction correction amount obtained in response to a vertical direction color shift amount measured in a predetermined region as a target, the predetermined region including a virtual horizontal line passing through the central portion of the captured image.

5. The image processing device according to claim 2, wherein the concentric aberration correction amount data indicates a correction amount corresponding to the concentric aberration condition including a combination of a color of light, an image height, and predetermined lens control information used when an image to be a source of the input image signal is captured, and the uniform aberration correction amount data indicates a correction amount corresponding to the uniform aberration condition including a combination of a color of light and predetermined lens control information used when an image of the input image signal is captured.

6. The image processing device according to claim 5, wherein the lens control information is information indicating a control state of each of one or more predetermined movable portions in a lens unit.

7. The image processing device according to claim 2, wherein the concentric aberration correction amount data is calculated from simulation based on a characteristic of a lens.

8. The image processing device according to claim 1, further comprising:
    a uniform aberration component-associated edge detection unit configured to detect an edge corresponding to the uniform aberration from the input image signal; and
    a concentric aberration component-associated edge detection unit configured to detect an edge corresponding to the concentric aberration from the input image signal a pixel value of which has been corrected by the pixel value correction unit on the basis of the uniform aberration correction amount, wherein the uniform aberration correction amount calculation unit calculates a uniform aberration correction amount for the processing-target pixel on the basis of a color shift amount occurring, owing to uniform aberration, in each edge detected by the uniform aberration component-associated edge detection unit, the concentric aberration correction amount calculation unit calculates a concentric aberration correction amount for the processing-target pixel on the basis of a color shift amount occurring, owing to concentric aberration, in each edge detected by the concentric aberration component-associated edge detection unit, and the pixel value correction unit corrects, on the basis of the concentric aberration correction amount, a pixel value of the processing-target pixel that has been corrected on the basis of the uniform aberration correction amount.

9. The image processing device according to claim 8, wherein the uniform aberration component-associated edge detection unit detects an edge in a vertical direction in the vicinity of an image portion in a horizontal radial direction in an image of the input image signal, and detects an edge in a horizontal direction in the vicinity of an image portion in a vertical radial direction in an image of the input image signal, and the concentric aberration component-associated edge detection unit detects an edge in a radial direction in the vicinity of an image portion in each of at least one predetermined radial direction in an image of the input image signal.

10. The image processing device according to claim 8, wherein each of the uniform aberration component-associated edge detection unit and the concentric aberration component-associated edge detection unit detects, with respect to each detected edge, a type of a change direction of a pixel value of the edge, the uniform aberration correction amount calculation unit calculates the uniform aberration correction amount using a statistical result relating to a type of a change direction of a pixel value, detected by the uniform aberration component-associated edge detection unit, and the concentric aberration correction amount calculation unit calculates the concentric aberration correction amount using a statistical result relating to a type of a change direction of a pixel value with respect to each detected edge, detected by the concentric aberration component-associated edge detection unit.

11. The image processing device according to claim 1, further comprising:
   a concentric aberration correction data holding unit configured to hold, as concentric aberration correction amount data, the concentric aberration correction amount corresponding to each concentric aberration condition including at least a combination of a color of light and an image height; and
   a uniform aberration component-associated edge detection unit configured to detect an edge corresponding to the uniform aberration from the input image signal, wherein the concentric aberration correction amount calculation unit selects the concentric aberration correction amount data corresponding to the concentric aberration condition to which the processing-target pixel corresponds, and calculates the concentric aberration correction amount using the selected concentric aberration correction amount data, and the uniform aberration correction amount calculation unit calculates a uniform aberration correction amount for the processing-target pixel on the basis of a color shift amount occurring, owing to uniform aberration, in each edge detected by the uniform aberration component-associated edge detection unit.

12. An image processing method comprising:
   calculating, with respect to a processing-target pixel in an input image signal, a concentric aberration correction amount for concentric aberration that is a component of magnification chromatic aberration, the concentric aberration causing a color shift to occur in a concentric manner from the center of an image such that the color shift continuously increases as a distance from the center of the image increases for all pixels in the input image signal, the concentric aberration correction amount being calculated based on an aperture value, a zoom position, a focus position, an image height value, and a color, the concentric aberration correction amount being calculated for at least two of three colors;
   calculating, with respect to the processing-target pixel, a uniform aberration correction amount for uniform aberration that is a component of magnification chromatic aberration, the uniform aberration causing a color shift direction and a color shift amount to uniformly occur on a whole image, the uniform aberration correction amount being calculated based on the aperture value, the zoom position, the focus position, and the color; and
   correcting a pixel value of the processing-target pixel on the basis of the calculated concentric aberration correction amount and the calculated uniform aberration correction amount.

13. A non-transitory computer readable medium encoded with a program for causing a computer to execute a method comprising:
   calculating, with respect to a processing-target pixel in an input image signal, a concentric aberration correction amount for concentric aberration that is a component of magnification chromatic aberration, the concentric aberration causing a color shift to occur in a concentric manner from the center of an image such that the color shift continuously increases as a distance from the center of the image increases for all pixels in the input image signal, the concentric aberration correction amount being calculated based on an aperture value, a zoom position, a focus position, an image height value, and a color, the concentric aberration correction amount being calculated for at least two of three colors;
   calculating, with respect to the processing-target pixel, a uniform aberration correction amount for uniform aberration that is a component of magnification chromatic aberration, the uniform aberration causing a color shift direction and a color shift amount to uniformly occur on a whole image, the uniform aberration correction amount being calculated based on the aperture value, the zoom position, the focus position, and the color; and
   correcting a pixel value of the processing-target pixel on the basis of the calculated concentric aberration correction amount and the calculated uniform aberration correction amount.

* * * * *